(12) United States Patent
Fukuda et al.

(10) Patent No.: US 9,860,635 B2
(45) Date of Patent: Jan. 2, 2018

(54) MICROPHONE ARRAY, MONITORING SYSTEM, AND SOUND PICKUP SETTING METHOD

(71) Applicant: PANASONIC INTELLECTUAL PROPERTY MANAGEMENT CO., LTD., Osaka (JP)

(72) Inventors: Teppei Fukuda, Osaka (JP); Shuichi Watanabe, Kyoto (JP); Hiroyuki Matsumoto, Fukuoka (JP); Hisashi Tsuji, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/528,552

(22) PCT Filed: Dec. 9, 2015

(86) PCT No.: PCT/JP2015/006127
§ 371 (c)(1),
(2) Date: May 22, 2017

(87) PCT Pub. No.: WO2016/098315
PCT Pub. Date: Jun. 23, 2016

(65) Prior Publication Data
US 2017/0264999 A1    Sep. 14, 2017

(30) Foreign Application Priority Data

Dec. 15, 2014  (JP) .................................. 2014-253374
Feb. 18, 2015  (JP) .................................. 2015-029920

(51) Int. Cl.
*H04R 1/40* (2006.01)
*H04R 3/00* (2006.01)
(Continued)

(52) U.S. Cl.
CPC ........... *H04R 1/406* (2013.01); *H04N 5/2252* (2013.01); *H04N 7/18* (2013.01); *H04R 1/028* (2013.01);
(Continued)

(58) Field of Classification Search
None
See application file for complete search history.

(56) References Cited

U.S. PATENT DOCUMENTS

2013/0342731 A1* 12/2013 Lee ..................... H04N 5/23293
   348/231.4
2015/0016641 A1*  1/2015 Ugur ................... G10L 21/0216
   381/303

(Continued)

FOREIGN PATENT DOCUMENTS

JP       2014-143678        8/2014

OTHER PUBLICATIONS

International Search Report, dated Mar. 1, 2016 by the Japan Patent Office (JPO) in the corresponding International Application No. PCT/JP2015/006127.

*Primary Examiner* — Paul Huber
(74) *Attorney, Agent, or Firm* — Greenblum & Bernstein, P.L.C.

(57) ABSTRACT

When a microphone array apparatus sound-picks up voice in a prescribed sound volume or higher, which is output from a sound source, and sends voice data on the voice to voice processing apparatus, a sound source direction detection unit causes sound source marks, each of which indicates a directivity direction, to be displayed on a display, and urges a user to make a selection among the sound source marks and to input camera information. A voice processing apparatus transmits the camera information that is input, and the directivity direction, to the microphone array apparatus. The microphone array apparatus stores the camera information
(Continued)

and the directivity direction, as a preset information table, in a storage unit. Accordingly, where a positional relationship between the camera and the microphone array is unclear, directionality is formed in a determined image capture position, and voice in the predetermined image capture position is output clearly.

20 Claims, 35 Drawing Sheets

(51) Int. Cl.
  *H04N 7/18* (2006.01)
  *H04R 1/02* (2006.01)
  *H04N 5/225* (2006.01)
(52) U.S. Cl.
  CPC ....... *H04R 3/005* (2013.01); *H04R 2201/021* (2013.01); *H04R 2201/401* (2013.01)

(56) References Cited

U.S. PATENT DOCUMENTS

| | | | |
|---|---|---|---|
| 2015/0055929 A1* | 2/2015 | Van Hoff | G11B 27/11 386/201 |
| 2015/0350621 A1 | 12/2015 | Sawa et al. | |

* cited by examiner

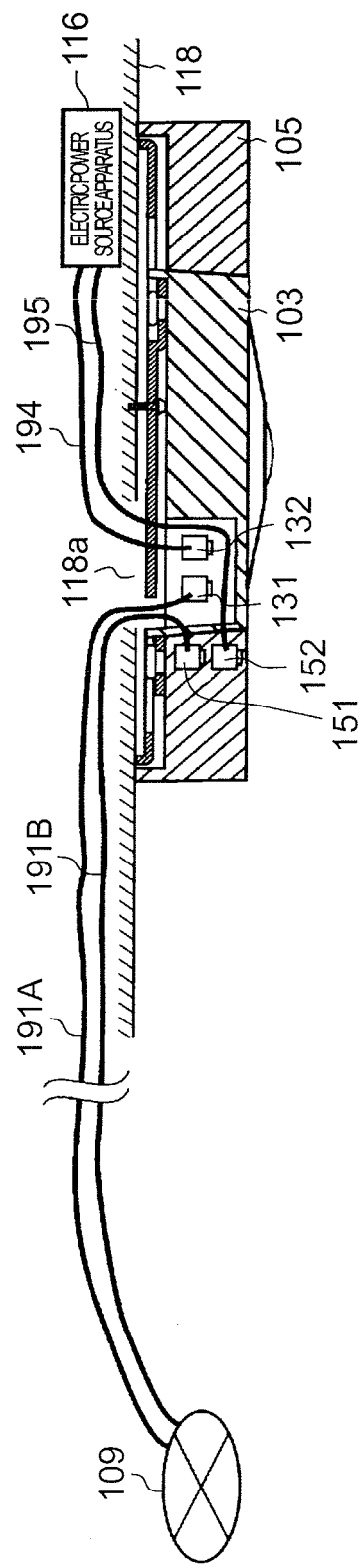

| CAMERA IP ADDRESS | PLACE | POINTING DIRECTION |
|---|---|---|
| 165.254.10.11 | REGISTER R1 | $(\theta_1, \phi_1)$ |
| 165.254.10.12 | REGISTER R2 | $(\theta_2, \phi_2)$ |
| 165.254.10.11 | MAGAZINE SHELF | $(\theta_3, \phi_3)$ |
| ⋮ | ⋮ | ⋮ |
| 165.254.10.1n | *** | $(\theta_n, \phi_n)$ |

FIG. 32

| PLACE | PRESET VALUE | | | CAMERA IP ADDRESS |
|---|---|---|---|---|
| | Mic.No. | POINTING DIRECTION | DIRECTIONALITY CONTROL PARAMETER | |
| REGISTER R1 | MA1 | $(\theta_{11},\phi_{11})$ | $(p_{111},\cdots,p_{11q})$ | 165.254.10.11 |
| REGISTER R2 | MA1 | $(\theta_{12},\phi_{12})$ | $(p_{121},\cdots,p_{12q})$ | 165.254.10.12 |
| MAGAZINE SHELF | MA1 | $(\theta_{13},\phi_{13})$ | $(p_{131},\cdots,p_{13q})$ | 165.254.10.13 |
| | MA2 | $(\theta_{23},\phi_{23})$ | $(p_{231},\cdots,p_{23q})$ | 165.254.10.13 |
| ⋮ | ⋮ | ⋮ | ⋮ | ⋮ |
| DRINK SHELF | MAm | $(\theta_{mn},\phi_{mn})$ | $(p_{mn1},\cdots,p_{mnq})$ | 165.254.10.mn |

*FIG. 38*

| PLACE | MICROPHONE PRESET VALUE | | | CAMERA IP ADDRESS | CAMERA PRESET VALUE |
|---|---|---|---|---|---|
| | Mic.No. | POINTING DIRECTION | DIRECTIONALITY CONTROL PARAMETER | | |
| REGISTER R1 | MA1 | $(\theta_{11}, \phi_{11})$ | $(p_{111}, \cdots, p_{11q})$ | 165.254.10.11 | Null |
| REGISTER R2 | MA1 | $(\theta_{12}, \phi_{12})$ | $(p_{121}, \cdots, p_{12q})$ | 165.254.10.12 | Null |
| MAGAZINE T1 | MA1 | $(\theta_{13}, \phi_{13})$ | $(p_{131}, \cdots, p_{13q})$ | 165.254.10.13 | Null |
| | MA2 | $(\theta_{23}, \phi_{23})$ | $(p_{231}, \cdots, p_{23q})$ | 165.254.10.13 | Null |
| MAGAZINE T2 | MA2 | $(\theta_{24}, \phi_{24})$ | $(p_{241}, \cdots, p_{24q})$ | 165.254.10.14 | PT1 |
| PASSAGE U1 | MA1 | $(\theta_{15}, \phi_{15})$ | $(p_{151}, \cdots, p_{15q})$ | 165.254.10.14 | PT2 |
| ⋮ | ⋮ | ⋮ | ⋮ | ⋮ | ⋮ |
| DRINK SHELF | MAm | $(\theta_{mN}, \phi_{mN})$ | $(p_{mN1}, \cdots, p_{mNq})$ | 165.254.10.mN | Null |

330A

MICROPHONE ARRAY, MONITORING SYSTEM, AND SOUND PICKUP SETTING METHOD

TECHNICAL FIELD

The present disclosure relates to a microphone array, a sound pickup system and a sound pickup setting method, in which directionality for voice that is sound-picked up is formed in a predetermined position and is output.

BACKGROUND ART

In a monitoring system that is installed in a prescribed position (for example, a ceiling or a wall) within a factory, a store (for example, a retail store or a bank), a shopping center, and a public place (for example, a station or a library), a plurality of camera apparatuses are connected through a network, and monitoring of picture data (which, hereinafter, includes a still image and a moving image) in a prescribed range for a monitoring target is performed in a monitoring apparatus that is installed in one place.

However, in monitoring of only a picture, because there is necessarily a limitation on an amount of information that is acquired, there is an increasing demand for a monitoring system that can obtain voice data in order to perform monitoring that uses voice.

In response to this demand, there is a product in which a microphone is mounted in one or several camera apparatuses and audio data is transmitted to a network in a state of being superimposed on picture data. However, in most cases, the microphone that is used in this product is non-directional, and for example, although the microphone is unidirectional, this directional characteristic is a wide angle. Therefore, in most cases, sound that is desired to be heard in the monitoring is drowned out by noise and thus is not heard.

In contrast, in a monitoring camera system, for example, as is disclosed in PTL 1, a microphone array that satisfies a requirement for detecting a direction in which abnormal sound occurs or for desirably hearing only sound in a specific direction while being drowned out by noise is under development. The microphone array in PTL 1 is used in order that a plurality of microphone units are arranged and in order that voice from a place designated by a user is reproduced on a screen on which a picture that is image-captured in a monitoring camera (for example, an omnidirectional camera) is displayed, in a highlighting manner, using the voice that is sound-picked up in each microphone unit.

However, in an existing monitoring system that is installed for the main purpose of monitoring of a picture by the monitoring camera (hereinafter simply referred to as a camera), in a case where a microphone array for monitoring voice is additionally installed later, in most cases, an attachment place is a high-height place, such as a ceiling. Thus, work for the additional installation is difficult.

FIGS. 13A to 13C are diagrams for describing later additional work in a case where microphone array 105 is attached to camera 103 that is already installed, on which existing LAN cables 191 and 191A are laid. FIG. 13A illustrates an installation example in which camera 103 is already installed. Camera 103 is installed on ceiling 118. Camera LAN connector 131 is provided on a rear-side end portion of a case of camera 103. LAN cable 191 of which an end portion (a plug) is inserted into camera LAN connector 131 is laid through hole 118*a* that is formed in ceiling 118 facing a rear side of the case of camera 103, and is connected to PoE apparatus 106 that is linked to network 109. Camera 103 is connected to network 109 through LAN cable 191 in such a manner that communication is possible, and operates with supply of electric power from PoE apparatus 106 that is present between camera 103 and network 109.

FIG. 13B illustrates an installation example in which microphone array 105 is additionally installed later to camera 103 that is already installed. Microphone LAN connector 151 is provided within an opening that is formed in a case of ring-type microphone array 105 which is installed in such a manner to externally fit camera 103, and LAN cable 191B for a microphone, of which an end portion (a plug) is inserted into microphone LAN connector 151, is connected to PoE apparatus 106 in such a manner to run along LAN cable 191A for a camera. That is, two cables, long LAN cable 191B for a microphone and LAN cable 191A for a camera, which have almost the same length, are laid within a space between a roof and a ceiling.

FIG. 13C illustrates other one installation example in which microphone array 105 is additionally installed later to camera 103 that is already installed. PoE hub 108 that causes LAN cable 191 which is linked to PoE apparatus 106 to ramify is installed within the space between the roof and the ceiling. Short LAN cable 192 for a camera is connected between one connector of PoE hub 108 and camera LAN connector 131, and short LAN cable 193 for a microphone is connected between the other connector of PoE hub 108 and microphone LAN connector 151.

FIGS. 14A and 14B are diagrams for describing later additional work in a case where microphone array 105 is attached to camera 103 that is already installed, on which existing LAN cables 191 and DC cable 194 are laid.

FIG. 14A illustrates an installation example in which camera 103 is already installed. Camera 103 is installed on ceiling 118. Camera LAN connector 131 and camera DC connector 132 are provided on a rear-side end portion of the case of camera 103. In the same manner as in FIG. 13A, LAN cable 191 of which an end portion (a plug) is inserted into camera LAN connector 131 is laid through hole 118*a* that is formed in ceiling 118 facing a rear side of the case of camera 103, and is connected to connector 109. In this case, LAN cable 191 is laid in a manner that is dedicated for communication, not for the PoE apparatus. Furthermore, DC cable 194 of which an end portion (a plug) is inserted into camera DC connector 132 is linked to electric power source apparatus 116, such as an AC adaptor, which is installed in the space between the roof and the ceiling. Camera 103 is connected to network 109 through LAN cable 191 in such a manner that the communication is possible, and operates with supply of electric power from electric power source apparatus 116.

FIG. 14B illustrates an installation example in which microphone array 105 is additionally installed later to camera 103 that is already installed. Microphone LAN connector 151 and microphone DC connector 152 are provided within the opening that is formed in the case of ring-type microphone array 105. In the same manner as in FIG. 13B, LAN cable 191B for a microphone, which is connected to microphone LAN connector 151, is laid in such a manner as to run along LAN cable 191A for a camera. On the other hand, DC cable 195 for a microphone, of which an end portion (a plug) is inserted into microphone DC connector 152 is connected to electric power source apparatus 116 in such a manner as to run along DC cable 194 for a camera. Therefore, a total of four cables, long DC cable 195 for a microphone and DC cable 194 for a camera, which have almost the same length, in addition to long LAN cable 191B for a microphone and LAN cable 191A for a camera, which has almost the same length, are provided with the space between the roof and the ceiling.

In this manner, in a case where later additional work for adding a microphone array that monitors voice to the camera that is already installed is performed, an amount of work for installation increases. Therefore, it is desirable that the amount of work for installation is reduced. Furthermore, it is also desirable that a small amount of work for installation is performed in initial work for newly installing a monitoring system.

Additionally, in a case where an omnidirectional camera and a microphone array are attached on the same axis, because coordinates of a picture and voice are consistent with each other (more precisely, an image capture direction from the omnidirectional camera and a direction in which voice that is sound-picked up by the microphone array is emphasized are the same), a problem does not particularly occur, but in a case where the monitoring camera and the microphone array are attached separately from each other, a positional relationship between the monitoring camera and the microphone array is unclear. Therefore, for example, when initial setting is performed, if a correspondence relationship between a coordinate system of the monitoring camera and a coordinate system of the microphone array is not obtained, it is difficult to form directionality of voice in a direction toward a predetermined position in which the monitoring camera captures an image while the monitoring is in progress.

Particularly, for the reason of strength or a structure of a building or a structured body, when there is a limitation on an attachment position of the monitoring camera or the microphone array, information on an actual attachment position is not obtained precisely. Therefore, in order to obtain the correspondence relationship between the coordinate system of the camera and the coordinate system of the microphone array, if the attachment position or direction or the like has to be measured on the spot, work that requires a lot of labor is necessary in addition to a dedicated measuring instrument.

An object of the present disclosure is to reduce an amount of work for installation when a monitoring system is set up in a state of being combined with a camera. Another object of the present disclosure is to reduce an amount of work for installation when a monitoring system is set up in a state of being combined with a camera, by suitably forming directionality in a predetermined image capture position and clearly outputting voice in a prescribed image capture position, even in a case where a positional relationship between a camera and a microphone array is unclear.

CITATION LIST

Patent Literature

PTL 1: Japanese Patent Unexamined Publication No. 2014-143678

SUMMARY OF THE INVENTION

According to an aspect of the present disclosure, there is provided a monitoring system including a microphone array that has a plurality of sound pickup elements and sound-picks up voice using the sound pickup elements; at least one camera that image-captures a predetermined position; a sound source detection unit that detects a sound source direction from the microphone array, based on voice data on the voice that is sound-picked up; a display unit on which the detected sound source direction from the microphone array is displayed according to prescribed voice output in the predetermined position; an operation unit that receives an input of information relating to the camera which image-captures the predetermined position, according to designation of the displayed sound source direction from the microphone array; and a storage unit in which correspondence information that results from associating information relating to the camera, which is input, and the sound source direction from the microphone array is stored.

According to another aspect of the present disclosure, there is provided a microphone array that is connected to a camera and a network, the microphone array including: a sound pickup unit that has a plurality of sound pickup elements, and sound-picks up voice; a first network interface unit has a hub function of transmitting voice data on the voice that is sound-picked up by the sound pickup unit, and image data that is image-captured by the camera and is transmitted to the microphone array, to the network through a first signal line; a first electric power source unit that receives first electric power which is transmitted through the first signal line that is linked to the network, or second electric power which is transmitted from an outer electric power source; an input switch unit that switches between the first electric power or the second electric power and outputs the resulting electric power; and an output switch unit that supplies an output of the input switch unit to the camera through a second signal line which links between the microphone array and the camera, or through an electric power supply line, in which the camera includes an image capturing unit that image-captures an image, a second network interface unit that transmits an image data on an image that is image-captured by the image capturing unit, to the microphone array through a second signal line, and a second electric power source unit that receives the first electric power or the second electric power through the second signal line or an electric power supply line.

According to still another aspect of the present disclosure, there is provided a microphone array that is included in a monitoring system according to the present disclosure and that is connected to a camera and a network, the microphone array including: a sound pickup unit that has a plurality of sound pickup elements, and sound-picks up voice; a network interface unit has a hub function of transmitting voice data on the voice that is sound-picked up by the sound pickup unit, and image data that is image-captured by the camera and is transmitted to the microphone array, to the network through a first signal line; an electric power source unit that receives first electric power which is transmitted through the first signal line that is linked to the network, or second electric power which is transmitted from an outer electric power source; an input switch unit that switches between the first electric power or the second electric power and outputs the resulting electric power; and an output switch unit that supplies an output of the input switch unit to the camera through a second signal line which links between the microphone array and the camera, or through an electric power supply line.

Furthermore, according to still another aspect of the present disclosure, there is provided a sound pickup setting method for use in a monitoring system that includes at least one camera which image-captures a predetermined position and a microphone array, the method including: a step of causing the microphone array, which have a plurality of sound pickup elements, to sound-pick up prescribed output voice from a sound source that is placed in the predetermined position; a step of detecting a sound source direction from the microphone array based on voice data on voice that is sound-picked up by the microphone array; a step of displaying the detected sound source direction from the microphone array on a display unit; a step of designating the sound source direction from the microphone array, which is displayed on the display unit; a step of inputting information relating to the camera that image-captures the predetermined position, according to the designation of the sound source direction; and a step of storing correspondence information that results from associating the information relating to the camera, which is input, and the sound source direction from the microphone array, in a storage unit.

According to the present disclosure, an amount of work for installation can be reduced when a monitoring system is set up in a state of being combined with a camera. Additionally, according to the present disclosure, an amount of work for installation can be reduced when a monitoring system is set up in a state of being combined with a camera, by suitably forming directionality in a predetermined image capture position and clearly outputting voice in a prescribed image capture position, even in a case where a positional relationship between a camera and a microphone array is unclear.

BRIEF DESCRIPTION OF DRAWINGS

FIG. 14B is a diagram for describing the later additional work in the case where a microphone array is attached to the camera that is already installed, on which the existing LAN cable and DC cable are laid.

FIG. 32 is a diagram illustrating a detail of listing of a preset information table that is stored in a table memory.

FIG. 38 is a table illustrating a detail of listing in a preset information table in a third modification example of the seventh embodiment.

DESCRIPTION OF EMBODIMENTS

Embodiments of each of a microphone array, a monitoring system, and a sound pickup setting method according to the present disclosure will be described below with reference to the drawings. A monitoring camera that is used for the monitoring system is here referred to as a "camera" for short. Furthermore, the monitoring system is also referred to as a microphone-integrated camera that results from combining a camera and a microphone.

First Embodiment

Figure 1:
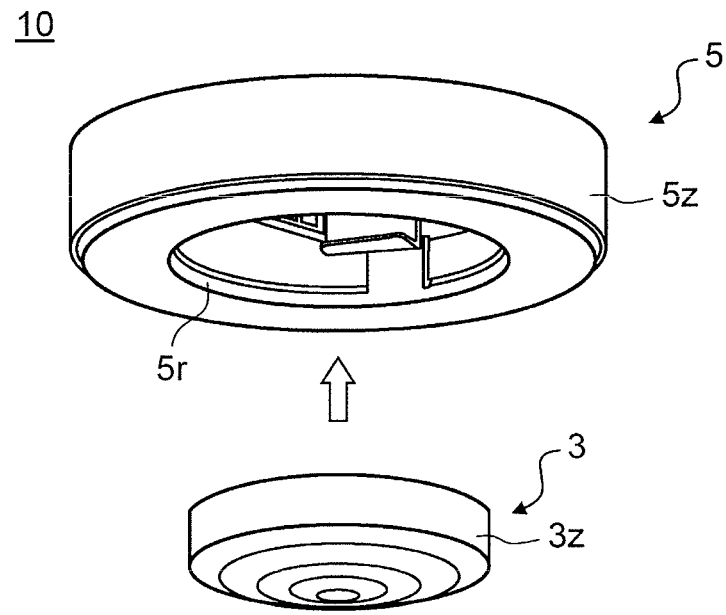
FIG. 1 is a diagram illustrating an external appearance of a monitoring system according to a first embodiment.

FIG. 1 is a diagram illustrating an external appearance of monitoring system 10 according to a first embodiment. Monitoring system 10 has a configuration in which network-supporting type camera 3 and microphone array 5 are combined.

Camera 3 is an omnidirectional camera (that is, a camera that has a view angle in an image capture range of 360 degrees) that has a disc-shaped case 3z and is equipped with a fish-eye lens on the front surface of case 3z. Microphone array 5 has a ring-type case 5z in which a plurality of microphone units 65 (refer to FIG. 4) are concentrically arranged, and picks up voice in all directions (that is, at an angle of 360 degrees).

Monitoring system 10 is installed on ceiling 18 (refer to FIG. 2) in a state where case 3z of camera 3 is accommodated into opening 5r that is formed in case 5z of microphone array 5.

Figure 2A:
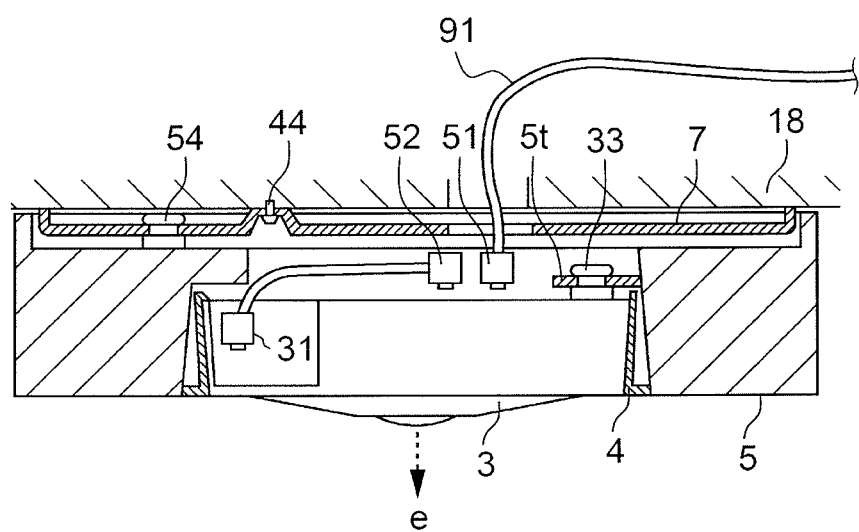
FIG. 2A is a cross-sectional diagram illustrating a structure in a state where the monitoring system that is configured with a camera and a microphone array is attached to a ceiling attachment metal fitting.
Figure 2B:
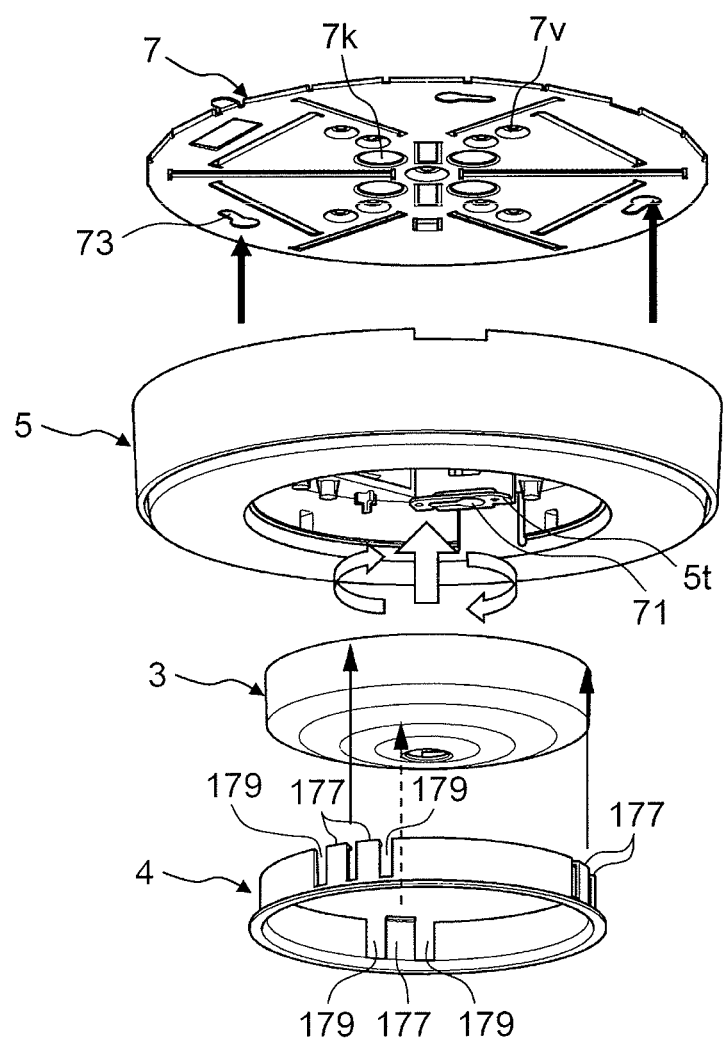
FIG. 2B is an exploded perspective diagram of the monitoring system.

FIG. 2A is a cross-sectional diagram illustrating a structure in a state where monitoring system 10 that is configured with camera 3 and microphone array 5 is attached to ceiling attachment metal fitting 7.
FIG. 2B is an exploded perspective diagram of a monitoring system 10.

Ceiling attachment metal fitting 7 is a member that is made of metal, which is formed in the shape of approximately a disc that has an uneven surface. A material of ceiling attachment metal fitting 7 may be resin or the like.

Hole 7k is provided in ceiling attachment metal fitting 7. LAN cable 91 passes through hole 7k past the vicinity of the center thereof. Engagement holes 73 that are engaged with fixation pins 54, respectively, which are provided on the bottom surface of microphone array 5, are concentrically formed in the vicinity of a periphery of a surface of ceiling attachment metal fitting 7. Engagement hole 73 is formed in the shape of approximately a gourd in such a manner that a diameter of one end of engagement hole 73 is greater than that of the other end (refer to FIG. 2B).

Furthermore, pin hole 7v, into which ceiling fixation pin 44 is inserted, is formed at four points in the center portion of a surface of ceiling attachment metal fitting 7. Ceiling fixation pin 44 passes through pin hole 7v and is screwed into a surface of ceiling 18, and thus ceiling attachment metal fitting 7 is fixed to ceiling 18.

Locking piece 5t for fixing camera 3 is formed at concentric three points in a peripheral portion of the case of microphone array 5. Engagement hole 71 that is engaged with fixation pin 33 which is provided on the bottom surface of camera 3 is formed in locking piece 5t in the shape of approximately a gourd in such a manner that a diameter of one end of engagement hole 71 is greater than that of the other end (refer to FIG. 2B).

Each of fixation pins 33 and 54 is made up of a head portion that has the thickness midway between parameters of one end portion and the other portion of each of engagement holes 71 and 73, and a body that is slenderer than the head portion.

Furthermore, a side surface of case 3z of camera 3 is formed on a tapered surface that is slightly narrower outward (toward the opposite side of the ceiling), and an inner wall surface of opening 5r that is formed in case 5z of microphone array 5 is formed in the shape of a cylinder that is not tapered, or formed on a reversely tapered surface with respect to a side surface of case 3z of camera 3. Therefore, when case 3z of camera 3 is attached to opening 5r of case 5z of microphone array 5, there is a gap that provides an opening. Because the gap has an adverse influence on microphone array 5, such as reflection or resonance, spacer 4 is attached to surround camera 3 in such a manner as to fill the gap.

In spacer 4, a plurality of peripheral wall elastic pawls 177 are at equal distances in a circumferential direction within a plurality of cuts 179, respectively. Peripheral wall elastic pawl 177 is engaged with case 3z of camera 3, and thus spacer 4 is attached.

Furthermore, in a case where at the time of work for initial installation, camera 3 and microphone array 5 are attached to ceiling attachment metal fitting 7, an attachment procedure is as follows. First, ceiling attachment metal fitting 7 is attached to the ceiling. Next, fixation pin 54 that protrudes from the bottom surface of microphone array 5 is inserted into one end portion that has a greater diameter, of engagement hole 73 that is provided in ceiling attachment metal fitting 7. In a state where a head portion of fixation pin 54 protrudes from engagement hole 73, microphone array 5 is twisted. In a state where microphone array 5 is twisted and thus the head portion of fixation pin 54 is moved to the other end portion of engagement hole 73, fixation pin 54 and engagement hole 73 are engaged with each other and microphone array 5 is fixed in the direction of central axis e.

Next, LAN cable 91 is pulled out of hole 7k and is inserted into microphone LAN connector 51. Additionally, LAN cable 92 is inserted into microphone LAN connector 52.

Later, microphone array 5 is attached to ceiling attachment metal fitting 7, and then camera 3 is attached to locking piece 5t of microphone array 5 in such a manner that camera 3 is accommodated into opening 5r in case 5z of microphone array 5. At this time, fixation pin 33 is engaged with engagement hole 71 that is formed in locking piece 5t. A procedure for engaging fixation pin 33 with engagement hole 71 is the same as a procedure for engaging fixation pin 54 with engagement hole 73.

Furthermore, in a case where camera 3 is already attached to ceiling attachment metal fitting 7A (refer to FIG. 9A), ceiling attachment metal fitting 7 is replaced with ceiling attachment metal fitting 7B for microphone array 5.

Figure 3:
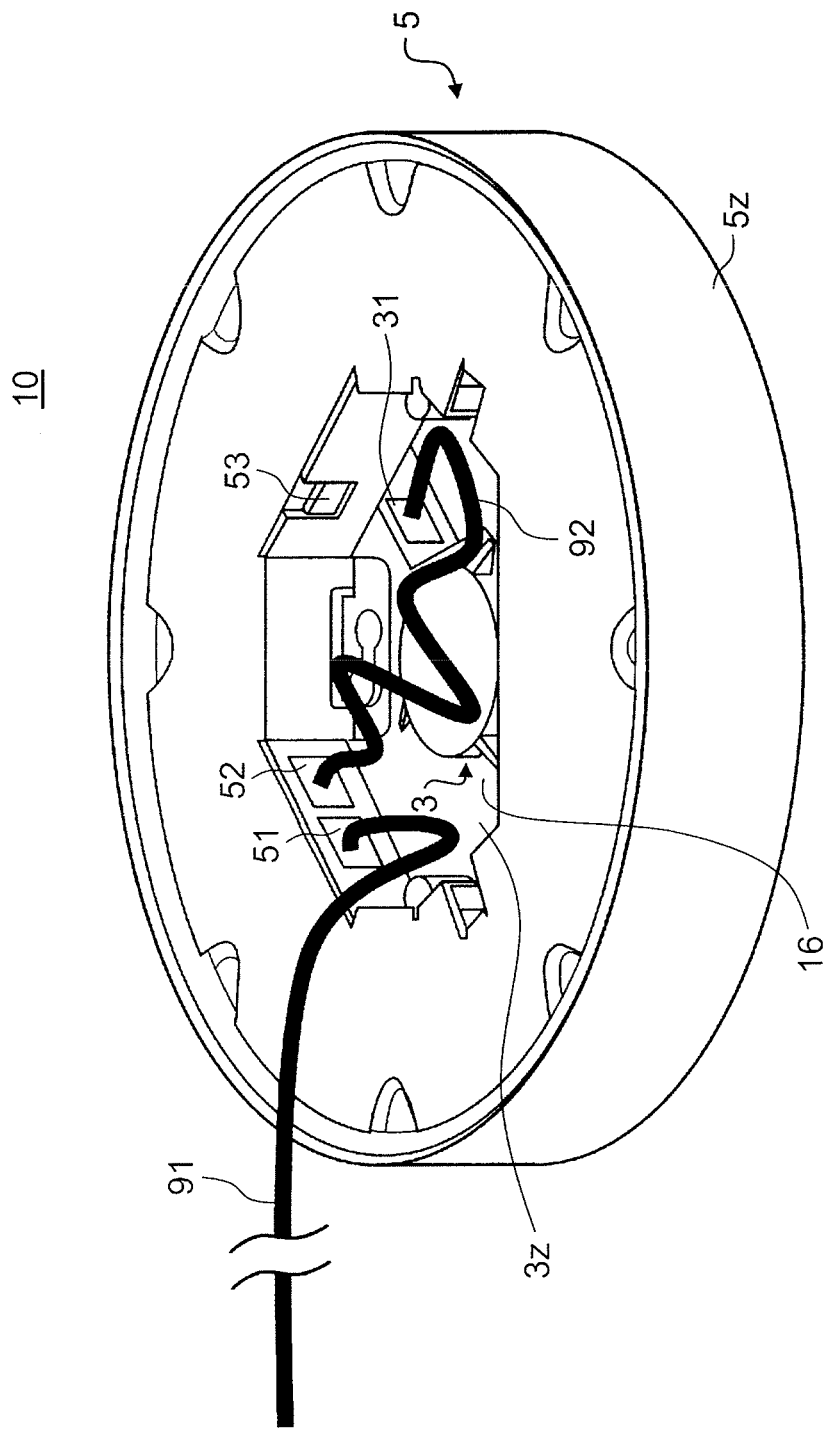
FIG. 3 is a perspective diagram illustrating a rear side of a case of the monitoring system in which the camera and the microphone array are combined.

FIG. 3 is a perspective diagram illustrating a rear side of a case of monitoring system 10 in which camera 3 and microphone array 5 are combined. There is a gap (refer to FIG. 2B) between a rear surface of case 3z of camera 3 connect and ceiling 18, and when case 5z of microphone array 5 is combined in such a manner as to externally fit case 3z of camera 3, space 16 is generated that is surrounded by an inner side of opening 5r in case 5z of microphone array 5, a rear surface of case 3z of camera 3 and ceiling 18.

In order to be exposed toward space 16, microphone LAN connector 51 for input, and microphone LAN connector 52 and microphone DC connector 53 for output are provided in the inner wall surface of opening 5r that is formed in case 5z of microphone array 5. Microphone DC connector 53 corresponds to both of microphone DC connector 53A (refer to FIG. 4) for input and microphone DC connector 53B for output. Furthermore, camera LAN connector 31 is provided on an end portion that is formed on the rear surface of case 3z of camera 3.

One end portion (a plug) of short LAN cable 92 is inserted into microphone LAN connector 52, and the other end portion (a plug) of short LAN cable 92 is inserted into camera LAN connector 31. LAN cable 92 is accommodated into space 16. Furthermore, one end portion (a plug) of long LAN cable 91 that is laid on a rear side of ceiling 18 is inserted into microphone LAN connector 51. The other end portion of LAN cable 91 is connected to PoE apparatus 6 (refer to FIG. 4) that is installed on the rear side of ceiling 18.

Figure 4:
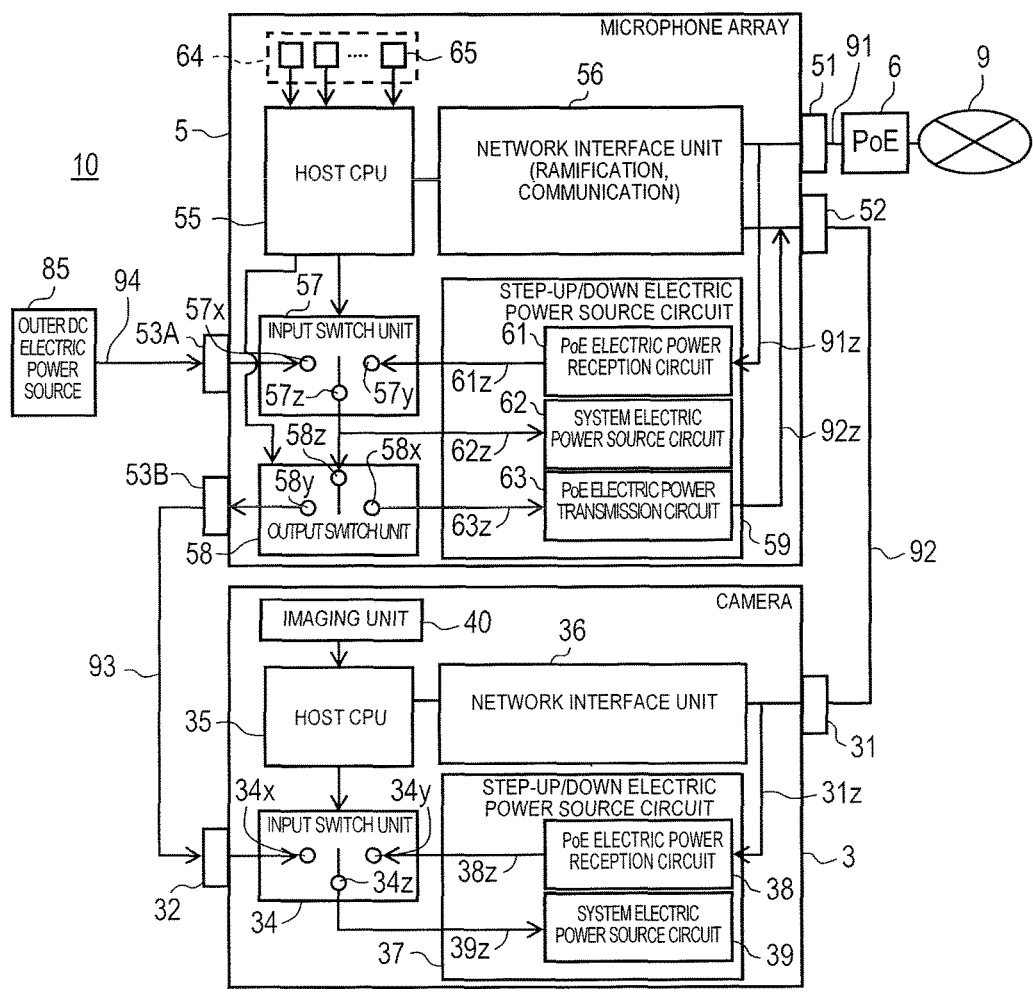
FIG. 4 is a block diagram illustrating a hardware configuration of the monitoring system.

FIG. 4 is a block diagram illustrating a hardware configuration of monitoring system 10. Monitoring system 10, as described above, is configured with camera 3 and microphone array 5, and is connected to network 9 through PoE apparatus 6. Furthermore, camera 3 and microphone array 5 is capable of receiving power from PoE apparatus 6 through LAN cable 91, or from outer DC power supply 85 through DC cable 94.

PoE apparatus 6 is an apparatus that is interposed between network 9 and microphone array 5 and is capable of supplying power to microphone array 5 through LAN cable 91 that is a communication cable. An amount of electric power that is capable of being supplied in compliance with a PoE specification is 15.4 W (on the receiving side) in a voltage range between 44 V and 57 V. An amount of electric power that is capable of being supplied in compliance with PoE+ that is a higher-level specification than PoE is 30.0 W (on the receiving side) in a voltage range between 50 V and 57 V. In the present embodiment, electric power is capable of being supplied in compliance with any one of the PoE and PoE+ specifications. Furthermore, in a case where electric power is supplied in compliance with PoE and PoE+, there are type A that uses a pin in a shared manner both for communication and electric power, and type B that uses a pin for electric power, which is normally not used for communication. In the present embodiment, any one of the types is capable of being supported. This is also the same for the following embodiments.

Network 9 is a communication network, such as a wired LAN or the Internet. Over network 9, image data that is image-captured in network-supporting type camera 3, or voice data that is sound-picked up in network-supporting type microphone array 5 is transferred to an outer apparatus that is connected to network 9.

Microphone array 5, as described above, has microphone set 64 that is an omnidirectional microphone array and includes a plurality of microphone units 65, host CPU 55, input switch unit 57, output switch unit 58, network interface unit 56, and step-up/down power supply circuit 59.

For example, a high sound-quality Electret Condenser Microphone (ECM) is used for a plurality of microphone units 65. Each of the plurality of microphone units 65 that are included in microphone set 64 does not have directionality and outputs the voice data that is sound-picked up to host CPU 55.

Host CPU 55 controls operation of each unit of microphone array 5. For example, host CPU 55 transmits the voice data that is sound-picked up by the plurality of microphone units 65 to network 9 through network interface unit 56, drives input switch unit 34, switches a supply source of electric power that is supplied to microphone array 5, drives output switch unit 58, and switches a supply source of electric power to camera 3.

Network interface unit 56 has a hub function of transmitting the voice data on voice that is sound-picked up by microphone array 5, and the image data on an image that is image-captured by camera 3 and is transmitted to microphone array 5 to network 9 through LAN cable 91. Network interface unit 56 switches communication that is performed with network 9 through LAN cable 91, to communication with the camera 3 side through microphone LAN connector 52, for transfer, and ramification-controls communication that is performed between host CPU 55 and network 9, by performing switching. The control of the communication may be by a repeater function, not through the switching.

Step-up/down power supply circuit 59 has PoE electric power reception circuit 61, system electric power supply circuit 62, and PoE electric power transmission circuit 63.

When receiving electric power that is transmitted from PoE apparatus 6, through LAN cable 91 that is connected to microphone LAN connector 51, PoE electric power reception circuit 61 steps down the electric power to a voltage (for example, 12 V) that is approximately equal to that of outer DC power supply 85, and outputs the resulting electric power to input terminal 57y of input switch unit 57.

System electric power supply circuit 62 steps down or steps up the electric power that is input from output terminal 57z of input switch unit 57, and generates a power supply voltage that is supplied to each unit of microphone array 5.

PoE electric power transmission circuit 63 steps up the electric power that is input from output terminal 58x of output switch unit 58, and transmits the resulting electric power to the camera 3 side through LAN cable 92 that is connected to microphone LAN connector 52.

Input switch unit 57 has a switch function of changing a supply source of the electric power that is supplied to each unit of microphone array 5 to outer DC power supply 85 or PoE apparatus 6. According to an instruction from host CPU 35, input switch unit 57 switches output terminal 57z to system electric power supply circuit 62, to any one of input terminal 57x on the microphone DC connector 53A side, which is linked to outer DC power supply 85 and input terminal 57y that is linked to PoE electric power reception circuit 61 within step-up/down power supply circuit 59. Furthermore, input switch unit 57 is also capable of changing the switch function in a semi-fixed manner with manual operation by an operator or the like or of configuring an electric circuit with passive components such as a diode and changing electric power automatically, without being caused by host CPU 55 to do so.

Output switch unit 58 switches a supply source of electric power that is supplied to camera 3, to outer DC power supply 85 or PoE electric power reception circuit 61. Output switch unit 58 has a switch function of changing input terminal 58z that is linked to output terminal 57z of input switch unit 57 to any one of output terminal 58y on the microphone DC connector 53B side, which is linked to camera 3 through DC cable 93, and output terminal 58x that is linked to PoE electric power transmission circuit 63 within step-up/down power supply circuit 59, according to an instruction from host CPU 55. Furthermore, output switch unit 58 is also capable of changing the switch function in a semi-fixed manner with the manual operation by the operator or the like, without being caused by host CPU 55 to do so.

On the other hand, camera 3 has host CPU 35, input switch unit 34, network interface unit 36, step-up/down power supply circuit 37, and image capturing unit 40.

Image capturing unit 40 is equipped with a fish-eye lens that is installed on the front surface of case 3z of camera 3, has imaging element that is capable of capturing an image as an omnidirectional-fashion image, and outputs image data that is image-captured, to host CPU 35. For example, a Charged Couple Device (CCD) or a Complementary Metal Oxide Semiconductor (CMOS) is used as an imaging element.

Host CPU 35 controls operation of each unit of camera 3. Host CPU 35 transmits the image data that is image-captured by image capturing unit 40 to network 9 through network interface unit 36, and drives input switch unit 34 and switches a supply source of electric power that is supplied to camera 3.

Input switch unit 34 has a switch function of changing a supply source of electric power to the camera DC connector 32 side or the PoE electric power reception circuit 38 side according to an instruction from host CPU 35. That is, input switch unit 34 switches output terminal 34z that is linked to system power supply circuit 39 to any one of input terminal 34x that is linked to the camera DC connector 32 side and input terminal 34y that is linked to PoE electric power reception circuit 38. Furthermore, input switch unit 34 is also capable of changing the switch function in a semi-fixed manner with the manual operation by the operator or the like or of configuring an electric circuit with passive components such as a diode and changing electric power automatically, without being caused by host CPU 35 to do so.

Network interface unit 36 transmits the image data that is image-captured by camera 3, to microphone array 5 through LAN cable 92, and controls communication that is performed between microphone array 5 and host CPU 35 that are connected to each other through camera LAN connector 31 and LAN cable 92.

Step-up/down power supply circuit 37 has PoE electric power reception circuit 38 and system power supply circuit 39.

PoE electric power reception circuit 38 receives electric power that is transmitted from PoE apparatus 6 that is connected through camera LAN connector 31 and LAN cable 92, and steps down the electric power to a voltage (for example, 12 V) that is approximately equal to that of outer DC power supply 85 and outputs the resulting electric power to input terminal 34y of input switch unit 34.

System power supply circuit 39 steps down or up the electric power that is input from output terminal 34z of input switch unit 34, and generates a power supply voltage that is supplied to each unit of camera 3.

Figure 5:
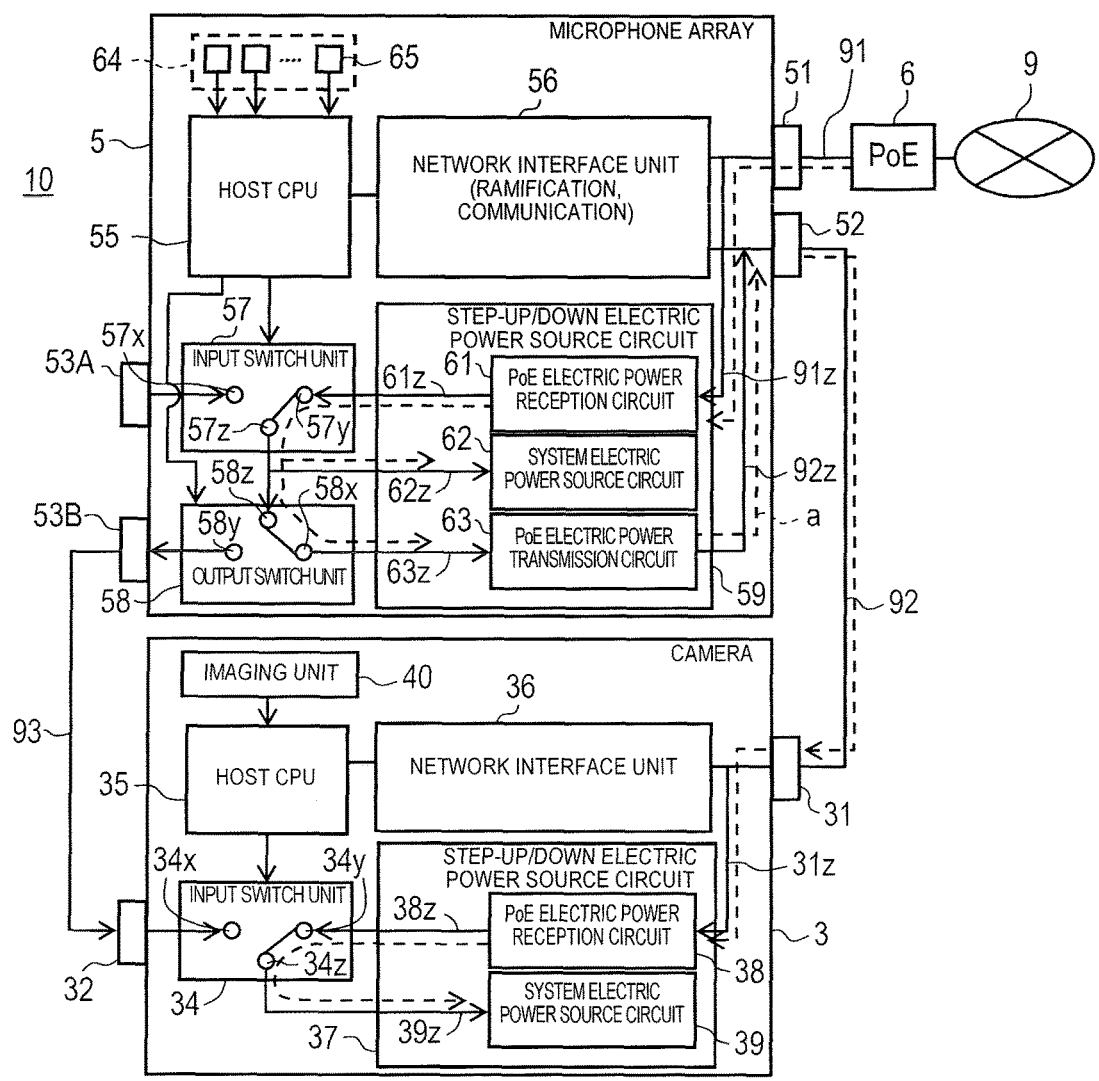
FIG. 5 is a diagram for describing a first switching operation.

The switching operation by monitoring system 10 that has the configuration described above is described. FIG. 5 is a diagram for describing a first switching operation. On the microphone array 5 side, host CPU 55 performs switching in such a manner that output terminal 57z of input switch unit 57 is connected to input terminal 57y of the PoE electric power reception circuit 61 side. Furthermore, host CPU 55 switches input terminal 58z of output switch unit 58 to output terminal 58x on the PoE electric power transmission circuit 63 side. On the other hand, on the camera 3, host CPU 35 switches output terminal 34z of input switch unit 34 to input terminal 34y on the PoE electric power reception circuit 38 side. A flow of electric power that is supplied is illustrated by a broken line a in the drawing.

In a case where such a first switching operation is performed, in microphone array 5, electric power is supplied from PoE apparatus 6 to PoE electric power reception circuit 61 through LAN cable 91, microphone LAN connector 51, and inner wiring 91z. The electric power that is stepped up or down in PoE electric power reception circuit 61 is supplied to system electric power supply circuit 62 through inner wiring 61z, input switch unit 57, output switch unit 58, and inner wiring 62z. System electric power supply circuit 62 generates and supplies electric power that is used in each unit of microphone array 5.

Furthermore, the electric power that is stepped down in PoE electric power reception circuit 61 is supplied to PoE electric power transmission circuit 63 through inner wiring 61z, input switch unit 57, output switch unit 58, and inner wiring 63z. The electric power that is stepped up in PoE electric power transmission circuit 63 is supplied to PoE electric power reception circuit 38 through inner wiring 92z, microphone LAN connector 52, LAN cable 92, camera LAN connector 31, and inner wiring 31z. The electric that is stepped up in PoE electric power reception circuit 38 is supplied to system power supply circuit 39 through inner wiring 38z, input switch unit 34, and inner wiring 39z. System power supply circuit 39 generates and supplies electric power that is used in each unit of camera 3.

In this manner, when the first switching operation is performed, any one of microphone array 5 and camera 3 receives electric power from PoE apparatus 6 for operation. More precisely, microphone array 5 receives electric power that is supplied from PoE apparatus 6, for operation, and transmits the electric power towards camera 3. Camera 3 receives the electric power that is supplied from PoE apparatus 6 through microphone array 5 and LAN cable 92, and operates, for operation.

Accordingly, a connection between microphone array 5 and camera 3 can be achieved using one short LAN cable 92 that links microphone LAN connector 52 and camera LAN connector 31. The electric power supply and the communication are performed using the one LAN cable 92.

At this point, the case where host CPU 55 drives input switch unit 57 and output switch unit 58 and host CPU 35 drives input switch unit 34 is described, but this switching is once performed at the time of work for later additional installation of microphone array 5 or work for initial installation of monitoring system 10. Therefore, the switching may be performed by the manual operation by the operator and the like, without be caused by the host CPU to do so. Because this is the same for the following switching operations, the description of this is omitted.

Figure 6:
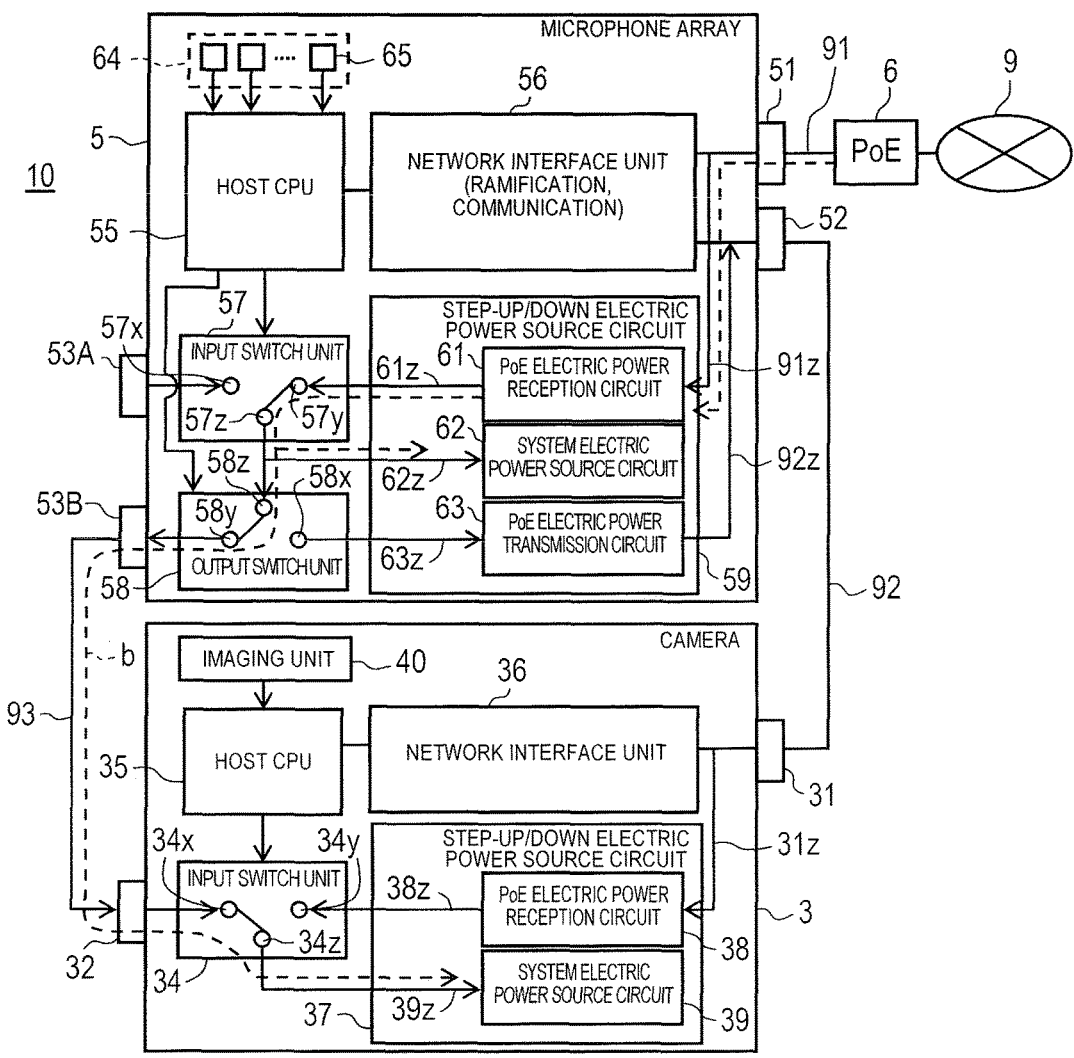
FIG. 6 is a diagram for describing a second switching operation.

FIG. 6 is a diagram for describing a second switching operation. A flow of electric power that is supplied is illustrated in a broken line b in the drawing. Reception of electric power by microphone array 5 from PoE apparatus 6 is the same in the first switching operation. In the second switching operation, host CPU 55 within microphone array 5 switches input terminal 58z of output switch unit 58 to output terminal 58y on the microphone DC connector 53B side. Furthermore, host CPU 35 within camera 3 switches output terminal 34z of input switch unit 34 to input terminal 34x on the camera DC connector 32 side.

In a case where such a second switching operation is performed, supply of electric power to system electric power supply circuit 62 of microphone array 5 is the same as in the first switching operation. Supply of electric power to camera 3 is performed as follows. Electric power that is stepped down in PoE electric power reception circuit 61 in microphone array 5 is sent to inner wiring 61z, input switch unit 57, output switch unit 58, microphone DC connector 53B, DC cable 93, and camera DC connector 32. Additionally, electric power that is input from camera DC connector 32 is supplied to system power supply circuit 39 through input switch unit 34 and inner wiring 39z.

In this manner, when the second switching operation is performed, reception of electric power by any one of microphone array 5 and camera 3 from PoE apparatus 6 for operation is the same as is the same case with the first operation. However, in the second switching operation, supply of electric power is performed using DC cable 93 that links microphone DC connector 53B and camera DC connector 32, without using LAN cable 92.

Accordingly, between microphone array 5 and camera 3, the communication is performed using LAN cable 92, and the supply of electric power is performed using DC cable 93. More precisely, in the connection between microphone array 5 and camera 3, because the communication and the supply of electric power are performed using different cables, two cables, that is, short LAN cable 92 and short DC cable 93 are needed. Furthermore, between microphone array 5 and camera 3, because DC electric power that is generated within microphone array 5, as is, is received in camera 3, conversion loss that results from PoE electric power transmission circuit 63 performing the step-up and transmitting electric power using LAN cable 92 does not occur.

Figure 7:
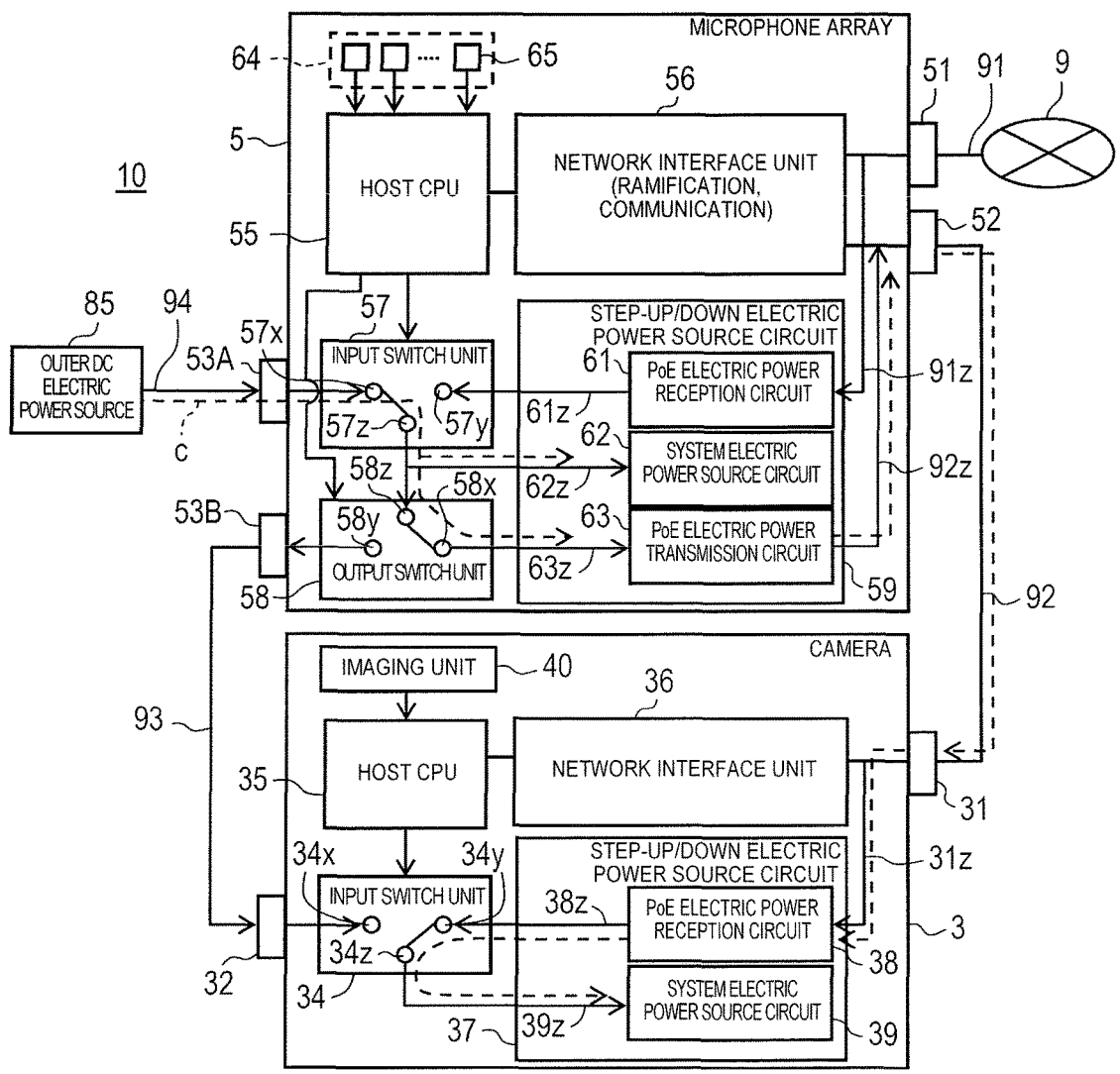
FIG. 7 is a diagram for describing a third switching operation.

FIG. 7 is a diagram for describing a third switching operation. The third switching operation is for a case where PoE apparatus 6 is not present. More precisely, a connection is directly made between microphone LAN connector 51 and network 9 using LAN cable 91.

On the microphone array 5 side, host CPU 55 performs the switching in such a manner that output terminal 57z of input switch unit 57 is connected to input terminal 57x on the microphone DC connector 53A side. Furthermore, host CPU 55 switches input terminal 58z of output switch unit 58 to output terminal 58x on the PoE electric power transmission circuit 63 side. On the other hand, on the camera 3 side, host CPU 35 switches output terminal 34z of input switch unit 34 to input terminal 34y on the PoE electric power reception circuit 38 side. A flow of electric power that is supplied is illustrated by a broken line c in the drawing.

In a case where such a third switching operation is performed, in microphone array 5, electric power is supplied from outer DC power supply 85 to system electric power supply circuit 62 through microphone DC connector 53A, input switch unit 57, and inner wiring 62z. Furthermore, the electric power that is input from microphone DC connector 53A is supplied to PoE electric power transmission circuit 63 through input switch unit 57, output switch unit 58, and inner wiring 63z. The electric power that is stepped up in PoE electric power transmission circuit 63 is supplied to camera 3 along the same pathway as in the first switching operation.

In this manner, when the third switching operation is performed, any one of microphone array 5 and camera 3 receives electric power from outer DC power supply 85 for operation. Furthermore, because instead of PoE apparatus 6, outer DC power supply 85 is already provided for camera 3, the connection between microphone array 5 and camera 3 can be achieved using one short LAN cable 92 that links microphone LAN connector 52 and camera LAN connector 31. The electric power supply and the communication are performed using the one LAN cable 92.

Figure 8:
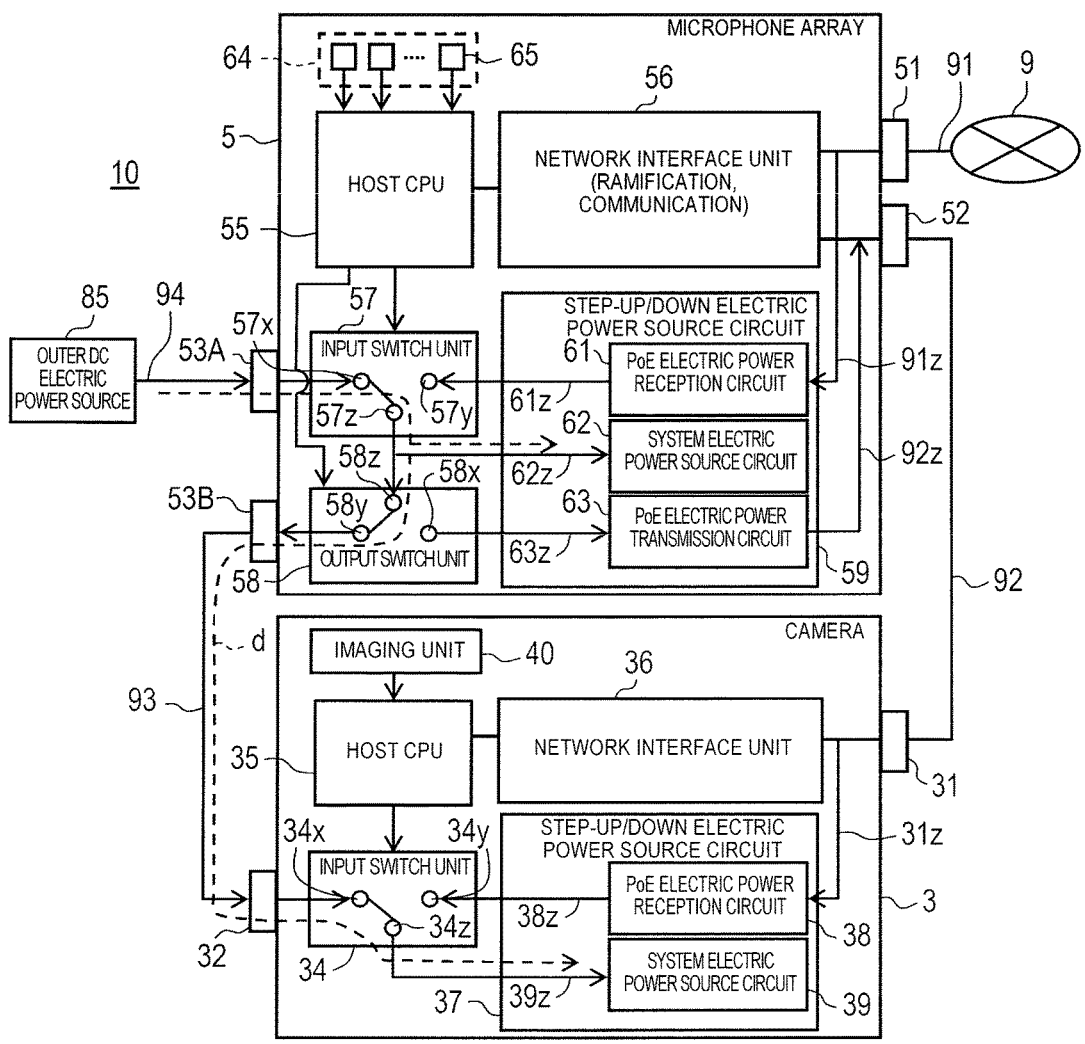
FIG. 8 is a diagram for describing a fourth switching operation.

FIG. 8 is a diagram for describing a fourth switching operation. The fourth switching operation is for the case where PoE apparatus 6 is not present, in the same as is the case with the third switching operation. The connection is directly made between microphone LAN connector 51 and network 9 using LAN cable 91. Furthermore, LAN cable 92 that links microphone LAN connector 52 and camera LAN connector 31 can be dedicated for the communication.

On the microphone array 5 side, host CPU 55 performs the switching in such a manner that output terminal 57z of input switch unit 57 is connected to input terminal 57x on the microphone DC connector 53A side. Furthermore, host CPU 55 switches input terminal 58z of output switch unit 58 to output terminal 58y on microphone DC connector 53B side. On the other hand, on the camera 3 side, host CPU 35 switches output terminal 34z of input switch unit 34 to input terminal 34x on the camera DC connector 32 side. A flow of electric power that is supplied is illustrated by a broken line d in the drawing.

In a case where such a fourth switching operation is performed, in microphone array 5, electric power is supplied from outer DC power supply 85 to system electric power supply circuit 62 through microphone DC connector 53A, input switch unit 57, and inner wiring 62z. Furthermore, the electric power that is input from microphone DC connector 53A is supplied to system power supply circuit 39 through input switch unit 57, output switch unit 58, microphone DC connector 53B, DC cable 93, camera DC connector 32 and input switch unit 34.

Accordingly, when the fourth switching operation is performed, the connection between microphone array 5 and camera 3 is made using two cables, that is, LAN cable 92 dedicated for the communication and DC cable 93 dedicated for the supply of electric power. Furthermore, cables are divided into one for the communication and the other for the supply of electric power, and thus a connection situation is easy to recognize. Furthermore, between microphone array 5 and camera 3, because DC electric power that is generated within microphone array 5, as is, is received in camera 3, conversion loss that results from PoE electric power transmission circuit 63 performing the step-up and transmitting electric power using LAN cable 92 does not occur.

As described above, in the monitoring system according to the first embodiment, in a case where camera 3 is already attached to the ceiling, later, microphone array 5 can be additionally installed, using LAN cable 91, as is, that is laid up to camera 3. Therefore, when later, microphone array 5 is additionally installed, work for wiring, such as adding new LAN cable, is not needed.

For example, in the case of the first switching operation, the connection is achieved by adding only one short LAN cable 92. In the case of the second switching operation, the connection is achieved by two cables, that is, short LAN cable 92 and short DC cable 93. In the case of the third switching operation, because instead of PoE apparatus 6, outer DC power supply 85 is already provided for camera 3, when an output destination of outer DC power supply 85 is only changed from the camera to the microphone, the connection is achieved, by adding only one short LAN cable 92, as is the case with the first switching operation. In the case of the fourth switching operation, because when compared with the third switching operation, the supply of electric power is performed using DC cable 93 that links microphone DC connector 53B and camera DC connector 32 without using LAN cable 92, the connection is achieved by adding only two cables, that is, short LAN cable 92 and short DC cable 93, as is the case with the second switching operation.

In this manner, an amount of work for installation when setting up the monitoring system by combining the microphone array and the camera can be reduced. More precisely, later, a microphone array can be additionally installed, using the wiring, as is, such as the LAN cable that is already used for the existing camera. Therefore, work for installation for additional wiring is unnecessary, and thus an amount of work for installation can be reduced. Furthermore, a length of a LAN cable that is to be added can be shortened. Furthermore, because the number of LAN cables is small and the length of the LAN cable is shortened, even in the case of work for new installation of a monitoring system, an amount of work for installation can be decreased.

Furthermore, because LAN cable 92 that is added is accommodated into space 16 that is surrounded by the inner side of opening 5r that is formed in case 5z of microphone array 5, the rear side of case 3z of camera 3, and ceiling 18, LAN cable 92 is not seen from the outside, and a beautiful sight of monitoring system 10 can be prevented from being spoiled by LAN cable 92. Furthermore, camera 3 can be attached in such a manner that the length of LAN cable 92 that is added is set to be long and thus the operator connects camera 3 and microphone array 5 personally, using LAN cable 92 and causes LAN cable 92 to be accommodated into space 16 in the rear side of camera 3. As a result, efficiency of work is increased.

Furthermore, case 5z of microphone array 5 is attached to ceiling attachment metal fitting 7 in such a manner that case 5z of microphone array 5 externally fits case 3z of camera 3, and thus it is possible that a plurality of microphone units 65 of microphone array 5 and image capturing unit 40 of camera 3 are arranged to be aligned with a surface parallel to the surface of the ceiling.

In the embodiment described above, the function (network interface unit 56) of causing the network to ramify, or the function (PoE electric power transmission circuit 63 or the like) of distributing a power resource is provided to the microphone array side, but these functions may be provided to the camera side, in which case the same monitoring system can be realized. This is the same for the following embodiments.

Second Embodiment

In the first embodiment described above, the case is described where microphone array 5 that has ring-type case 5z is attached to ceiling attachment metal fitting 7 in such a manner as to externally fit camera 3 that has disc-shaped case 3z, but in a second embodiment, a case is described where the microphone array is installed on the ceiling in a state of being positioned a distance away from the camera.

Figure 9A:
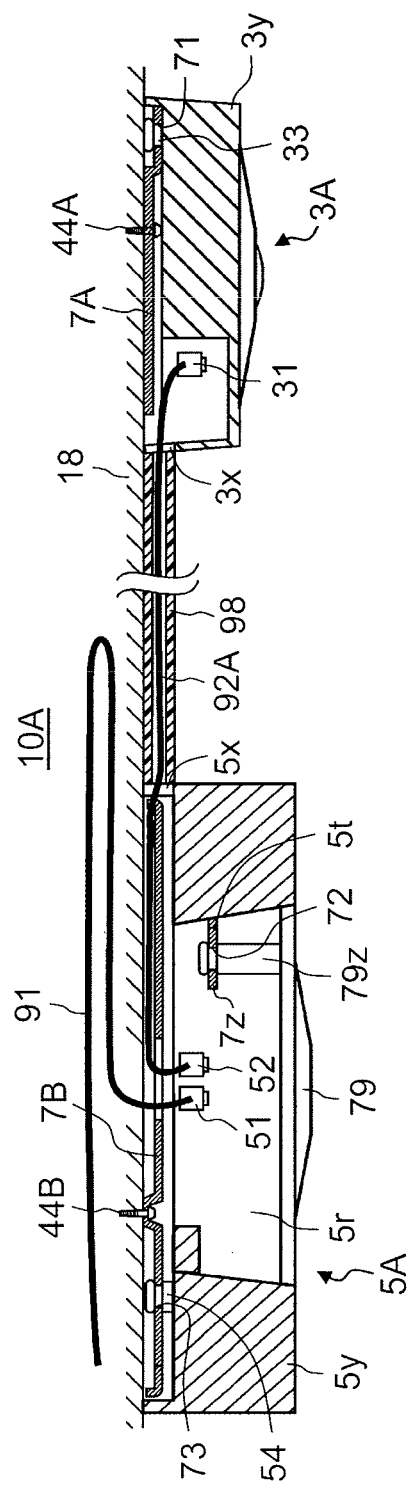
FIG. 9A is a diagram illustrating an installed state of a camera and a microphone array according to a second embodiment, which are installed on a ceiling.
Figure 9B:
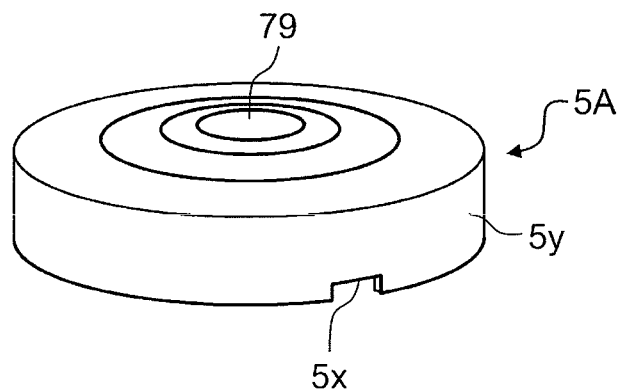
FIG. 9B is a perspective diagram illustrating an external appearance of the microphone array.

FIGS. 9A and 9B are diagrams illustrating a configuration of monitoring system 10A according to the second embodiment. FIG. 9A is a diagram illustrating an installed state of camera 3A and microphone array 5A that are installed on ceiling 18. FIG. 9B is a perspective diagram illustrating an external appearance of microphone array 5A.

Monitoring system 10A according to the second embodiment has almost the same configuration as monitoring system 10 according to the first embodiment. Constituent elements that are the same as those in the first embodiment, which are described above, are given the same reference numerals, and descriptions thereof are omitted.

Ceiling attachment metal fitting 7A for attaching camera 3A is fixed by ceiling fixation pint 44A to ceiling 18. Furthermore, ceiling attachment metal fitting 7B for attaching microphone array 5A is fixed by ceiling fixation pin 44B to ceiling 18 in a state of being positioned a distance away from ceiling attachment metal fitting 7A.

Ceiling attachment metal fitting 7A has almost the same structure as an inner portion of ceiling attachment metal fitting 7 that is described in the first embodiment. Therefore, fixation pin 33 that protrudes from the bottom surface of camera 3A is inserted into engagement hole 71 that is formed in ceiling attachment metal fitting 7A, and the camera 3A is twisted and thus is fixed to ceiling attachment metal fitting 7A.

Furthermore, ceiling attachment metal fitting 7B has almost the same structure as an outer portion of ceiling attachment metal fitting 7 that is described in the first embodiment. Therefore, fixation pin 54 that protrudes from the bottom surface of microphone array 5A is inserted into engagement hole 73 that is informed in ceiling attachment metal fitting 7B, and microphone array 5A is twisted and thus is fixed to ceiling attachment metal fitting 7B.

Furthermore, because microphone array 5A has ring-type case 5y, cover 79 is embedded into case 5y in such a manner as to cover opening 5r that is formed in case 5y. Cover 79 has fixation pin 79z as is the case with case 5y of microphone array 5A, fixation pin 79z is inserted into engagement hole 72 that is formed in locking piece 5t which protrudes as one portion of microphone array 5A, cover 79 is twisted, and thus is fixed to ceiling attachment metal fitting 7B.

Cable outlet (notch) 5x for pulling out LAN cable 92A is formed in a side surface of case 5y of microphone array 5A. In the same manner, cable outlet 3x for pulling out LAN cable 92A is formed in a side surface of case 3y of camera 3A. LAN cable 92A is laid in such a manner that LAN cable 92A passes through cable outlet 5x and cable outlet 3x and links microphone LAN connector 52 which is provided into opening 5r in microphone array 5A and camera LAN connector 31 which is provided on a rear side of camera 3A. Furthermore, moor 98 that accommodates LAN cable 92A is attached to ceiling 18. LAN cable 92A that is laid on the front side of ceiling 18 is hidden by being accommodated into moor 98. Thus, LAN cable 92A is not seen from the outside. Furthermore, LAN cable 92A is laid in a straight line, and thus can be installed to have the shortest length.

In this manner, in the second embodiment, one end side of LAN cable 92A is accommodated into opening 5r that is formed in case 5y of microphone array 5A, and LAN cable 92A is pulled out of cable outlet 5x that is formed in case 5y. Furthermore, the other end side of LAN cable 92A is accommodated on a rear side of case 3y of camera 3A, and LAN cable 92A is pulled out of cable outlet 3x that is formed in case 3y.

Accordingly, in the case of the later work for adding a microphone array to the existing camera, later, a microphone array can be additionally installed, using the wiring, as is, such as the LAN cable that is already used for the existing camera, as is the case with the first embodiment describe above. Therefore, the work for installation for additional wiring is unnecessary, such as installing one more long LAN cable, and thus the amount of work for installation can be reduced.

Furthermore, LAN cable 92A that links microphone LAN connector 52 that is provided into opening 5r in microphone array 5A, and camera LAN connector 31 that is provided on the rear side of camera 3A can extend along the surface of ceiling 18 through cable outlet 5x and cable outlet 3x, thereby improving the work efficiency of extension.

Furthermore, in a case where microphone array 5A and camera 3A are installed on the surface of ceiling 18, the degree of freedom for installation is increased. More precisely, microphone array 5A may not be installed in such a manner that microphone array 5A and camera 3A have the same central axis e, and it is possible that monitoring system 10A suitable for a place that is a monitoring target is installed.

Third Embodiment

In the first and second embodiments describe above, the monitoring system that is configured with the microphone array and the camera is installed on the surface of the ceiling, but in a third embodiment, a ceiling-embedded monitoring system is described.

Figure 10A:
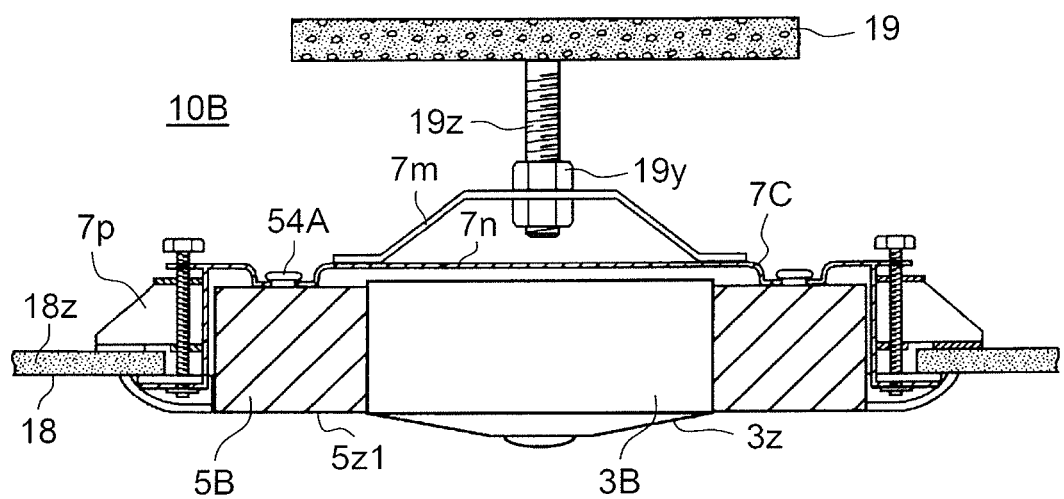
FIG. 10A is a cross-sectional diagram illustrating an attachment structure of a ceiling-embedded monitoring system according to a third embodiment.

FIG. 10A is a cross-sectional diagram illustrating an attachment structure of ceiling-embedded monitoring system 10B according to the third embodiment. Concrete ceiling building frame 19, which is one portion of a building, is provided on the rear side of ceiling 18. Fixation bolt 19z is fixed in such a manner that fixation bolt 19z protrudes from ceiling building frame 19 toward the ceiling 18 side. As will be described below, plate-shaped protrusion member 7m that is one portion of attachment metal fitting 7C is inserted between a pair of nuts 19y that are engaged with fixation bolt 19z, and thus attachment metal fitting 7C is fixed by fixation bolt 19z in a suspended state.

Figure 11:
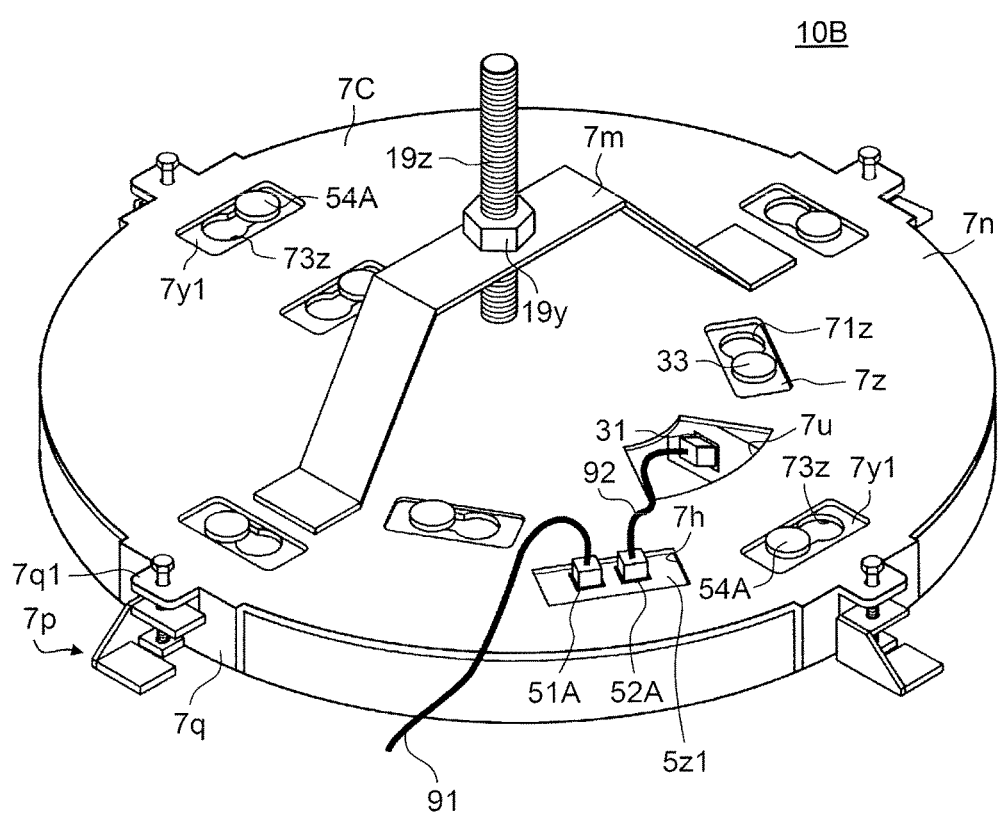
FIG. 11 is a perspective diagram illustrating a rear side of a monitoring system that is embedded into the ceiling.

FIG. 11 is a perspective diagram illustrating the rear side of monitoring system 10B that is embedded into ceiling 18. Monitoring system 10B is attached to attachment metal fitting 7C. Attachment metal fitting 7C is made up of plate 7n that has an approximately round shape, plate-shaped protrusion member 7m that is bent in such a manner as to protrude from a surface of plate 7n, and support member 7p that will be described below.

Locking piece 7z for fixing camera 3B, which protrudes in the direction of central axis e, is formed at concentric three points on a surface of plate 7n, as is the case with the first embodiment described above. Additionally, locking piece 7y1 for fixing microphone array 5B, which is one step lower than locking piece 7z and protrudes in the direction of central axis e, is formed at four points on the surface of plate 7n, which are in the cross direction on a concentric circle that is larger than the concentric circle on which locking pieces 7z are formed, as is the case with the first embodiment described above.

Engagement hole 71z that is engaged with fixation pin 33 which is provided on the bottom surface of camera 3B is formed in locking piece 7z, as is the case with the first embodiment described above. In the same manner, engagement hole 73z that is engaged with fixation pin 54A that is provided on the bottom surface of microphone array 5B is formed in locking piece 7y1.

Furthermore, opening 7u is formed in plate 7n in such a manner that camera LAN connector 31 is exposed. Additionally, opening 7h is formed in plate 7n in such a manner that microphone LAN connectors 51A and 52A that are arranged on a rear surface of case 5z1 of microphone array 5B are exposed.

Figure 10B:
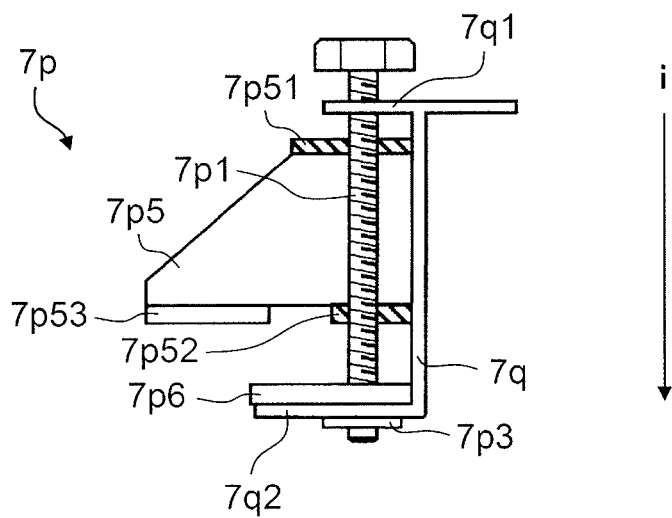
FIG. 10B is a cross-sectional diagram illustrating a structure of a support member.

Additionally, approximately shaped vertical member 7q that is one portion of support member 7p is formed at four points on the rim of plate 7n that has an approximately round shape, which are in the cross direction, in such a manner that vertical member 7q is bent. FIG. 10B is a cross-sectional diagram illustrating a structure of support member 7p.

Support member 7p has bolt 7p1 that passes through a hole that is formed in each of protrusion portions 7q1 and 7q2 of vertical member 7q, and C ring 7p3 for preventing locking of bolt 7p1 that protrudes from the hole which is formed in protrusion portion 7q2. The hole that is formed in each of protrusion portions 7q1 and 7q2 is a through hole (a so-called clearance hole) through which bolt 7p1 passes. Furthermore, support member 7p has pressing plate 7p5 for inserting ceiling plate 18z, into which bolt 7p1 is screwed, and reception ring 7p6.

Pressing plate 7p5 is an approximately C-shaped member that results from connecting internally threaded upper plate 7p51, into which bolt 7p1 is screwed, internally threaded lower plate 7p52, into which bolt 7p1 is screwed, and pressure plate 7p53 that presses ceiling plate 18z along with protrusion portion 7q2 as a reception ring. Instead of lower plate 7p52 being internally threaded, a through hole through which bolt 7p1 passes may be formed in lower plate 7p52.

In support member 7p that has this structure, with ceiling plate 18z being interposed between protrusion portion 7q2 as the reception ring and pressure plate 7p53, a head portion of bolt 7p1 is rotated in the direction of an arrow i, and thus pressing plate 7p5 into which bolt 7p1 is screwed is moved to the reception ring 7p6 side. Accordingly, attachment metal fitting 7C including support member 7p is fixed to ceiling plate 18z that is interposed between protrusion portion 7q2 as the reception ring and pressure plate 7p53.

In this manner, attachment metal fitting 7C is fixed to ceiling building frame 19 by fixation bolt 19z by which protrusion member 7m is inserted, in a suspended state, and is fixed to ceiling plate 18z by support member 7p in an inserted state.

In the case of the ceiling-embedded monitoring system 10B, unlike in the first and second embodiments described above, case 5z1 of microphone array 5B has approximately the same thickness as case 3z of camera 3B. That is, because microphone LAN connectors 51A and 51B are arranged on a rear side of case 5z1 of microphone array 5B, opening 5r that produces space 16 in such a manner that LAN cable 92 is accommodated does not even need to be formed. Because of this, the thickness of case 5z1 can be decreased.

The attachment of case 5z1 of microphone array 5B and case 3z of camera 3B to attachment metal fitting is the same as that in the first embodiment described above. That is, fixation pin 33 that protrudes from the bottom surface of camera 3B is inserted into engagement hole 71z that is formed in attachment metal fitting 7C, and the camera 3B is twisted and thus is fixed to attachment metal fitting 7C. Furthermore, when it comes to microphone array 5B, fixation pin 54A is inserted into engagement hole 73z that is formed in locking piece 7y1, and microphone array 5B is twisted and thus is fixed to attachment metal fitting 7C.

Monitoring system 10B that is attached to attachment metal fitting 7C is embedded into ceiling 18 securely in a stable state without wobbling.

In this manner, in monitoring system 10B according to the third embodiment, as is the case with the first embodiment described above, later, a microphone array can be additionally installed, using the wiring, as is, such as the LAN cable that is already used for the existing camera. Therefore, the work for installation for additional wiring is unnecessary, and thus an amount of work for installation can be reduced.

Furthermore, in the case of ceiling-embedded microphone array 5B, because microphone LAN connectors 51A and 52A are arranged on a rear surface of case 5z, opening 5r that produces space 16 that accommodates LAN cable 92 does not even need to be formed behind case 5z1 of ceiling-embedded microphone array 5B. Because of this, the thickness of microphone array 5B can be decreased, and miniaturization of microphone array 5B is achieved.

Furthermore, because a portion of ceiling 18, from which monitoring system 10B is exposed, is decreased, a beautiful sight of ceiling 18 is not spoiled and ceiling 18 looks nice. Furthermore, mental pressure to install monitoring system 10B is reduced.

Fourth Embodiment

In the first, second, and third embodiments described, the monitoring system that results from combining the omnidirectional camera and the microphone array are described, but a monitoring system according to a fourth embodiment represents a case where a PTZ camera and the microphone array are combined.

Figure 12A:
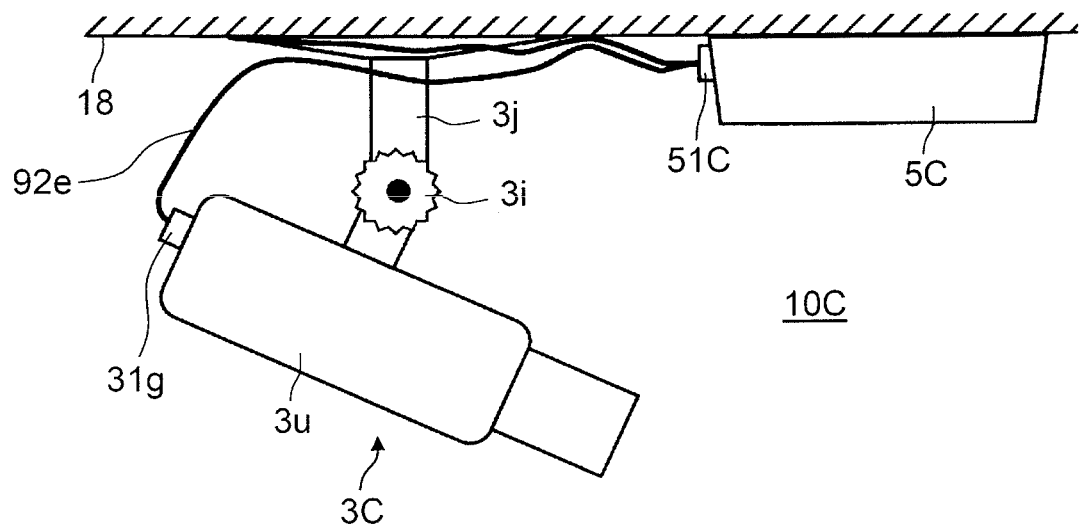
FIG. 12A is a diagram illustrating an installed state of a monitoring system according to a fourth embodiment, which is installed on the ceiling.
Figure 12B:
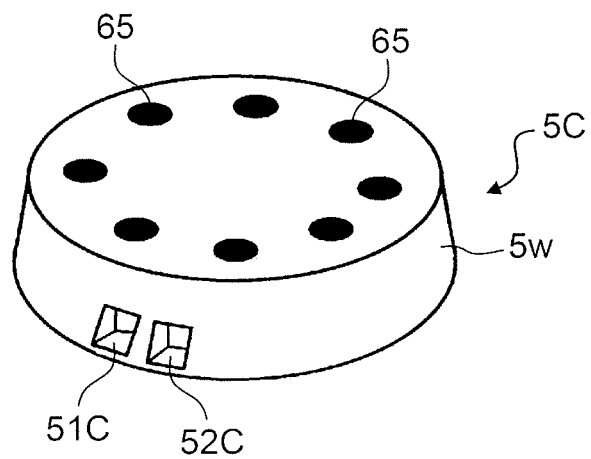
FIG. 12B is a diagram illustrating an external appearance of a microphone array according to the fourth embodiment.
Figure 13A:
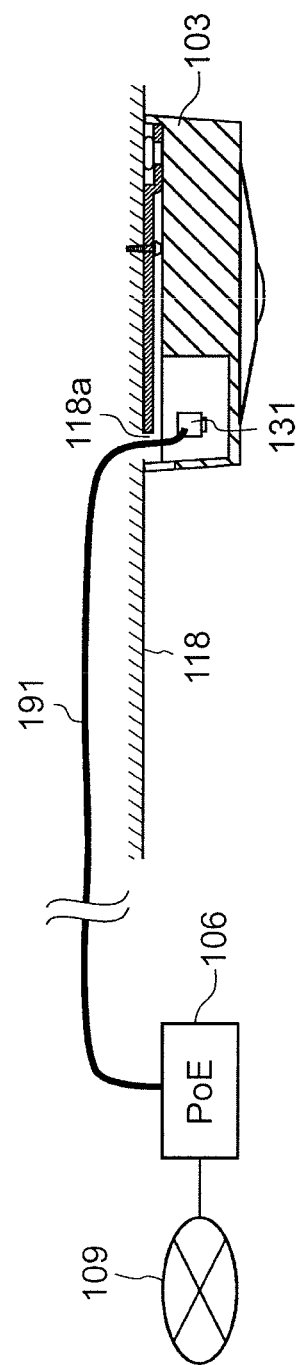
FIG. 13A is a diagram for describing later additional work in a case where a microphone array is attached to the camera that is already installed, on which the existing LAN cable is laid.
Figure 13B:
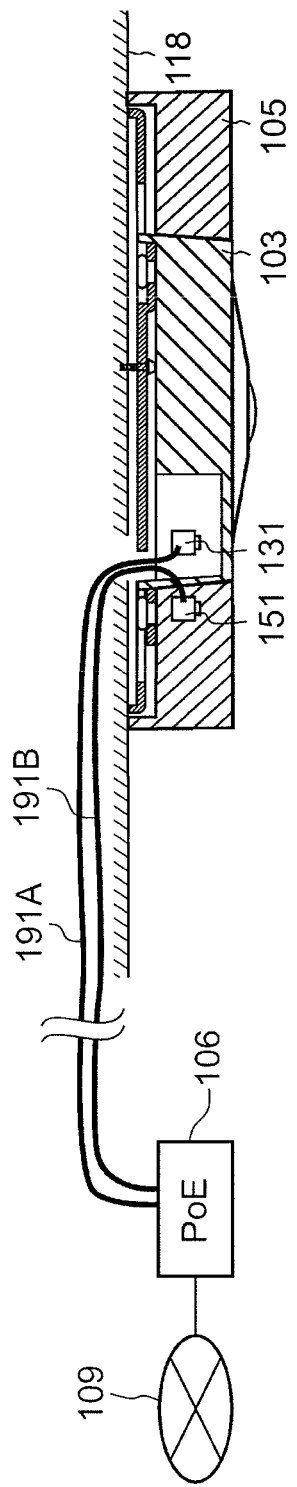
FIG. 13B is a diagram for describing the later additional work in the case where a microphone array is attached to the camera that is already installed, on which the existing LAN cable is laid.
Figure 13C:
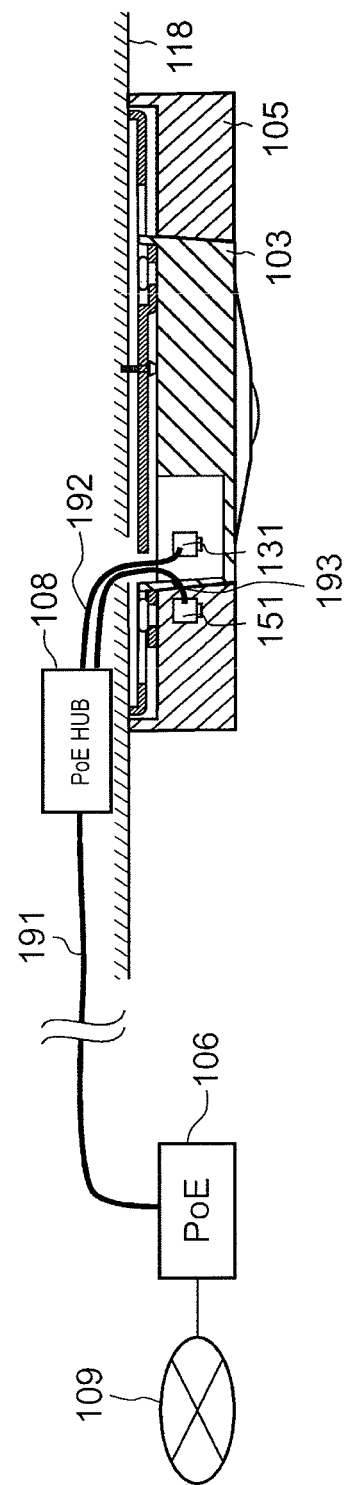
FIG. 13C is a diagram for describing the later additional work in the case where a microphone array is attached to the camera that is already installed, on which the existing LAN cable is laid.
Figure 14A:
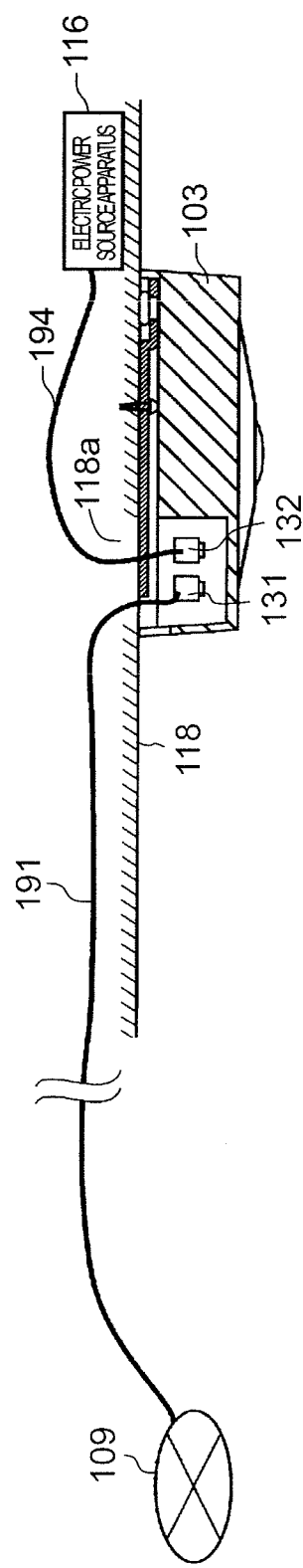
FIG. 14A is a diagram for describing later additional work in a case where a microphone array is attached to the camera that is already installed, on which the existing LAN cable and DC cable are laid.

FIGS. 12A and 12B are diagrams, each illustrating a configuration of monitoring system 10C according to the fourth embodiment. FIG. 12A is a diagram illustrating an installed state of monitoring system 10C that is installed on ceiling 18 according to the fourth embodiment. Camera 3C has pole 3j that is fixed to ceiling 18, camera case 3u that is connected to pole 3j, and drive unit 3i that turns camera case 3u freely, and is a PTZ camera that is freely moved in the panning or tilting direction according to the image capture range and freely zooms in and out (enlargement and reduction). Camera LAN connector 31g is provided on a rear surface of camera case 3u.

Furthermore, microphone array 5C is installed on ceiling 18 in a state of being positioned a short distance away from camera 3C. FIG. 12B is a diagram illustrating an external appearance of microphone array 5C according to the fourth embodiment. Microphone LAN connectors 51C and 52C are arranged adjacent to each other on a side surface of case 5w of microphone array 5C. Furthermore, a plurality of microphone units 65 (8 microphone units, here) are concentrically arranged on a front surface (a surface that is opposite to the ceiling) of microphone array 5C. LAN cable 92e is connected between camera LAN connector 31g and microphone LAN connector 52C.

In monitoring system 10C according to the fourth embodiment, in the case of the later work for adding a microphone array to the existing camera, later, a microphone array can be additionally installed, using the wiring, as is, such as the LAN cable that is already used for the existing camera, as is the case with the first embodiment describe above. Therefore, the work for installation for additional wiring is unnecessary, and thus an amount of work for installation can be reduced.

Furthermore, because microphone LAN connectors 51C and 52C are arranged adjacent to each other on the side surface of case 5w of microphone array 5C, in a case where LAN cable 92e is laid in such a manner that LAN cable 92e extends along ceiling 18 without passing through a space between the roof and the ceiling, the length of LAN cable can be decreased. Thus, the work efficiency of laying the LAN cable can be improved.

Furthermore, the PTZ camera and the microphone array are combined, and thus the monitoring can be performed in a state where image data that is image-captured by the PTZ camera in a prescribed direction and voice data that is sound-picked up by the microphone array are associated.

At this point, as the monitoring system, the case of the combination with the PTZ camera is described, but combination with a fixation camera in which an image capture range is fixed in a specific direction may be possible.

Fifth Embodiment

Figure 15:
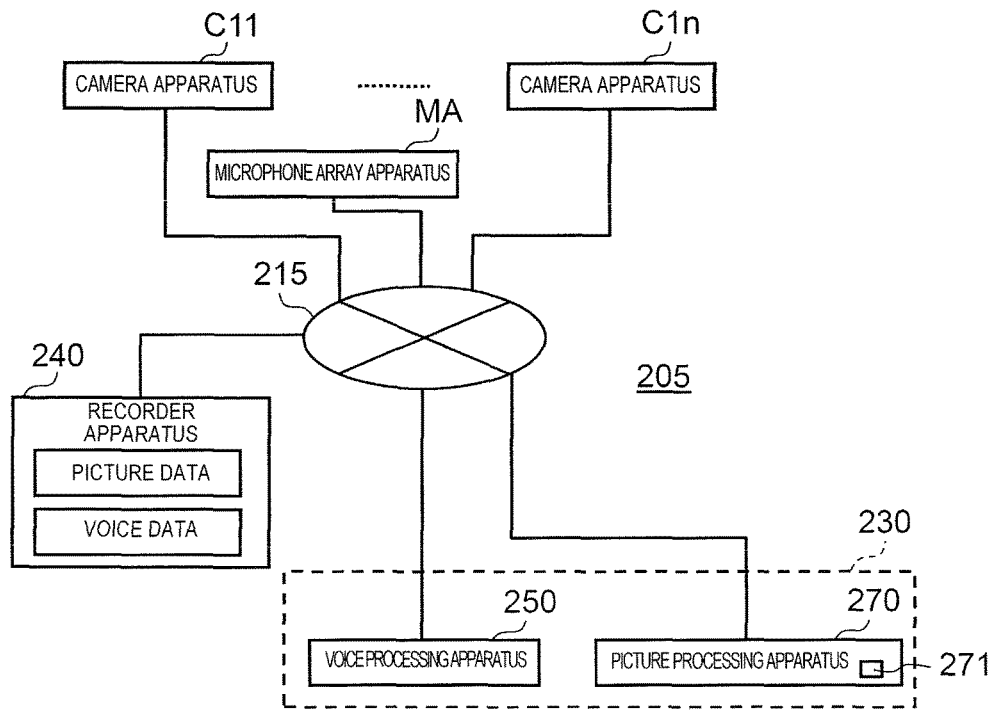
FIG. 15 is a block diagram illustrating a configuration of a monitoring system according to a fifth embodiment.

FIG. 15 is a block diagram illustrating a configuration of monitoring system 205 according to a fifth embodiment. Monitoring system 205, for example, has a configuration in which a plurality of camera apparatuses C11 to C1n for monitoring, which are installed in a store such as a convenience store, microphone array apparatus MA, recorder apparatus 240, and Personal Computer (PC) 230 are connected to one another through network 215.

Each of camera apparatuses C11 to C1n is a fixation camera that has a fixed view angle, and image-captures a picture (which is hereinafter defined as including a still image and a moving image) of the vicinity of a predetermined position that is an image capture target area. n is a positive value that is equivalent to an identification number of the camera apparatus. Because camera apparatuses C11 to C1n are different only in image capture target area from each other and any one has the same configuration, a representative example, a configuration and operation of camera apparatus C11 are described.

Furthermore, in a case where a camera apparatus that is different in specification from the camera apparatus C11, such a camera apparatus is described on each occasion. The camera apparatus C11 transfers data (picture data) on a picture that is image-captured to PC 230 through network 215, and records the data in recorder apparatus 240. Cameras C11 to C1n, for example, may employ the same configuration as any one of cameras 3, 3A, 3B, and 3C according to the first to fourth embodiments.

Microphone array apparatus MA is installed, for example, on a ceiling within store 210 (refer to FIG. 19), and a plurality of microphones M1 to Mn (refer to FIG. 17) (for example, eight microphones) are arranged on a concentric circle to face downward. Thus, it is possible that voice within the store is sound-picked up. Microphone array apparatus MA sound-picks up voice in the vicinity of the image capture target area using each of microphones M1 to Mn, transmits the data (voice data) on the voice that is sound-picked up by each of microphones M1 to Mn, to PC 230 through network 215, and records the data on the voice in recorder apparatus 240. Each of microphones M1 to Mn may be a non-directional microphone, a bidirectional microphone, a unidirectional microphone, or a sharply directional microphone. Microphone array apparatus MA, for example, may employ the same configuration as any one of microphone arrays 5, 5A, 5B, and 5C according to the first to fourth embodiments.

Recorder apparatus 240 is configured to include a control unit (not illustrated) for controlling processing, such as recording data, and a recording unit (not illustrated) for storing picture data and the voice data. Recorder apparatus 240 records the picture data that is image-captured by each of camera apparatuses C11 to C1n, and the voice data that is sound-picked up by microphone array apparatus MA, in a state of being associated with each other.

PC 230 has a configuration in which the picture that is image-captured by each of camera apparatus C11 to C1n and the voice that is sound-picked up in microphone array apparatus MA are monitored, and in which voice processing apparatus 250 and picture processing apparatus 270 are included.

Figure 16:
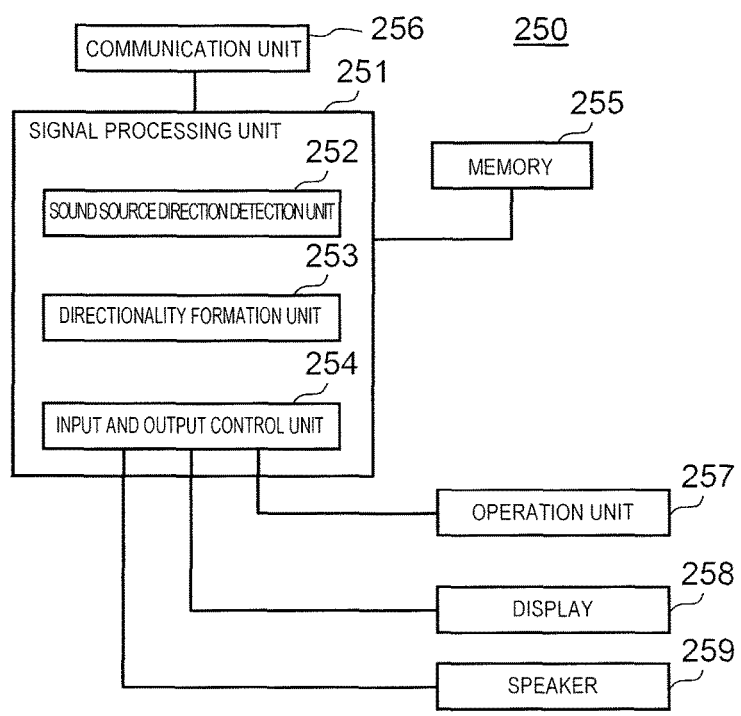
FIG. 16 is a block diagram illustrating a configuration of a voice processing apparatus.

FIG. 16 is a block diagram illustrating a configuration of voice processing apparatus 250. voice processing apparatus 250 has signal processing unit 251, memory 255, communication unit 256, operation unit 257, display 258, and speaker 259. Through network 215, communication unit 256 receives packet PKT (refer to FIG. 18) that is transmitted microphone array apparatus MA or recorder apparatus 240, outputs the received packet PKT to signal processing unit 251, and transmits preset information (refer to FIG. 23) that is generated in signal processing unit 251, to microphone array apparatus MA. Memory 255 is configured with, for example, a Random Access Memory (RAM), and functions as a work memory at the time of operation of each unit of voice processing apparatus 250. Data that is necessary at the time of the operation of each unit of voice processing apparatus 250 is stored in memory 255.

Signal processing unit 251 is configured with, for example, a Central Processing Unit (CPU), a Micro Processing Unit (MPU), or a Digital Signal Processor (DSP), has sound source direction detection unit 252, directionality formation unit 253, and input and output control unit 254, and performs control processing for generally managing operation of each unit of PC 230, input and output processing of data between each unit, data arithmetic operation (calculation) processing, and data storing processing.

sound source direction detection unit 252 estimates in which direction a sound source from which the voice that is sound-picked up in microphone array apparatus MA comes is positioned. In the present embodiment, the direction of the sound source is assumed to be the center of microphone array apparatus MA, is expressed as a horizontal angle of θ and a vertical angle of φ (refer to FIG. 20), and is estimated, for example, using a sound volume. The horizontal angle of θ is an angle within a horizontal plane (a X-Y plane) in an actual space of which an origin is assumed to the center of microphone array apparatus MA, and the vertical angle φ is an inclination with respect to the Z-axis that passes through the center of microphone array apparatus MA. For example, in a case where the sound source is below microphone array apparatus MA, the vertical angle of φ is detected as a small value.

Furthermore, in a case where, in order to perform preset processing that will be described below, voice is caused to be generated, a method of not only simply specifying a sound volume, but also specifying a sound generation place (the direction of the sound source) from a sound characteristic is effective. When it comes to the method of causing sound to have its own characteristic, for example, a sinusoidal wave of which a frequency is fixed, a sinusoidal wave of which a frequency changes with a fixed periodicity, white noise that switches between ON and OFF with a fixed periodicity, a registration-completed uttered sentence, and the like are output from speaker 259, and thus the sound that has a characteristic is obtained. Accordingly, even in a case where the preset processing is performed at a noisy place (for example, inside of a room where interior finish work is in progress, or in a shopping center), sound source direction detection unit 252 can specify sound that is caused to have a characteristic, among pieces of voice that are sound-picked up in microphone array apparatus MA. Furthermore, even in a case where the preset processing is performed at silent night and voice is caused to be generated, although a sound volume is small, sound source direction detection unit 252 can specify sound that is caused to have a characteristic, among pieces of voice that are sound-picked up in microphone array apparatus MA.

Furthermore, as the method of specifying the direction of the sound source that causes, sound that is caused to have a characteristic, to be generated, there are two methods that follow. As a first method, sound source direction detection unit 252 performs sound characteristic analysis sequentially on pieces of voice that are sound-picked up in microphone array apparatus MA, starting from a place from which a high sound volume comes, and determines that a direction of sound which is consistent in characteristic is the direction of the sound source. As a second method, sound source direction detection unit 252 divides the image capture target area into areas, searches each area (which is also referred to a division area) that results from the division, for a sound characteristic, and determines that a direction of the division area which is consistent in characteristic is the direction of the sound source. As the second method, because sound source direction detection unit 252 takes in the voice data at a fixed sound pickup time, and then searches for the sound characteristic, this has no relation with the sound volume, and a low sound volume is sufficient. Therefore, without bothering people in the neighborhood, even in a noisy place, sound that is caused to have a characteristic can be specified. As a third method, it is also possible that it is determined that there is a cross correlation with a generation signal. As will be described below, at the time of the preset processing, as examples of voice that is voice-generated from the sound source, voice that is generated by a human being, sound that is generated by pressing a buzzer, sound that is output from a speaker, and the like are given.

Directionality formation unit 253 adds up pieces of voice data that are sound-picked up by microphones M1 to Mn by performing directionality control processing of voice data, using the voice data that is transferred directly from microphone array apparatus MA or the voice data that is recorded in recorder apparatus 240, and generates voice data that forms the directionality to a specific direction, in order to emphasize (amplify) voice (a sound volume level) from a position of each of microphones M1 to Mn of microphone array apparatus MA to a specific direction. The specific direction is a direction (which is also referred to as a pointing direction) from microphone array apparatus MA toward a position in a real space, which corresponds to a position that is designated in operation unit 257. A technology relating to the directionality control processing of the voice data for forming the direction of the voice that is sound-picked up by microphone array apparatus MA is a known technology as disclosed, for example, in Japanese Patent Unexamined Publication No. 2014-143678 (PTL 1 described above) and the like.

Input and output control unit 254 controls input and output of various pieces of data from operation unit 257 and to display 258 and speaker 259. Operation unit 257, for example, is configured with a touch panel or a touch pad which is positioned in a manner that corresponds to a screen of display 258, and on which an input operation by a user or a stylus pen is capable of being performed. In response to a user's operation, operation unit 257 outputs pieces of data on one or more designation points (coordinates) where an emphasis on (amplification of) the sound volume level of the voice data is desirable, to signal processing unit 251. Operation unit 257 may be configured with a pointing device, such as a mouse or a keyboard.

Voice map 265 indicating a position of the sound source that is estimated in sound source direction detection unit 252 is displayed on display 258. Speaker 259 outputs the voice data that is sound-picked up by microphone array apparatus MA and is transferred through network 215 or the voice data that is recorded in recorder apparatus 240, or voice data on which processing for emphasis in a specific direction by directionality formation unit 253 is performed based on the voice data that is sound-picked and transferred.

On the other hand, picture processing apparatus 270 operates independently without operating in conjunction with voice processing apparatus 250, and, according to a user's operational instruction, performs control that display the picture data which is image-captured by each of fixation camera apparatuses C11 to C1n, on display 258. More precisely, when the user selects a camera apparatus to be used, picture processing apparatus 270 displays a picture that is captured by the selected camera apparatus on equipped camera monitor 271.

Figure 17:
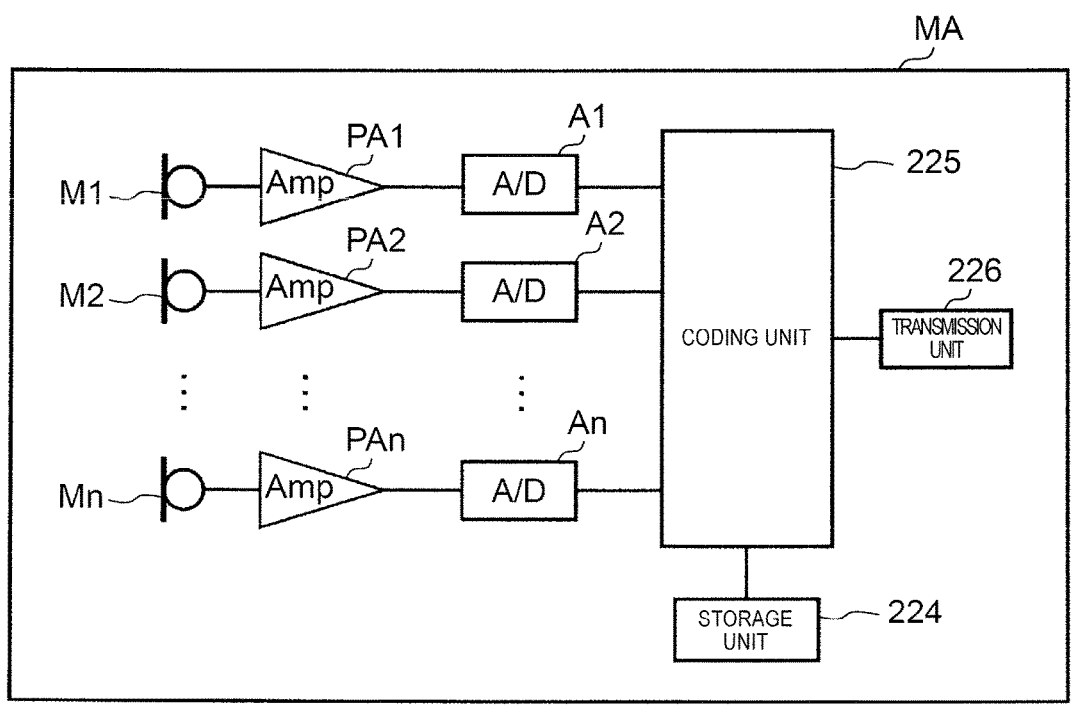
FIG. 17 is a block diagram illustrating a configuration of a microphone array apparatus.

FIG. 17 is a block diagram illustrating microphone array apparatus MA. Microphone array apparatus MA sound-picks up voice in all directions (at an angle of 360 degrees), and has a plurality of microphone units (which are referred to as a microphone for short) M1 to Mn (n=8), a plurality of amplifier (amp) PA1 to PAn that amplify output signals, respectively, of the plurality of microphone units M1 to Mn, a plurality of A/D converters A1 to An that convert analog signals that are output from the plurality amplifiers PA1 to PAn, into digital signals, respectively, coding unit 225, storage unit 224, and transmission unit 226.

The preset information, which indicates a correspondence relationship between each of predetermined positions (preset positions P1 to Pn) that are image-captured by camera apparatuses C11 to C1n and the pointing direction (which, specifically, is a set of the horizontal angle of θ and the vertical angle of φ) from microphone array apparatus MA, is stored in storage unit 224. Coding unit 225 adds the preset information that is stored in storage unit 224, to digital voice signals that are output from A/D converters A1 to An, and generates packet PKT of the voice data. Transmission unit 226 transmits packet PKT of the voice data that is generated in coding unit 225, to voice processing apparatus 250 through network 215.

In this manner, microphone array apparatus MA amplifies the outputs signals of microphones M1 to Mn in amplifiers PA1 to PAn, respectively, and convert the resulting signals into the digital voice signals in A/D converters A1 to An, respectively. Thereafter, the preset information that is stored in storage unit 224 is added to the digital voice signal, the packet PKT of the voice data is generated, and the packet PKT of the voice data is transmitted to voice processing apparatus 250 within PC 230 through network 215.

Figure 18:
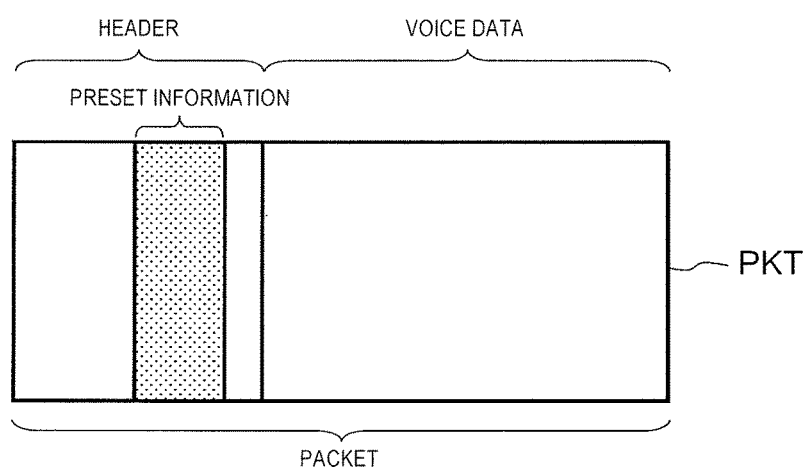
FIG. 18 is a diagram illustrating a structure of a packet of voice data that is transmitted from the microphone array apparatus to the voice processing apparatus.

FIG. 18 is a diagram illustrating a structure of packet PKT of the voice data that is transmitted from microphone array apparatus MA to voice processing apparatus 250. Packet PKT of the voice data is configured with a header and the voice data that is a payload. The preset information described above is included in the header.

In the present embodiment, the preset information is included in packet PKT of the voice data, and thus the preset information is transmitted from microphone array apparatus MA to voice processing apparatus 250, but voice processing apparatus 250 may acquire the preset information using other methods. For example, when voice processing apparatus 250 reads initial information of microphone array apparatus MA, the preset information may be read together. Furthermore, microphone array apparatus MA may transmit the preset information in response to a request from voice processing apparatus 250.

Figure 19:
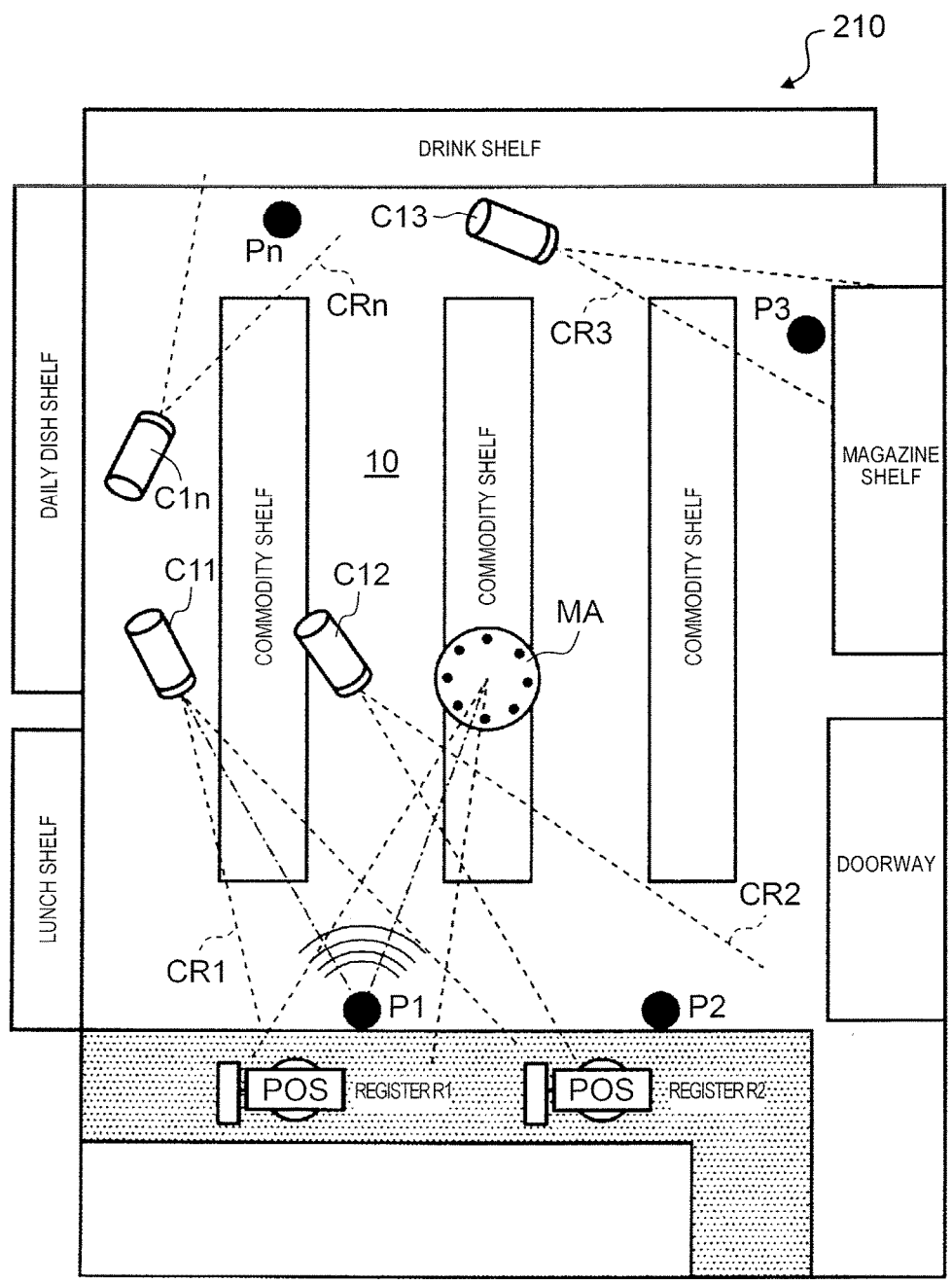
FIG. 19 is a diagram illustrating a layout of the inside of a store where the monitoring system is installed.

FIG. 19 is a diagram illustrating a layout of the inside of store 210 where monitoring system 205 is installed. As one example, "Doorway," "Register R1," "Register R2," "three rows of Commodity Shelves," "Lunch Shelf," "Daily Dish Shelf," "Drink Shelf," and "Magazine Shelf" are arranged in store 210, such as a convenience store. Microphone array apparatus MA is installed on a ceiling of store 210, and a plurality of camera apparatuses C11 to C1n (n=4, here) are installed on an upper portion of a wall or the ceiling of store 210.

In FIG. 19, the plurality of camera apparatuses C11 to C1n faces toward a plurality of preset positions P1 to Pn that are installed in advance within store 210, respectively, in such a manner as to image-capture the plurality of preset positions P1 to Pn. The plurality of preset positions P1 to Pn are decided by the user as the image capture target area that is monitored. Image capture ranges of pictures that are image-captured by camera apparatuses C11 to C1n are expressed as CR1 to CRn, respectively, and preset positions P1 to Pn are present at approximately the centers of image capture ranges CR1 to CRn, respectively.

Camera apparatuses C11 and C12 image-capture pictures, respectively, of preset position P1 of "Register R1" that is a monitoring target area (a sound pickup area) and preset position P2 of "Register R2" that is a monitoring target area. Camera apparatus C13 image-captures a picture of preset information P3 of "Magazine Shelf" that is a sound pickup area. In this manner, in a case where microphone array apparatus MA is attached later within store 210 where camera apparatuses C11 to C14 are already installed, the preset processing that will be described below is performed.

Figure 20:
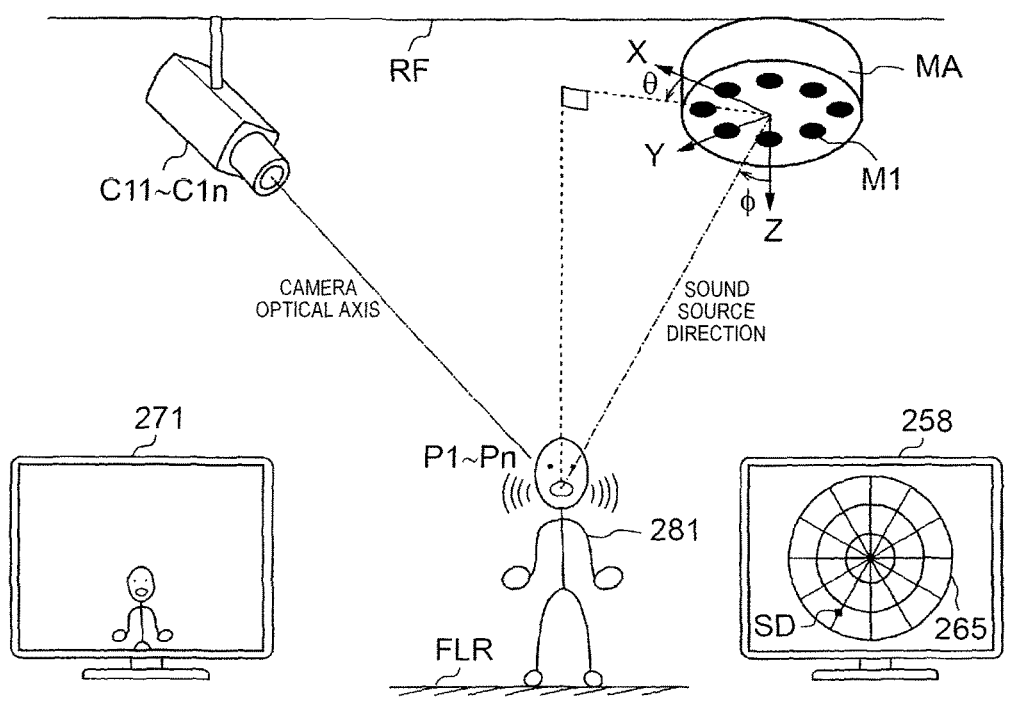
FIG. 20 is a diagram for describing an outline of preset processing.

Operation of monitoring system 205 with the configuration described above is described. First, the preset processing that is performed before monitoring system 205 starts to run (to perform monitoring) will be described. At this point, the preset processing is processing that sets the direction (more precisely, the horizontal angle of θ and the vertical angle of φ with respect to the center of microphone array apparatus MA) from microphone array apparatus MA toward each of predetermined positions (preset positions) P1 to Pn within store 210. FIG. 20 is a diagram for describing an outline of the preset processing. Microphone array apparatus MA and camera apparatuses C11 to C1n are installed on ceiling RF of store 210. Camera apparatuses C11 to C1n that are fixation cameras face toward preset positions P1 to Pn, respectively, and pictures that are mage-captured by camera apparatuses C11 to C1n, respectively, are displayed on camera monitor 271, with which picture processing apparatus 270 is equipped. In work that accompanies the preset processing, a sound source (sound generation source) is placed in preset positions P1 to Pn. As examples of the sound source, as described above, for example, voice that is generated by a human being, sound that is generated by pressing a buzzer, sound that is output from a speaker, and the like are given. In FIG. 20, a case where a speaker 281 who stands on floor FLR generates voice at positions P1 to Pn is illustrated. Microphone array apparatus MA, when sound-picking up voice, transmits voice data on the voice to voice processing apparatus 250. Voice processing apparatus 250 displays a sound generation source position of the voice that is sound-picked up, as a sound source mark (marker) SD, on the screen (voice map 265 that will be described below) of display 258.

Display 258, which is included in voice processing apparatus 250, may be substituted for camera monitor 271. Furthermore, in a case where voice processing apparatus 250 and picture processing apparatus 270 are integrated into one piece as a monitoring apparatus, a screen (a window) of a display is switched, and thus it is possible that the display is used as a camera monitor and it is also possible that both are displayed at the same time using divisional display.

Figure 21:
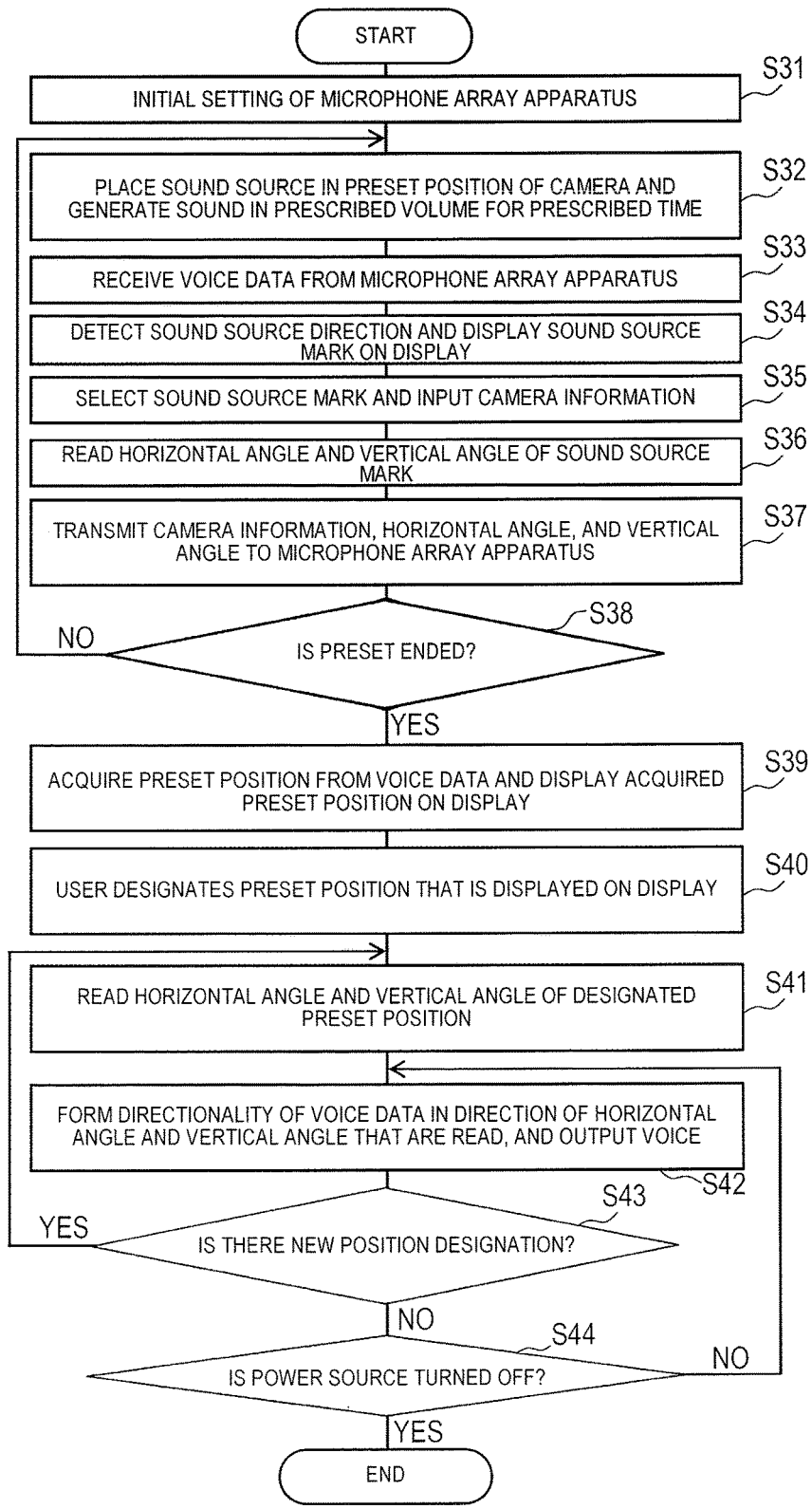
FIG. 21 is a flowchart illustrating a sound pickup procedure at the time of the preset processing and monitoring.

FIG. 21 is a flowchart illustrating a sound pickup procedure at the time of the preset processing and the monitoring. Microphone array apparatus MA is attached to the ceiling of store 210, and then the preset processing is performed. First, voice processing apparatus 250 performs initial setting of the microphone array apparatus MA (S31). In the initial setting, voice processing apparatus 250 sets an IP address of the microphone array apparatus MA, and microphone array apparatus MA is set to be in a state where communication is possible. Additionally, voice processing apparatus 250 enters a preset mode, and causes voice map 265 (refer to FIG. 22) to be displayed on display 258.

When the initial setting of microphone array apparatus MA is finished, the sound source (the sound generation source) is placed in preset positions P1 to Pn toward which camera apparatuses C11 to C1n face, respectively, and the sound source generates sound in a prescribed sound volume or higher for a prescribed time (S32). At this point, the speaker 281 as the sound source generates voice in preset positions P1 to Pn. Microphone array apparatus MA sound-picks up the voice, and transmit the resulting voice data to voice processing apparatus 250.

Figures 22, 23:
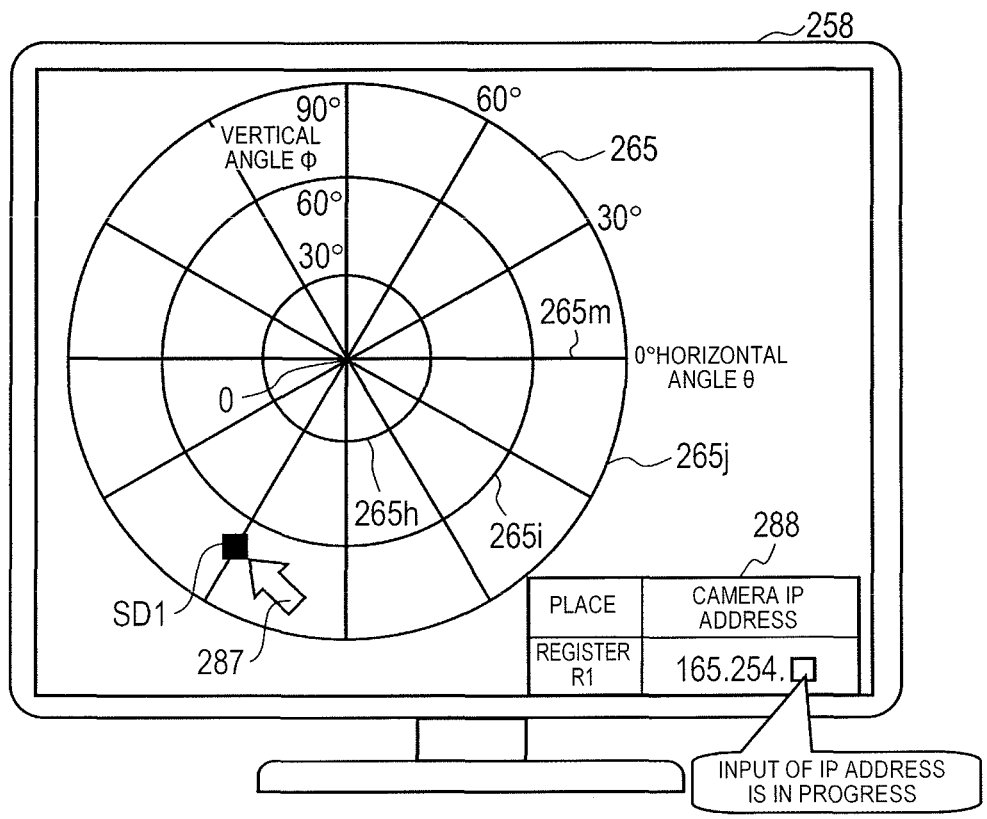
FIG. 22 is a diagram illustrating a screen of a display on which a voice map is displayed at the time of the preset processing.
FIG. 23 is a diagram illustrating a detail of listing in a preset information table that is stored in the microphone array apparatus.

Communication unit 256 within voice processing apparatus 250 receives the voice data that is transmitted from microphone array apparatus MA (S33). Sound source direction detection unit 252 within voice processing apparatus 250 obtains the pointing direction (the horizontal angle of θ and the vertical angle of φ) from microphone array apparatus MA toward the sound source, based on the sound volume of the received voice data, and displays sound source mark SD1 indicating the sound generation source position, on voice map 265 that is displayed on display 258 (S34). FIG. 22 is a diagram illustrating the screen of display 258 on which voice map 265 is displayed at the time of the preset processing.

Voice map 265 is drawn as three concentric circles 265h, 265i, and 265j, of which central points O are a position of microphone array apparatus MA, and line segment 265m that is a radius that divides central angles of these concentric circles into twelve portions. Among three concentric circles, the innermost concentric circle is 265h is equivalent to the vertical angle φ=30°, the middle concentric circle 265i is equivalent to the vertical angel φ=60°, and the outermost concentric circle 265j is equivalent to the vertical angle φ=90°. Therefore, the more inward sound source mark SD1 is present, the more microphone array apparatus MA is approached. Line segment 265m that extends in the horizontal direction to the right side of central point O is equivalent to the central angle=0° and the horizontal angle=0°. Line segments 265m that result from the division into twelve portions indicate horizontal angles 0° to 360° with the central angle is started with the central angle=0° and incremented by 30°. At this point, sound source mark SD1 is drawn at coordinates (240°, 70°), as coordinates (θ, φ) on voice map 265. Because sound source mark SD1 is not yet confirmed as the sound source in the preset position, sound source mark SD1 is drawn as a rectangle. In FIG. 22, angles of 30°, 60°, and the like are attached, but may not be displayed. Furthermore, graduations may be displayed, and for example, the vertical angle may be displayed by 15°.

The user (the speaker) selects sound source mark SD1 that is displayed on display 258, using cursor 287, and inputs information (camera information) of camera apparatus C11 that corresponds to sound source mark SD1 (S35). When sound source mark SD1 is selected, input box 288 for the camera information is displayed on a lower right corner of the screen of display 258. A place (for example, Register R1) and a camera IP address are capable of being input by the user into input box 288 for the camera information. Instead of the user selecting the sound source mark, in a case where a sound volume of voice that is sound-picked up by the microphone array apparatus is a prescribed threshold or above for a prescribed time, a voice processing apparatus may automatically recognize a direction in which the voice occurs, may cause the sound source mark to be displayed on the display, and may urge the user to input the camera information.

Voice processing apparatus 250 reads the horizontal angle θ and the vertical angle φ of sound source mark SD1 (S36), and transmits the camera information that is input in Step S35 and the horizontal value θ and the vertical angle φ of sound source mark SD1 to microphone array apparatus MA (S37). Microphone array apparatus MA lists the preset information, which is transmitted from voice processing apparatus 250, in preset information table 290 (refer to FIG. 23) for storing in storage unit 224.

FIG. 23 is a diagram illustrating a detail of listing in preset information table 290 that is stored in microphone array apparatus MA. The camera IP address, the place, and the pointing direction (the horizontal angle θ and the vertical angle φ) are listed in preset information table 290 for each of preset positions P1 to Pn that are included in the image capture target areas, respectively, for the camera apparatuses C11 to C1n.

The user determines whether or not setting processing of the preset position is ended (S38). In a case where the setting processing of all pieces of preset positions are not ended, the preset processing returns to Step S32 and the same processing is repeated.

Figure 24:
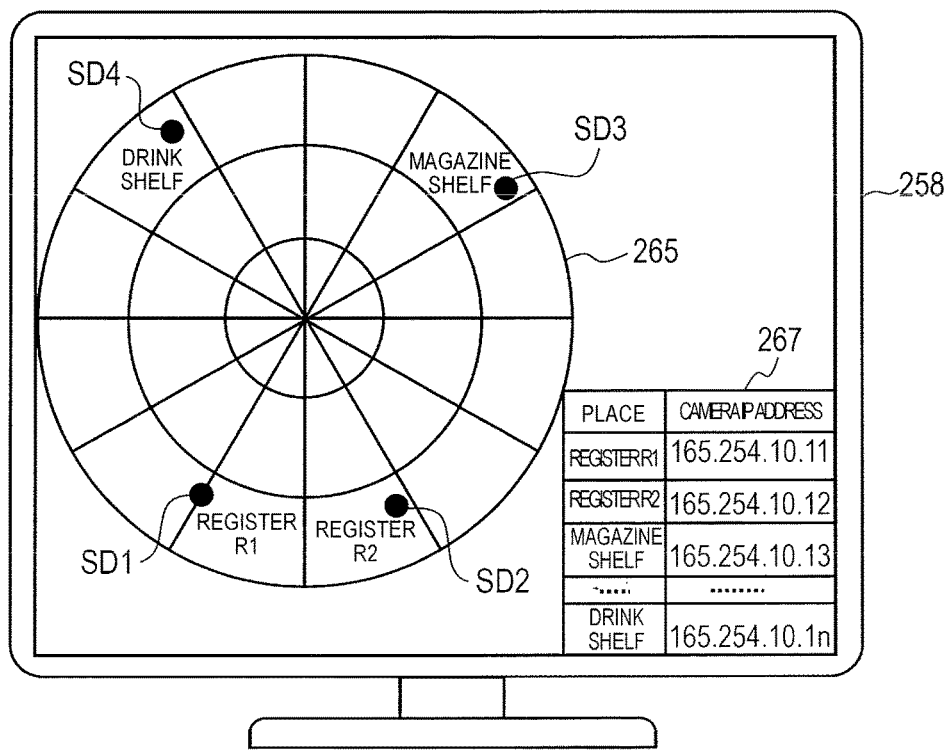
FIG. 24 is a diagram illustrating the screen of the display that is displayed after the preset processing.

On the other hand, when the preset processing is ended for the preset positions, the preset processing before starting the running is completed, the running (actual monitoring processing) is started. Voice processing apparatus 250 acquires the voice data from microphone array apparatus MA, and displays all preset positions, which are extracted from the preset information that is included in the header of packet PKT of the voice data, on display 258 (S39). FIG. 24 is a diagram illustrating the screen of display 258 that is displayed after the preset processing. Sound source maps SD1, SD2, SD3, and SD4, which are confirmed as the directions (the pointing directions) of the sound sources, respectively, that are "Register R1,", "Register R2," "Magazine Shelf," "Food Shelf" that are the preset positions, are drawn in the form of a circle on voice map 265 that is displayed on the screen of display 258. Particularly, in a case where there is no need to distinguish between sound source marks SD1 to SD4, sound source marks SD1 to SD4 are simply collectively referred to as a sound source mark SD. Furthermore, camera information 267 is displayed on a lower right corner of the screen of display 258. Pieces of preset information and camera IP addresses, which correspond to camera apparatuses C11 to C1n, respectively, are included in camera information 267.

When the preset position that is displayed on display 258 is designated by the user through operation unit 257 (S40), voice processing apparatus 250 reads the horizontal angle θ and the vertical angle φ that indicate the pointing direction of the designated preset position (S41). Directionality formation unit 253 within voice processing apparatus 250 forms the directionality of the voice data in the pointing direction of the preset position that is specified by the horizontal angle θ and the vertical angle φ which are read, and outputs voice from speaker 259 (S42).

Furthermore, when the user designates other one position that is displayed on display 258 while reproducing the voice that is sound-picked up at the time of the running (more precisely, actual monitoring) (YES in S43), voice processing apparatus 250 reads the horizontal angle and the vertical angle from the preset information on the designated position (S41), and forms the directionality of the voice data in the pointing direction and outputs the voice from speaker 259 (S42).

On the other hand, if there is no designation of a new designation position (NO in S43), voice processing apparatus 250 continues to perform the reproduction until a power source is turned OFF (S44). Moreover, because according to a user's instruction, the directionality formation does not continue until the power source is turned OFF, according to user's support, the directionality formation may be cancelled and all pieces of sound may be monitored until the next position designation occurs.

Figure 25:
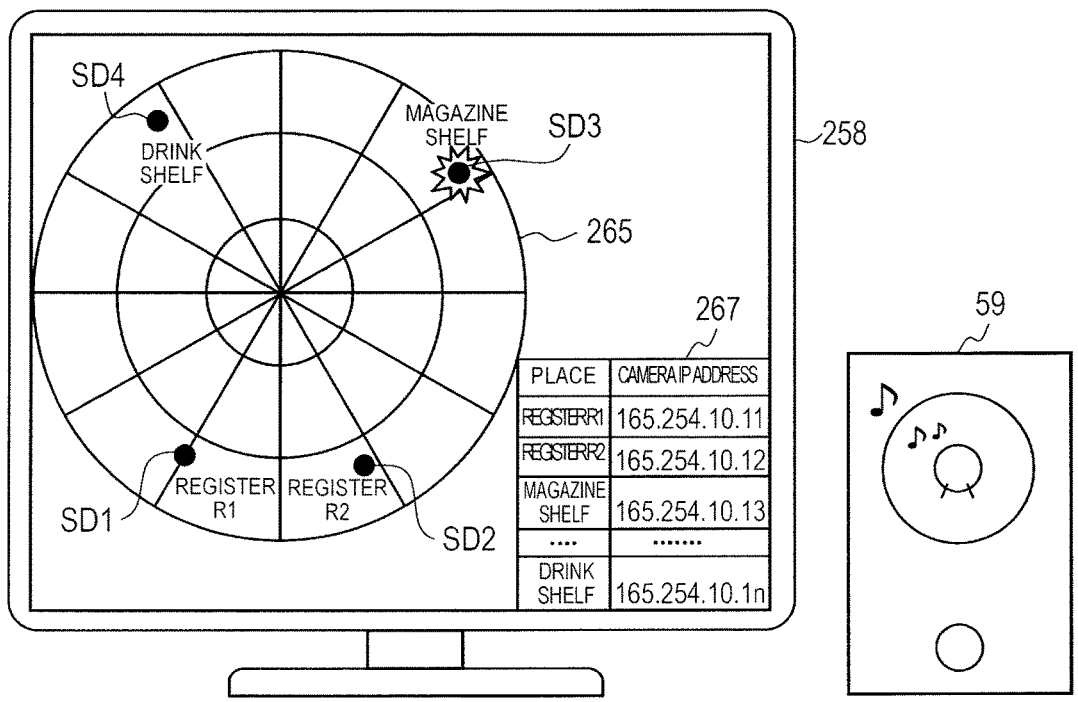
FIG. 25 is a diagram illustrating the screen of the display that is displayed at the time of the monitoring and a sound generation operation by a speaker.

FIG. 25 is a diagram illustrating the screen of the display 258 that is displayed at the time of the monitoring and a sound generation operation by speaker 259. At the time of the running (the monitoring), for example, when the user selects sound source mark SD3 through operation unit 257, voice processing apparatus 250 forms the directionality of the voice data in the pointing direction ($\theta 3$, $\phi 3$) of sound source mark SD3, more precisely, the direction of the magazine shelf (preset position P3), sound-picks up voice, and outputs the voice from speaker 259. At this time, when detecting abnormal sound (sound in a high volume), of which a sound volume exceeds a threshold, in preset position P3 or in the vicinity thereof, voice processing apparatus 250 alerts the user to the detection by causing sound source mark SD3 to blink. At this point, the sound source mark is displayed in a manner that the sound source mark is identifiable by being blinked, but color, a shape, a size, or the like may be changed. Furthermore, according to how high a sound volume of the preset position is, voice processing apparatus 250 may cause sound source mark color to be changed, may cause a size, a shape, or the like of the sound source mark to be changed, or may cause a letter color or a background color of only the involved camera information, among pieces of camera information, to be changed.

As described above, in monitoring system 205 according to the fifth embodiment, when microphone array apparatus MA is attached later within store 210 where camera apparatuses C11 to C14 are already installed, in the preset processing, the sound source is placed in the preset positions P1 to Pn in an optical axis direction that are the centers of images which are captured by camera apparatuses C11 to C1n, respectively, and voice is generated. When the microphone array apparatus MA sound-picks up the voice that is output from the sound source and sends the voice data on the voice to voice processing apparatus 250, sound source direction detection unit 252 causes sound source marks SD1 to SD4, each of which indicates the pointing direction (the horizontal angle $\theta$, the vertical angle $\phi$), to be displayed on display 258, and urges the user to make a selection among sound source marks SD1 to SD4 and to input the camera information. Voice processing apparatus 250 transmits the camera information that is input, and the pointing direction, to the microphone array apparatus MA. The microphone array apparatus MA lists the camera information and the pointing direction in preset information table 290 for storing in storage unit 224. At the time of the running, when the user selects any one of sound source marks SD1 to SD4 on voice map 265 that is displayed on display 258, directionality formation unit 253 forms the directionality of the voice data in the pointing direction (the horizontal angle $\theta$, the vertical angle $\phi$) that corresponds to the sound source map, for the voice data that is sound-picked up in microphone array apparatus MA, and voice processing apparatus 250 causes voice to be output from speaker 259.

Accordingly, even in a case where a positional relationship between each of camera apparatuses C11 to C1n and microphone array apparatus MA is unclear, monitoring system 205 can form the directionality in the pointing direction from microphone array apparatus MA toward a predetermined image capture position (more precisely, preset positions P1 to Pn), and thus, the voice from the sound source, which is sound-generated, can be clearly heard. Therefore, in order to obtain a correspondence relationship between a coordinate system for the camera apparatus and a coordinate system for the microphone array apparatus, monitoring system 205 can measure an attachment position, a direction, or the like on the spot, or can associate the camera apparatus and the microphone array apparatus with each other without the need to perform geometric calculation. Furthermore, voice processing apparatus 250 can obtain the preset information using only microphone array apparatus MA.

Furthermore, at the time of the running (the monitoring), monitoring system 205 can form the directionality of the voice data in the pointing direction (the horizontal angle $\theta$ and the vertical angle $\phi$) that is associated with the preset position based on the preset information, and can output the voice that is sound-picked up in the preset position, from speaker 259.

Furthermore, voice map 265 that is drawn as a concentric circle of which the center is microphone array apparatus MA, of which the center angle indicates the horizontal angle, and a length of whose radius indicates a size of the vertical angle is displayed on display 258, and sound source map SDn is displayed on voice map 265. Because of this, the user can easily recognize preset information Pn that is indicated on sound source map SDn.

Furthermore, when sound source map SD that is displayed on voice map 265 is designated through operation unit 257, because directionality formation unit 253 forms the directionality of the voice data of the voice that is sound-picked up in the microphone array apparatus MA, in the pointing direction that is associated with designated sound source map SD, the user can hear voice that is generated in preset position Pn, with a simple operation.

Furthermore, in a case where a sound volume of the voice that is generated in preset position P exceeds a threshold, because sound source map SD thereof is displayed in a blinking manner, display 258 can promptly alert the user that sound (abnormal sound) that is so strong that the sound volume exceeds the threshold is detected.

Furthermore, because the preset information is written in the header of packet PKT of the voice data, information in the pointing direction of the preset position can be obtained only with the voice data. Furthermore, because preset information table 290 is stored in storage unit 224 of microphone array apparatus MA, even in a case where a plurality of microphone arrays are installed, the correspondence relationship between microphone array apparatus MA and the preset information does not even need to be managed.

Sixth Embodiment

In the fifth embodiment, the voice processing apparatus and the picture processing apparatus operates separately of each other, but in the sixth embodiment, a case is described where the voice processing apparatus and the picture processing apparatus are integrated into one piece and where the picture that is image-captured with the camera apparatus and the voice map are displayed at the same time on the screen of the display.

Figure 26:
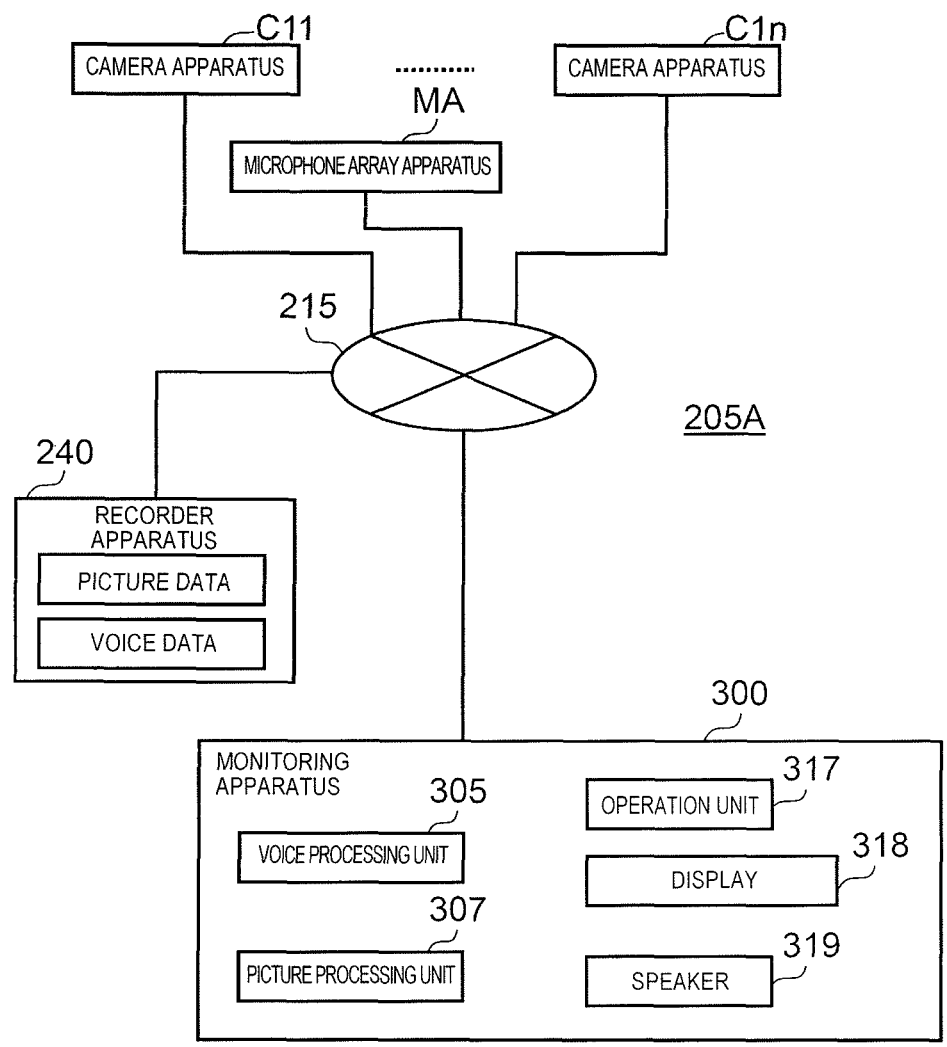
FIG. 26 is a block diagram illustrating a configuration of a monitoring system according to a sixth embodiment.

FIG. 26 is a block diagram illustrating a configuration of monitoring system 205A according to the sixth embodiment. The monitoring system according to the sixth embodiment has a configuration that is almost the same as that according to the fifth embodiment. Constituent elements that are the same as those in the fifth embodiment are given the same reference numerals, and descriptions thereof are omitted.

In monitoring system 205A, monitoring apparatus 300 is connected to network 215. Monitoring apparatus 300 has voice processing unit 305, picture processing unit 307, operation unit 317, display 318, and speaker 319.

Voice processing unit 305 has functions of sound source direction detection unit 252, directionality formation unit 253, and input and output control unit 254, in the same manner as signal processing unit 251 within voice processing apparatus 250 according to the fifth embodiment. According to a user's operational instruction, picture processing unit 307 causes the picture data, which is image-captured by each of fixation camera apparatuses C11 to C1n, to be displayed on display 318.

Operation unit 317 is installed, for example, in a manner that corresponds to the screen of display 318, and is configured with a touch panel or a touch pad on which an input operation is capable of being performed using a user's finger and a stylus. In response to a user's operation, operation unit 317 outputs pieces of data that are coordinates of one or more designation points where an emphasis on (amplification of) the sound volume level of the voice data is desirable, to voice processing unit 305. Operation unit 317 may be configured with a pointing device, such as a mouse or a keyboard.

A picture (an image) that is based on the picture data, which is image-captured by each of camera apparatuses C11 to C1n and is transferred through network 215, or which is recorded in recorder apparatus 240, is displayed on display 318.

Speaker 319 outputs the voice data that is sound-picked up by microphone array apparatus MA and is transferred through network 215, or that is recorded in recorder apparatus 240, or the voice data on which the processing for emphasis in a specific direction by voice processing unit 305, which is based on the audio data that is sound-picked up and transferred, is performed.

Figure 27:
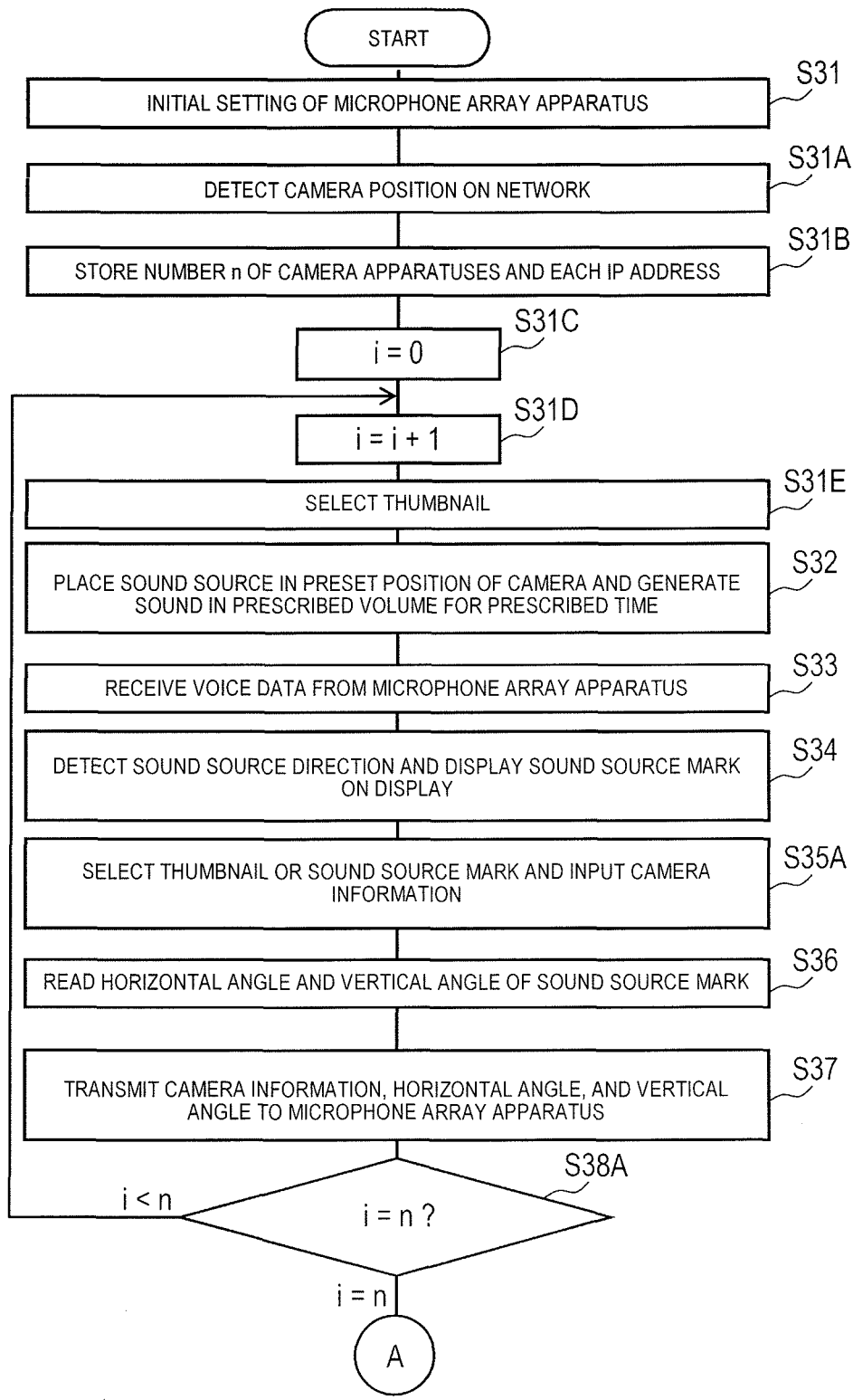
FIG. 27 is a flowchart illustrating a sound pickup procedure at the time of the preset processing and the monitoring.
Figure 28:
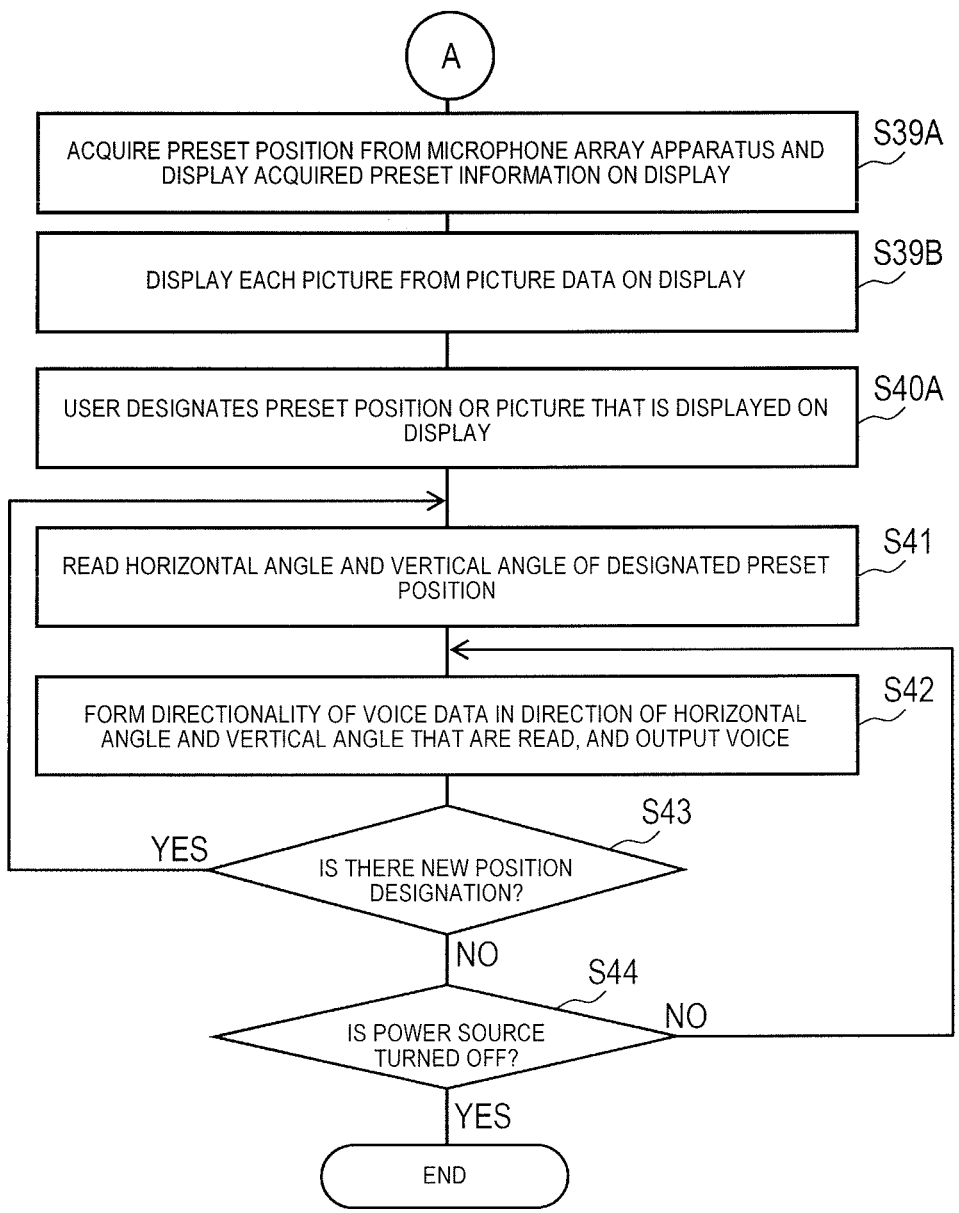
FIG. 28 is a flowchart illustrating the preset processing and the sound pickup procedure at the time of the monitoring, which follows the flowchart in FIG. 27.

Operation of monitoring system 205A that has the configuration described above is described. FIG. 27 is a flowchart indicating the preset processing and the sound pickup procedure at the time of the monitoring. FIG. 28 is a flowchart indicating the preset processing and the sound pickup procedure at the time of the monitoring, which follows the flowchart in FIG. 27. The same step processing as in the fifth embodiment is given the same step number, and a description thereof is omitted.

In Step S31, voice processing unit 305 sets the IP address of the microphone array apparatus MA, and microphone array apparatus MA is set to be in the state where communication is possible. Additionally, voice processing unit 305 enters the preset mode, and causes voice map 265 to be displayed on display 318. Picture processing unit 307 performs broadcast on all camera apparatuses C11 to C1n that are connected to network 215, and receives responses to the broadcast, and thus searches camera apparatuses C11 to C1n that are connected to network 215, for detection (S31A).

Figure 29:
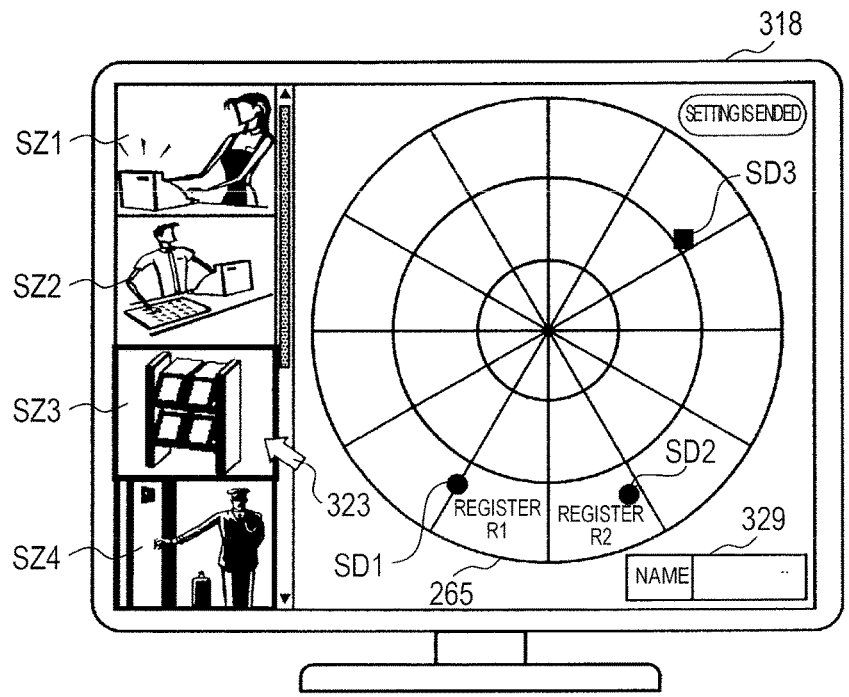
FIG. 29 is a diagram illustrating the screen of the display that is displayed at the time of the preset processing.

Voice processing unit 305 stores the total number n of camera apparatuses that are obtained as a result of the search, and each IP address, in a memory (not illustrated) within the voice processing unit 305 (S31B). Picture processing unit 307 displays a picture that is image-captured by each of searched camera apparatuses C11 to C1n, on the screen of display 318. FIG. 29 is a diagram illustrating the screen of display 318 that is displayed at the time of the preset processing. Thumbnails SZ1 to SZ4 for the pictures that are image-captured by camera apparatuses C11 to C1n, respectively, are displayed to the left side of the screen of display 318 in such a manner that thumbnails SZ1 to SZ4 are selectable. Particularly, in a case where there is no need to distinguish between thumbnails SZ1 to SZ4, thumbnails SZ1 to SZ4 are referred to as thumbnail SZ for short. Furthermore, thumbnail SZ is displayed by taking a still image out of the picture that is image-captured by each of camera apparatuses C11 to C1n, every fixed time. Furthermore, voice processing unit 305 displays voice map 265 on the right side of the center of the screen of display 318.

Voice processing unit 305 sets variable i indicating a number of the camera apparatus to initial value 0 (S31C). Then, voice processing unit 305 increases variable i by 1 (S31D). Voice processing unit 305 receives thumbnail SZ that is selected by the user through operation unit 317 (S31E). When it comes to the selection of the thumbnail, the user moves cursor 323 that is displayed on the screen of display 318, to select thumbnail SZ. In FIG. 29, thumbnail SZ3 is selected. A frame of selected thumbnail SZ3 is displayed in a highlighting manner. Instead of thumbnail SZ, as is the case with the fifth embodiment, sound source mark SD may be selected.

The user installs the sound source in the image capture range that is image-captured in one of camera apparatuses C11 to C1n, which corresponds to thumbnail SZ, and causes the sound source to generate sound in a prescribed sound volume or higher for a prescribed time (S32). A position of the sound source may not be on the optical axis of each of camera apparatuses C11 to C1n, and may be in the image capture range. Furthermore, the user, as the sound source, may generate voice standing within the image capture range, as is the case with the fifth embodiment.

When microphone array apparatus MA sound-picks up voice in a prescribed sound volume or higher, which is generated from the sound source and transmits voice data on the voice to voice processing unit 305, voice processing unit 305 receives the voice data that is transmitted from microphone array apparatus MA (S33).

Voice processing unit 305 obtains the pointing direction (the horizontal angle θ and the vertical angle φ) from microphone array apparatus MA toward the sound source, based on the sound volume of the received voice data, and displays sound source SD indicating the sound generation source position, on voice map 265 that is displayed on display 318 (S34). Sound source mark SD3 indicating a new sound source position is drawn in the form of a rectangle on display 318 (refer to FIG. 29). Sound source marks SD1 and SD2 that are "Register R1," and "Register R2," respectively, are already confirmed, and because of this, are drawn in the form of a circle. Additionally, voice processing unit 305 displays input box 329 for a camera name (for example, a place name) on a lower right corner of the screen of display 318 to urge inputting.

The user selects thumbnail SZ or source mark SD, and inputs the camera information into input box 329 for the camera name (535A). Instead of the user selecting thumbnail SZ or sound source mark SD, in the case where the sound volume of voice that is sound-picked up by the microphone array apparatus is a prescribed threshold or above for a prescribed time, the voice processing apparatus may automatically recognize a direction in which the voice occurs, may cause the sound source mark to be displayed on the display, and may urge the user to input the camera information.

Voice processing unit 305 reads the horizontal angle θ and the vertical angle φ of sound source mark SD (S36), and transmits the camera information (the camera name and the IP address) that is input in Step S35A, and the pointing direction (horizontal angle θ and the vertical angle φ) of microphone array apparatus MA, to microphone array apparatus MA (S37). Microphone array apparatus MA lists the preset information, which is transmitted from voice processing unit 305, in preset information table 290 for storing in storage unit 224.

Voice processing unit 305 determines whether or not variable i reaches the total number n of camera apparatuses that are searched (S38A). In a case where variable i does not reach the total number n of camera apparatuses, voice processing unit 305 returns Step S31D and repeats the same processing. On the other hand, in a case where variable i reaches the total number n of camera apparatuses, the preset processing is completed, and proceeding to the processing at the time of the running (the monitoring) takes place.

Figure 30:
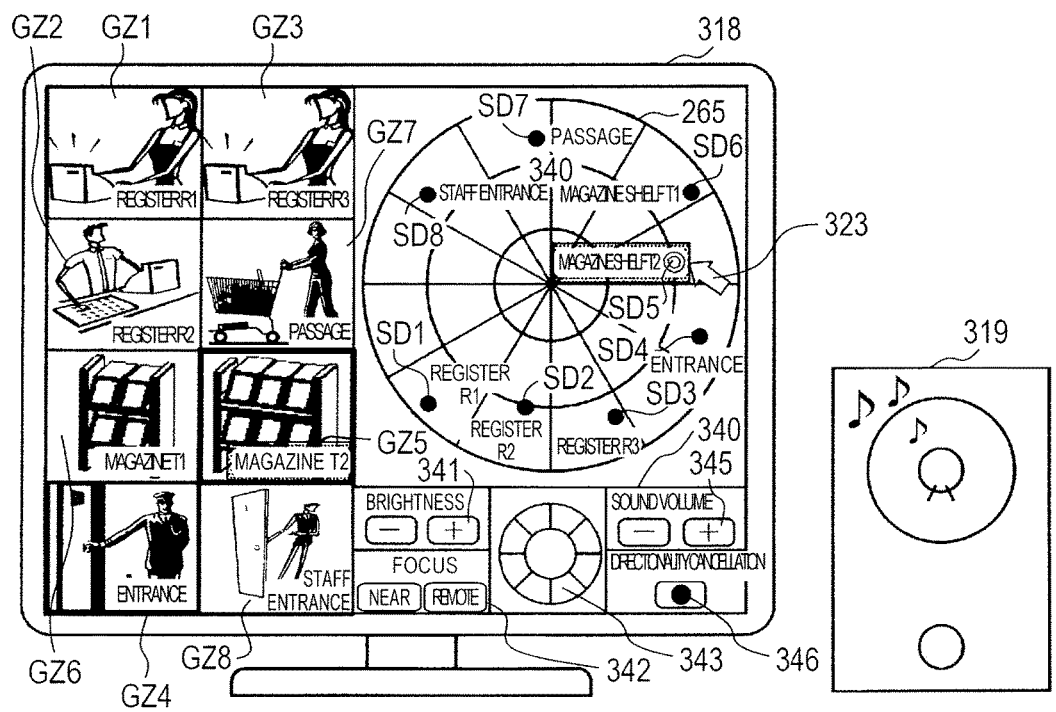
FIG. 30 is a diagram illustrating the screen of the display that is displayed at the time of the monitoring and the sound generation operation by the speaker.

At the time of the monitoring, voice processing unit 305 acquires all preset positions P1 to Pn from microphone array apparatus MA, and displays acquired preset positions P1 to Pn on voice map 265 that is displayed on display 318 (539A). Picture processing unit 307 reads a picture that is image-captured by each of camera apparatuses C11 to C1*n*, and displays the picture, which is read, on the screen of display 318 (539B). FIG. 30 is a diagram illustrating the screen of display 318 that is displayed at the time of the monitoring, and a sound generation operation by speaker 319. At this point, a case is described where eight camera apparatuses C11 to C18 are installed. Images GZ1 to GZ8 that are image-captured in camera apparatuses C11 to C18, respectively, are displayed on the left side of the screen of display 318. At this point, images GZ1 to GZ8 are not thumbnails, and are images that results from camera apparatuses C11 to C18 image-capturing "Register R1," "Register R2," "Register R3," "Entrance, "Magazine Shelf T2," "Magazine Shelf T1," "Passage," and "Staff Entrance."

Voice map 265 and operation panel 340 are displayed on the right side of the screen of display 318. Sound source marks SD1 to SD8 are displayed on voice map 265. Furthermore, luminance button 341 for adjusting brightness of each of images GZ1 to GZ8, focus button 342 for adjusting a focus of the picture that is image-captured in each of camera apparatuses C11 to C18, selection button 343 for selecting any one of camera apparatuses C11 to C18, sound volume button 345 for adjusting the sound volume, and preset button 346 for switching a state of the sound pickup for the directionality to a state of the sound pickup of all pieces of sound are provided on operation panel 340.

In a case where voice is output from speaker 319, voice processing unit 305 receives sound source mark SD or image GZ that is designated by the user (S40A). The user makes a selection by clicking sound source mark SD on voice map 265 that is displayed on the screen of display 318, using a curser 323, or makes a selection by clicking images GZ1 to GZ8 that are displayed on the screen of display 318, using cursor 323. At this point, image GZ5 or sound source mark SD5 is selected, a frame of image GZ5 is displayed in a red-color highlighting manner, and sound source mark SD5 is surrounded by a rectangle that assumes a red color as a background color. Speaker 319 outputs voice data with "Magazine Shelf T2" being set to be the pointing direction.

Furthermore, when the user designates other one position that is displayed on display 258 while reproducing the voice that is sound-picked up at the time of the running (more precisely, actual monitoring) YES in S43), voice processing apparatus 250 reads the horizontal angle and the vertical angle from the preset information on the designated position (S41), and forms the directionality of the voice data in the pointing direction and outputs the voice from speaker 259 (S42).

On the other hand, if there is no designation of a new designation position (NO in S43), voice processing apparatus 250 continues to perform the reproduction until a power source is turned OFF (S44). The user can newly add, change, and delete contents of the preset table by clicking preset button 346, and may monitor all pieces of sound until the next position is designated.

As described above, monitoring system 205A according to the sixth embodiment preset processing that lists the pointing direction of the voice which corresponds to the preset position, while actually viewing the picture that is image-picked up in each of camera apparatuses C11 to C1*n*, and thus the work efficiency at the time of the preset processing is improved. For example, in a case where the sound source is placed at the preset information (as well as in a case where the speaker stands in the preset position), it is simply understood that what is necessary is to place the sound source at the center of the picture that is image-captured in the camera apparatus. Furthermore, at the time of the monitoring, in a case where the pointing direction of microphone array apparatus MA is switched, the user can decide a switching destination by viewing the picture that is manage-captured in each of camera apparatuses C11 to C1*n*.

Seventh Embodiment

In the fifth and sixth embodiments, the preset information is stored in the microphone array apparatus, but in a seventh embodiment, a case where is described where a plurality of microphone arrays are installed and the monitoring apparatus manages the preset information in a unified manner.

Figure 31:
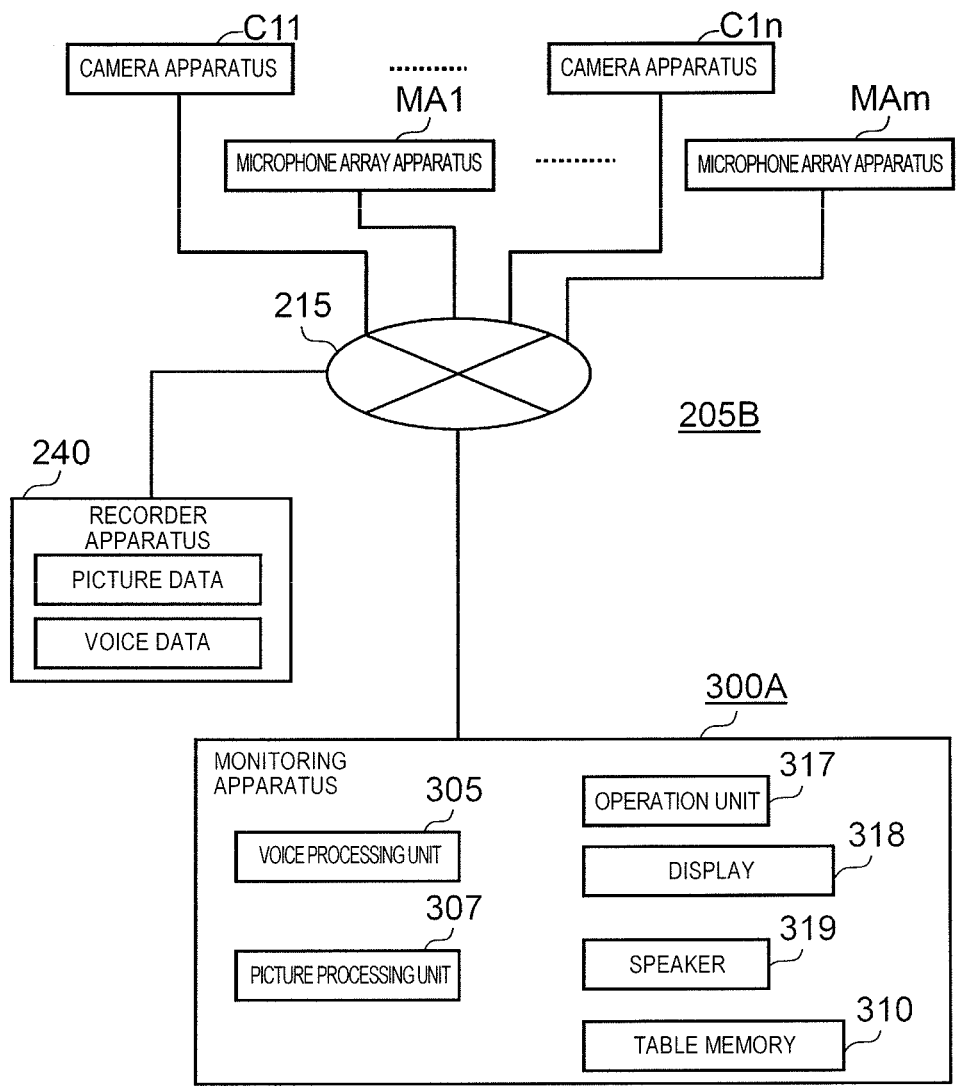
FIG. 31 is a block diagram illustrating a configuration of a monitoring system according to a seventh embodiment.

FIG. 31 is a block diagram illustrating a configuration of monitoring system 205B according to the seventh embodiment. The monitoring system according to the seventh embodiment has a configuration that is almost the same as that according to the fifth embodiment. Constituent elements that are the same as those in the fifth embodiment are given the same reference numerals, and descriptions thereof are omitted.

A plurality of microphone array apparatuses MA1 to MAm are connected to network 215. A plurality of microphone array apparatuses MA1 to MAm are different from those according to the fifth to sixth embodiment, and does not have a storage unit in which the present information is stored. Each of microphone array apparatuses MA1 to MAm, for example, may employ the same configuration as any one of microphone arrays 5, 5A, 5B, and 5C according to the first to fourth embodiments.

Monitoring apparatus 300A has table memory 310 in which preset information table 330 in which the preset information is listed is stored. FIG. 32 is a diagram illustrating a detail of listing of preset information table 330 that is stored in table memory 310.

A place, a preset value, and a camera IP address are listed in preset information table 330. Furthermore, as the preset value, a number (Mic No=) of the microphone array apparatus, a pointing direction, and a directionality control parameter are listed. The directionality control parameter is a directionality filter coefficient, and is decided by performing learning control in each of the pointing directions.

As the preset information, for example, place: Register R1, Mic No.=MA1, pointing direction: (θ11, ɸ11), directionality control parameter (p311, . . . , p11q), camera IP address: "165.254.10.11" are listed. Furthermore, in Magazine Shelf, pieces of preset information are redundantly listed by microphone array apparatus MA1 and microphone array apparatus MA2. That is, as the preset information, place: Magazine Shelf, Mic No.=MA1, pointing direction: (θ13, ɸ13), directionality control parameter (p131, p13q), and camera IP address: "165.254.10.13", and place: Magazine Shelf, Mic No.=MA2, pointing direction: (θ23, ɸ23), directionality control parameter (p231, p23q), and camera IP address: "165.254.10.13" are both listed. In a case where pieces of preset information are listed redundantly for the same preset position, preset information on a voice in a high sound volume is preferentially used among pieces of voice that are sound-picked up in two microphone array apparatuses MA1 and MA2, and voice that is sound-picked up in microphone array apparatus MA that corresponds to the preset information is output from speaker 319.

Figure 33:
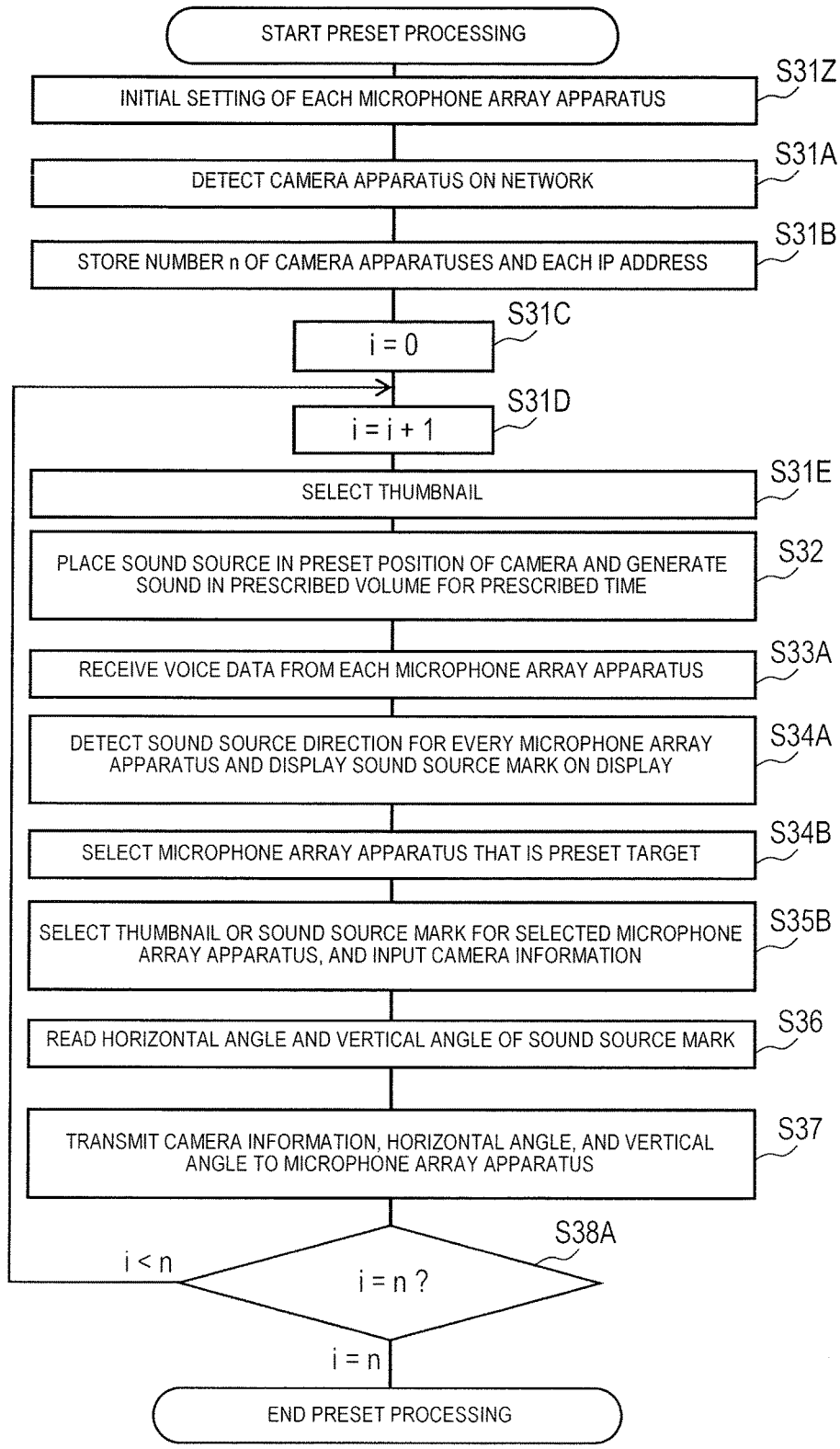
FIG. 33 is a flowchart illustrating a preset processing procedure.

Operation of monitoring system 205B that has the configuration described above is described. FIG. 33 is a flowchart illustrating a preset processing procedure. The same step processing as in the fifth and sixth embodiments is given the same step number, and a description thereof is omitted. Furthermore, a case where there are two microphone array apparatuses MA1 and MA2 is described.

Voice processing unit 305 within monitoring apparatus 300A sets an IP address for each of microphone array apparatuses MA1 and MA2, and set each of microphone array apparatuses MA1 and MA2 to be in a state where communication is possible (Step S31Z). Additionally, voice processing unit 305 enters the preset mode, and displays two voice maps 265A and 265B on display 318. Picture processing unit 307 performs the broadcast on all camera apparatuses C11 to C1n that are connected to network 215, and receives responses to the broadcast, and thus searches camera apparatuses C11 to C1n that are connected to network 215 (S31A).

Figure 34:
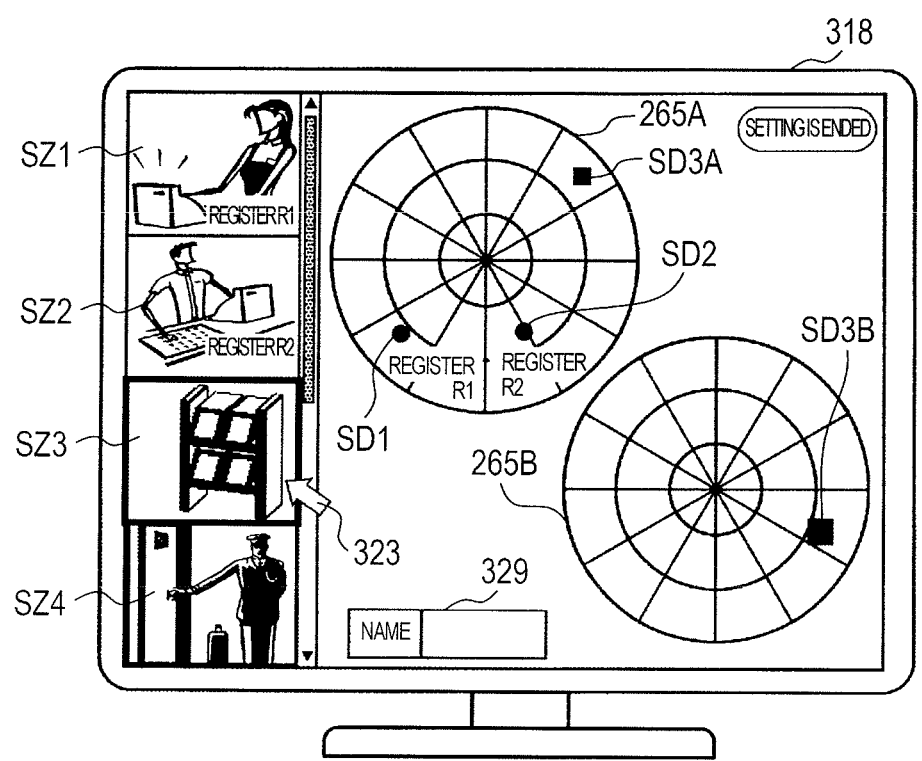
FIG. 34 is a diagram illustrating the screen of the display that is displayed at the time of the preset processing.

Voice processing unit 305 stores the total number n of camera apparatuses that are obtained as a result of the search, and each IP address, in the memory (not illustrated) within the voice processing unit 305 (S31B). Picture processing unit 307 displays a picture that is image-captured by each of searched camera apparatuses C11 to C1n, on the screen of display 318. FIG. 34 is a diagram illustrating the screen of display 318 that is displayed at the time of the preset processing. Thumbnails SZ1 to SZ4 for the pictures that are image-captured by camera apparatuses C11 to C1n, respectively, are displayed to the left side of the screen of display 318 in such a manner that thumbnails SZ1 to SZ4 are selectable. Particularly, in a case where there is no need to distinguish between thumbnails SZ1 to SZ4, thumbnails SZ1 to SZ4 are collectively referred to as thumbnail SZ for short. Furthermore, thumbnail SZ is displayed by taking a still image out of the picture that is image-captured by each of camera apparatuses C11 to C1n, every fixed time. Furthermore, voice processing unit 305 displays two voice maps 265A and 265B on the right side of the center of the screen of display 318.

In Step S32, the user installs the sound source in the image capture range that is image-captured in one of camera apparatuses C11 to C1n, which corresponds to thumbnail SZ, and, when sound is caused to be generated in a prescribed sound volume or higher for a prescribed time, each of microphone array apparatuses MA1 to MAm sound-picks up voice in the prescribed sound volume or higher, which is generated from the sound source, and transmits each piece of voice data to voice processing unit 305. Voice processing unit 305 receives the voice data that is transmitted from each of microphone array apparatuses MA1 and MA2 (S33A).

Voice processing unit 305 obtains the pointing direction (the horizontal angle θ and the vertical angle ɸ) from each of microphone array apparatuses MA1 and MA2 toward the sound source, based on the sound volume of the voice data that is received from each of microphone array apparatuses MA1 and MA2, and displays sound source map SD (SD3A and SD3B) indicating the sound generation source position on voice maps 265A and 265B that are displayed on display 318 (S34A). Sound source maps SD3A and SD3B indicating new sound generation source position are drawn on display 318 (refer to FIG. 34). Sound source marks SD1 and SD2 that are "Register R1," and "Register R2," respectively, are already confirmed, and because of this, are drawn in the form of a circle. Additionally, voice processing unit 305 displays input box 329 for a camera name (for example, a place name) on a lower right corner of the screen of display 318 to urge inputting. At this point, voice that is sound-picked up in microphone array apparatus MA2 has a high sound volume, a rectangle of sound source map SD3B that corresponds to this voice is larger in size than sound source map SD3A that corresponds to microphone array apparatus MA1.

Voice processing unit 305 selects any one of the plurality of microphone array apparatuses (microphone array apparatuses MA1 and MA2 here), which is a target for the preset processing (S34B). In a case where voice in a prescribed sound volume or higher is sound-picked up in the plurality of microphone array apparatuses, the selection of microphone array apparatuses MA1 and MA2 is made using any one of the following three methods. In a first method, voice processing unit 305 selects a microphone array apparatus that sound-picks up sound in a high sound volume, from between microphone array apparatuses MA1 and MA2. In a second method, the user selects one of microphone array apparatuses MA1 and MA2. In a third method, the sound volume is compared with a threshold, and a microphone array apparatus that picks up a sound in a sound volume that is at a threshold or higher. In this case, in some cases, a plurality of microphone array apparatuses are selected.

The user selects thumbnail SZ or sound source mark SD for the selected microphone array apparatus MA and inputs the camera information into input box 329 for the camera name (S35B). Processing in subsequent Steps S36 to S38A is the same as in the sixth embodiment. In Step S38A, when variable i reaches the total number n of camera apparatuses in Step S38A, voice processing unit 305 ends the present operation.

Figure 35:
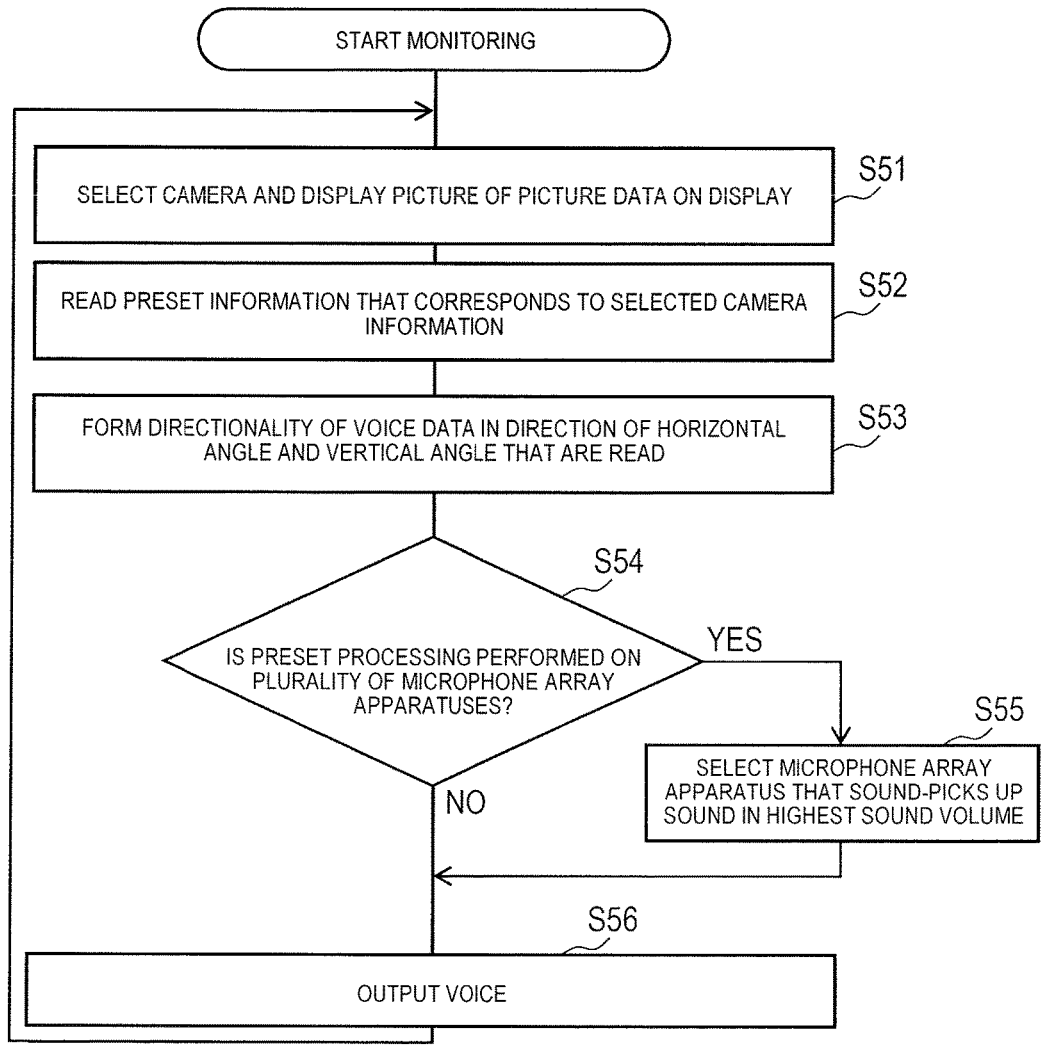
FIG. 35 is a flowchart illustrating the sound pickup procedure at the time of the monitoring.

FIG. 35 is a flowchart illustrating the sound pickup procedure at the time of the monitoring. Picture processing unit 307 within monitoring apparatus 300A selects any one of camera apparatuses C11 to C1n, and displays the picture that is image-captured in the selected camera apparatuses C11 to C1n, to display 318 (S51).

Figure 36:
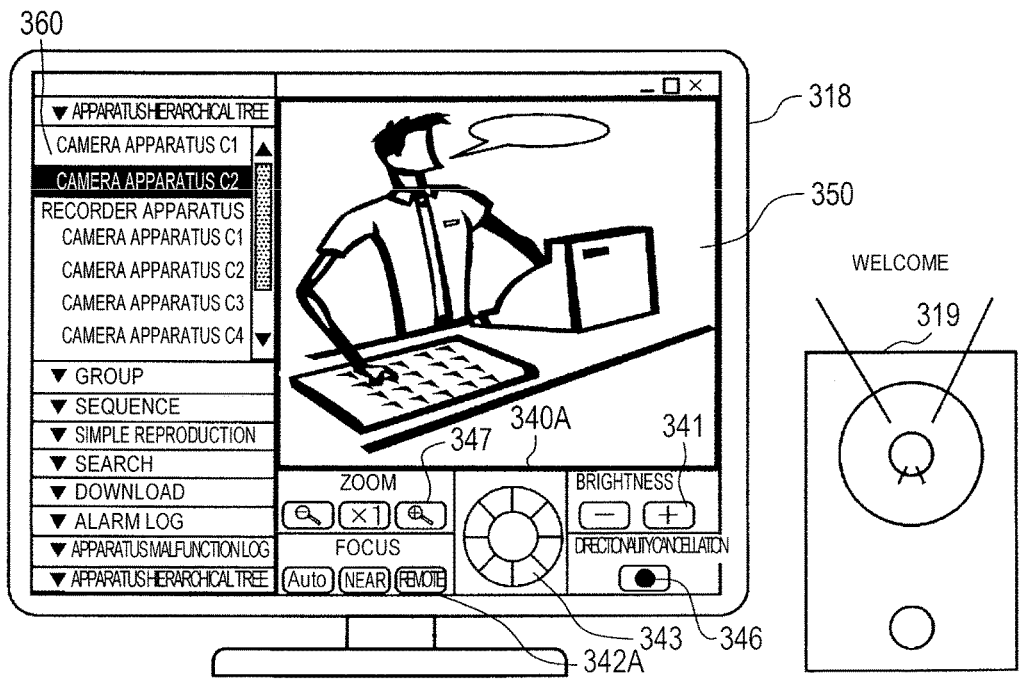
FIG. 36 is a diagram illustrating the screen of the display that is displayed at the time of the monitoring and the sound generation operation by the speaker.

FIG. 36 is a diagram illustrating the screen of display 318 that is displayed at the time of the monitoring, and the sound generation operation by speaker 319. Pull down menu 360 for various items is displayed on the left side of the screen of display 318. At this point, the pull down menu in an apparatus hierarchical tree is spread, and a state where camera apparatus C12 is selected appears. Monitor screen 350 on which the picture that is image-captured in selected camera apparatus C12 is displayed is positioned on the upper portion of approximately the center of the screen of display 318. Operation panel 340A is positioned on the lower portion of approximately the center of the screen of display 318. Provided on operation panel 340A are luminance button 341 for adjusting brightness of the picture, focus button 342A for adjusting a focus of the picture that is image-captured in each of camera apparatuses C11 to C18, selection button 343 for selecting any of camera apparatuses C11 to C18, and zoom button 347 for performing a zooming operation. A preset input box in which a new preset position is input in a case where the new preset position is added may be provided on operation panel 340A.

Voice processing unit 305 reads the preset information that corresponds to the selected camera information (S52). Voice processing unit 305 forms the directionality of the voice data in the pointing direction (the horizontal angle θ and the vertical angle φ) that is obtained from the preset information (S53). Voice processing unit 305 determines whether or not a plurality of microphone array apparatuses MA go through the preset processing (S54). In a case where there are a plurality of microphone array apparatuses MA, voice processing unit 305, for example, selects microphone array apparatus MA that sound-picks up sound in the highest sound volume which is decided at the time of the preset processing (S55).

Voice processing unit 305 outputs the voice data of which the directionality is formed in the selected microphone array apparatus MA, from speaker 319 (S56). In FIG. 36, voice "Welcome" is output from speaker 319. Thereafter, voice processing unit 305 returns to Step S51, and repeats the same operation.

As described above, in monitoring system 205B according to the seventh embodiment, because a plurality of microphone array apparatuses MA are included, sound can be picked up using the microphone array apparatus that is in a position where the user easily hears the voice that is generated within the store. Furthermore, in a case where it is possible that the plurality of microphone array apparatuses sound-pick up voice in a prescribed sound volume or higher, the preset processing is performed on the microphone array apparatus that picks up sound in the highest sound volume, and thus it is possible that even sound in a low sound volume is heard without any missing.

Additionally, even in a case where one microphone array apparatus malfunctions, voice in the same preset position can be heard using a different microphone array apparatus.

Furthermore, because monitoring apparatus 300A manages the preset information in a unified manner, each microphone array apparatus may not have a storage unit in which the preset information is stored, and thus a configuration can be simplified. Furthermore, voice processing unit 305 does not need to transmit the preset information to each microphone array apparatus MA, and a processing load can be reduced, leading to a reduction in traffic on a network.

First Modification Example

Figure 37:
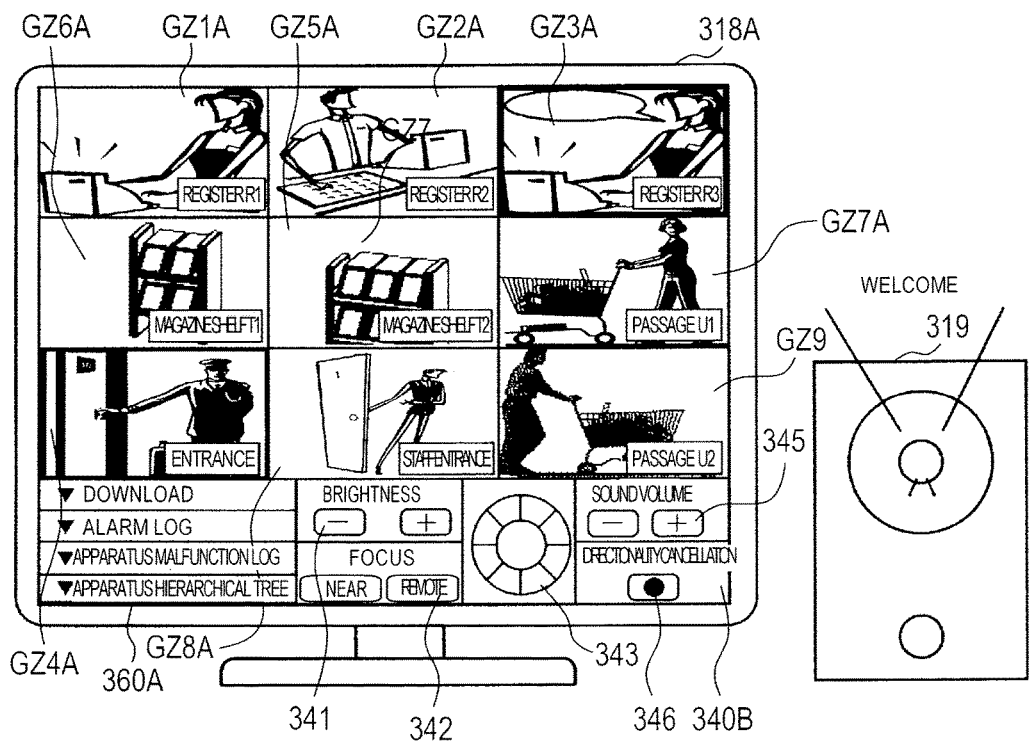
FIG. 37 is a diagram illustrating a screen of the display that is displayed at the time of the monitoring in a first modification example of the seventh embodiment.

FIG. 37 is a diagram a screen of display 318A that is displayed at the time of the monitoring in a first modification example of the seventh embodiment. A monitor screen that is divided into nine portions are arranged on portions except for the lower portion of the screen of display 318A. Image GZ1A to GZ8A and GZ9 that are image-captured in camera apparatuses C11 to C19, respectively, are displayed in a somewhat enlarged manner. Furthermore, pull down menu 360A is positioned on the lower left side of the screen. Furthermore, operation panel 340B is positioned on the lower right side of the screen. Operation panel 340B is the same as in FIG. 30 in the sixth embodiment. Unlike in FIG. 30 in the sixth embodiment, in the first modification example, the voice map is not displayed.

In a monitoring apparatus in the first modification example, when the user selects a place from which voice comes, from a plurality of pictures that are displayed on the screen of display 318A, speaker 319 outputs the voice that comes from the image-captured place. Furthermore, when voice processing unit 305 receives the voice data that results from occurrence of sound in a high sound volume, picture processing unit 307 changes a color of a frame of a picture of a place where the sound in a high sound volume occurs, and thus alerts the user to the place where the sound occurs. Switching of voice is performed manually or automatically.

Second Modification Example

In a second modification example of the seventh embodiment, each of the plurality of microphone array apparatuses MA1 to MAn has a storage unit, the monitoring apparatus integrates pieces of preset information that are received from the plurality of microphone array apparatuses MA1 to MAn, respectively, and creates one preset information table. The monitoring apparatus stores the created preset information table in a table memory. Furthermore, the integrated pieces of preset information, which are stored as the preset information table in the table memory, is transmitted to each of microphone array apparatuses MA1 to MAn.

Accordingly, even in a case where new microphone array apparatus is connected, the monitoring apparatus does not need to perform the preset processing, and only acquires the preset information from the microphone array apparatus for integration. Thus, the preset information table in which new preset information is listed can be obtained. Furthermore, even in a case where other one monitoring apparatus is added, the preset information is transmitted from the microphone array apparatus to other one monitoring apparatus and the other one monitoring apparatus integrates pieces of preset information that are transmitted from the plurality of microphone array apparatuses. Thus, the preset information table can be obtained. In this manner, a monitoring system in which the plurality of microphone array apparatuses and a plurality of monitoring apparatus are combined can be simply set up.

Third Modification Example

In a third modification example of the seventh embodiment, among the plurality of camera apparatuses C11 to C1n, one camera apparatus is a PTZ camera that has a pan tiling function of being remotely controllable from the monitoring apparatus, a zoom-on function and a zoom-out function (which are hereinafter referred to a PTZ function). The PTZ camera sets a place that is specified in advance, to be a preset value, and stores a pan tilting angle and a zoom value in a memory.

In a case where a plurality of preset positions are set to be in the PTZ camera, if among the plurality of camera apparatus C11 to C1n, fixation camera other than the PTZ camera is included, the number of times that presetting of a timer is performed is the number N of preset that results from considering a sum of the number of fixation camera and the number of times of presetting of the PTZ camera, not the total number n of cameras.

FIG. 38 is a table illustrating a detail of listing in a preset information table 330A in the third modification example of the seventh embodiment. A place, a microphone preset value, a camera IP address, and a camera preset value are listed in preset information table 330A. The listing of the microphone preset value and the camera IP address is the same as in the case of preset information table 330 that is illustrated din FIG. 32. When it comes to a new camera preset value, in the case of the fixation camera, because the image capture position is not changed, the camera preset value is "Null." On the other hand, in the case of the PTZ camera, the image capture position (in other words, the pointing position from the microphone array apparatus) that is viewed from the PTZ camera changes with Magazine Shelf T2 and Passage U1, the camera preset value is "PT1," and "PT2."

In a case where a target area (a place) that is image-captured by the PTZ camera, such as Magazine Shelf T2 or Passage U1, is selected, the monitoring apparatus reads the voice data in the pointing direction of the microphone array apparatus and, at the same time, transmits the camera preset value to the PTZ camera. The PTZ camera image-captures a picture in the image capture direction that corresponds to the preset value. The image capture area that is the monitoring target can be easily changed by using the PTZ camera. In the third modification example, instead of the fixation camera, the PTZ camera is used, but an omnidirectional camera may be used.

The various embodiments are described above with reference to the drawings, but it goes without saying that the present disclosure is not limited to such examples. It is apparent to a person of ordinary skill that various modification examples or alteration examples can be contemplated within the scope of claims, and it is understood that these also justifiably fall into the technical scope of the present disclosure.

For example, in the embodiments described above, both end portions (plugs) of the LAN cable that connects to the microphone array and the camera are inserted the microphone LAN connector with which the microphone array is equipped and the camera LAN connector with which the camera is equipped, respectively, and thus installation is performed in a freely attachable and detachable manner. However, the installation may be performed as follows. That is, the microphone array may not be equipped with the microphone LAN connector. The LAN cable of which one end may be directly attached within the microphone array is pulled out of the case of the microphone, and the other end may be formed as a plug in such a manner that the other end is inserted into the camera LAN connector. Accordingly, work for installation of the connector on the microphone side is unnecessary, and the efficiency work is improved.

According to the present disclosure, as a microphone array and a monitoring system that are useful, there are provided a microphone array, which is connected to a network along with a camera, and in which an amount of work is reduced when a monitoring system is set up and particularly when the monitoring system is set up in a state of being combined with the camera, and a monitoring system that includes the microphone array. Additionally, according to the present disclosure, as a monitoring system and a sound pickup setting method, there are provided a monitoring system and a sound pickup setting method, in which, even in a case where a positional relationship between a camera and a microphone array is unclear, the directionality is suitably formed in a predetermined image capture position, voice in the predetermined image capture position is clearly output, and thus an amount of work is reduced when the monitoring system is set up in a state of being combined with the camera.

REFERENCE MARKS IN THE DRAWINGS 3, 3A, 3B, 3C CAMERA
3$i$ DRIVE UNIT
3$j$ POLE
3$u$ CAMERA CASE
3$x$, 5$x$ OUTLET
3$y$, 3$z$, 5$y$, 5$z$, 5$w$ CASE
4 SPACER
5, 5A, 5B, 5C MICROPHONE ARRAY
5$r$, 7$h$, 7$u$ OPENING
6 PoE APPARATUS
7, 7A, 7B CEILING ATTACHMENT METAL FITTING
7C ATTACHMENT METAL FITTING
7$k$ HOLE
7$m$ PROTRUSION MEMBER
7$n$ PLATE
7$v$ PIN HOLE
7$p$ SUPPORT MEMBER
7$p$1 BOLT
7$p$5 PRESSING PLATE
7$p$51 UPPER PLATE
7$p$52 LOWER PLATE
7$p$53 PRESSURE PLATE
7$p$6 RECEPTION RING
7$q$ VERTICAL MEMBER
7$q$1, 7$q$2 PROTRUSION MEMBER
7$y$1, 7$z$ LOCKING PIECE
9 NETWORK
10, 10A, 10B, 10C MONITORING SYSTEM
16 SPACE
18 CEILING
18$z$ CEILING PLATE
19 CEILING BUILDING FRAME
19$z$ FIXATION BOLT
19$y$ NUT
31, 31$g$ CAMERA LAN NETWORK
31$z$, 38$z$, 39$z$, 61$z$, 62$z$, 63$z$, 91$z$, 92$z$ INNER WIRING
32 CAMERA DC CONNECTOR
33, 54, 54A, 79Z FIXATION PIN
34, 57 INPUT SWITCH UNIT
34$x$, 34$y$, 57$x$, 57$y$, 58$z$ INPUT TERMINAL
34$z$, 57$z$, 58$x$, 58$y$ OUTPUT TERMINAL
35, 55 HOST CPU
36, 56 NETWORK INTERFACE UNIT
37, 59 STEP-UP/DOWN POWER SUPPLY CIRCUIT
38, 61 PoE ELECTRIC POWER RECEPTION CIRCUIT
39, 62 SYSTEM ELECTRIC POWER SUPPLY CIRCUIT
40 IMAGING UNIT
44, 44A, 44B CEILING FIXATION PIN
51, 51A, 52, 52A, 51C, 52C MICROPHONE LAN CONNECTOR
53, 53A, 53B MICROPHONE DC CONNECTOR
58 OUTPUT SWITCH UNIT
63 PoE POWER TRANSMISSION UNIT
64 MICROPHONE SET
65 MICROPHONE UNIT
71, 71$z$, 72, 73, 73$z$ ENGAGEMENT HOLE
79 COVER 91, 92, 92A, 92e LAN CABLE
93, 94 DC CABLE
177 PERIPHERAL WALL ELASTIC PAWL
179 CUT
205, 205A, 205B MONITORING SYSTEM
210 STORE
215 NETWORK
224 STORAGE UNIT
225 CODING UNIT
226 TRANSMISSION UNIT
230 PC
240 RECORDER APPARATUS
250 VOICE PROCESSING APPARATUS
251 SIGNAL PROCESSING UNIT
252 SOUND SOURCE DIRECTION DETECTION UNIT
253 DIRECTIONALITY FORMATION UNIT
254 INPUT AND OUTPUT CONTROL UNIT
255 MEMORY
256 TRANSMISSION UNIT
257, 317 OPERATION UNIT
258, 318 DISPLAY
259, 319 SPEAKER
265, 265A, 265B VOICE MAP
265h, 265i, 265j CONCENTRIC CIRCLE
265m LINE SEGMENT
267 CAMERA INFORMATION
270 PICTURE PROCESSING APPARATUS
271 CAMERA MONITOR
281 SPEAKER
287, 323 CURSOR
288 INPUT BOX
290, 330, 330A PRESET INFORMATION TABLE
300, 300A MONITORING APPARATUS
305 VOICE PROCESSING UNIT
307 PICTURE PROCESSING UNIT
310 TABLE MEMORY
329 INPUT BOX
340, 340A, 340B OPERATION PANEL
341 LUMINANCE BUTTON
342, 342A FOCUS BUTTON
343 SELECTION BUTTON
345 SOUND VOLUME BUTTON
346 PRESET BUTTON
346A PRESET INPUT BOX
347 ZOOM BUTTON
350 MONITOR SCREEN
360, 360A PULL DOWN MENU
A1 TO An A/D CONVERTER
C11 TO C1n CAMERA APPARATUS
CR1 TO CRn IMAGE CAPTURE RANGE
FLR FLOOR
GZ1 TO GZn, GZ1A TO GZnA IMAGE
M1 TO Mn MICROPHONE
MA, MA1 TO MAn MICROPHONE ARRAY APPARATUS
O CENTRAL POINT
P1 TO Pn PRESET POSITION
PA1 TO PAn AMPLIFIER (AMP)
PKT PACKET
RF CEILING
SD, SD1 TO SDn, SD3A, SD3B SOUND SOURCE MAP
SZ1 TO SZ4 THUMBNAIL

The invention claimed is:

1. A monitoring system comprising:
a microphone array that has a plurality of sound pickup elements and sound-picks up voice using the sound pickup elements;
at least one camera that image-captures a predetermined position;
a sound source detection unit that detects a sound source direction from the microphone array, based on voice data on the voice that is sound-picked up;
a display unit on which the detected sound source direction from the microphone array is displayed according to prescribed voice output in the predetermined position;
an operation unit that receives an input of information relating to the camera which image-captures the predetermined position, according to designation of the displayed sound source direction from the microphone array; and
a storage unit in which correspondence information that results from associating information relating to the camera, which is input, and the sound source direction from the microphone array is stored.

2. The monitoring system of claim 1, further comprising:
a directionality formation unit that forms directionality of the voice data on the voice that is sound-picked up by the microphone array, in the sound source direction that is associated with the predetermined position, based on the correspondence information; and
an output unit that outputs the voice data of which the directionality is formed by the directionality formation unit.

3. The monitoring system of claim 2,
wherein a marker indicating the sound source direction from the microphone array is displayed on a voice map on a concentric circle of which the center is a position of the microphone array, of which a central angle indicates a horizontal angle and a length of whose radius indicates a vertical angle, on the display unit.

4. The monitoring system of claim 3,
wherein the marker that is displayed on the voice map is designated through operation unit, and
wherein the directionality formation unit forms the directionality of the voice data on the voice that is sound-picked up by the microphone array, in the sound source direction that corresponds to the designated marker.

5. The monitoring system of claim 4,
wherein, in a case where a sound volume of the voice data of which the directionality is formed by the directionality formation unit exceeds a threshold, the marker that corresponds to the sound source direction in which the directionality is formed is displayed on the display unit in a manner that is identifiable on the voice map.

6. The monitoring system of claim 2,
wherein the microphone array has the storage unit in which the correspondence information is stored, and transmits data that results from adding the correspondence information to the voice data on the voice that is sound-picked up, to the directionality formation unit.

7. The monitoring system of claim 1,
wherein a plurality of the cameras are provided,
wherein images of predetermined positions that are image-captured by the cameras, respectively, are displayed on the display unit, and wherein, with operation of selecting the image in the predetermined position that is displayed on the display unit, the operation unit designates the sound source direction.

8. The monitoring system of claim 1,
wherein a plurality of the microphone arrays and a plurality of the cameras are provided, and
wherein the correspondence information that results from associating information relating to any one of the cameras and the sound source direction from the microphone array is stored in the storage unit, for each of the microphone arrays.

9. The monitoring system of claim 8,
wherein the sound source direction that results from the plurality of the microphone arrays in the overlapping predetermined positions is included in the correspondence information.

10. The monitoring system of claim 1,
wherein the microphone array and the camera are connected to a network,
wherein the microphone array includes
  a sound pickup unit that has a plurality of sound pickup elements and sound-picks up voice,
  a first network interface unit has a hub function of transmitting the voice data on the voice that is sound-picked up by the sound pickup unit, and image data that is image-captured by the camera and is transmitted to the microphone array, to the network through a first signal line,
  a first electric power source unit that receives first electric power which is transmitted through the first signal line that is linked to the network, or second electric power which is transmitted from an outer electric power source,
  an input switch unit that switches between the first electric power or the second electric power and outputs the resulting electric power, and
  an output switch unit that supplies an output of the input switch unit to the camera through a second signal line which links between the microphone array and the camera, or through an electric power supply line, and
wherein the camera includes
  an image capturing unit that image-captures an image,
  a second network interface unit that transmits image data on an image that is image-captured by the image capturing unit, to the microphone array through the second signal line, and
  a second electric power source unit that receives the first electric power or the second electric power through the second signal line or the electric power supply line.

11. A microphone array that is included in the monitoring system of claim 1, and is connected to a camera and a network, comprising:
  a sound pickup unit that has a plurality of sound pickup elements, and sound picks up voice;
  a network interface unit that has a hub function of transmitting voice data on the voice that is sound-picked up by the sound pickup unit, and image data that is image-captured by the camera and is transmitted to the microphone array, to the network through a first signal line;
  an electric power source unit that receives first electric power that is transmitted through the first signal line which is linked to the network, or second electric power that is transmitted from an outer electric power source;
  an input switch unit that switches between the first electric power or the second electric power and outputs the resulting electric power; and
  an output switch unit that supplies an output of the input switch unit to the camera through a second signal line which links between the microphone array and the camera, or through an electric power supply line.

12. The microphone array of claim 11,
wherein the electric power source unit receives the first electric power that is transmitted through the first signal line,
wherein the input switch unit outputs the first electric power, and
wherein the output switch unit supplies an output of the input switch unit to the camera through the second signal line.

13. The microphone array of claim 11,
wherein the electric power source unit receives the first electric power that is transmitted through the first signal line,
wherein the input switch unit outputs the first electric power, and
wherein the output switch unit supplies an output of the input switch unit to the camera through the electric power supply line.

14. The microphone array of claim 11,
wherein the electric power source unit receives the second electric power that is transmitted from the outer electric power source,
wherein the input switch unit outputs the second electric power, and
wherein the output switch unit supplies an output of the input switch unit to the camera through the second signal line.

15. The microphone array of claim 11,
wherein the electric power source unit receives the second electric power that is transmitted from the outer electric power source,
wherein the input switch unit outputs the second electric power, and
wherein the output switch unit supplies an output of the input switch unit to the camera through the electric power supply line.

16. The microphone array of claim 11,
wherein an opening that produces a space which is able to accommodate the second signal line is formed in a rear surface of a case of the microphone array.

17. The microphone array of claim 16,
wherein an outlet through which the second signal line is able to be pulled out of the space is formed a side surface of the case of the microphone array.

18. The microphone array of claim 11,
wherein a connection unit to which the second signal line is able to be connected is provided on a rear surface of a case of the microphone array.

19. The microphone array of claim 11,
wherein a connection unit to which the second signal line is able to be connected is provided on a side surface of a case of the microphone array.

20. A sound pickup setting method for use in a monitoring system that includes at least one camera which image-captures a predetermined position and a microphone array, the method comprising:
  a step of causing the microphone array, which have a plurality of sound pickup elements, to sound-pick up prescribed output voice from a sound source that is placed in the predetermined position;

a step of detecting a sound source direction from the microphone array based on voice data on voice that is sound-picked up by the microphone array;

a step of displaying the detected sound source direction from the microphone array on a display unit;

a step of designating the sound source direction from the microphone array, which is displayed on the display unit;

a step of inputting information relating to the camera that image-captures the predetermined position, according to the designation of the sound source direction; and a step of storing correspondence information that results from associating the information relating to the camera, which is input, and the sound source direction from the microphone array, in a storage unit.

* * * * *